United States Patent
Zalzman et al.

(10) Patent No.: US 12,540,173 B2
(45) Date of Patent: Feb. 3, 2026

(54) METHODS OF TREATING CANCER BY TARGETING ZSCAN4 ACTIVITY IN CANCER STEM CELLS

(71) Applicant: University of Maryland, Baltimore, Baltimore, MD (US)

(72) Inventors: Michal Zalzman, Baltimore, MD (US); Benjamin Portney, Baltimore, MD (US)

(73) Assignee: UNIVERSITY OF MARYLAND, BALTIMORE, Baltimore, MD (US)

( * ) Notice: Subject to any disclaimer, the term of this patent is extended or adjusted under 35 U.S.C. 154(b) by 963 days.

(21) Appl. No.: 17/613,443

(22) PCT Filed: May 22, 2020

(86) PCT No.: PCT/US2020/034371
§ 371 (c)(1),
(2) Date: Nov. 22, 2021

(87) PCT Pub. No.: WO2020/237209
PCT Pub. Date: Nov. 26, 2020

(65) Prior Publication Data
US 2022/0306730 A1   Sep. 29, 2022

Related U.S. Application Data

(60) Provisional application No. 62/851,325, filed on May 22, 2019.

(51) Int. Cl.
| | | |
|---|---|---|
| C07K 16/18 | (2006.01) | |
| A61P 35/00 | (2006.01) | |
| C07K 14/47 | (2006.01) | |
| C12N 15/113 | (2010.01) | |

(52) U.S. Cl.
CPC ........... *C07K 16/18* (2013.01); *A61P 35/00* (2018.01); *C07K 14/4703* (2013.01); *C12N 15/113* (2013.01); *C07K 2317/92* (2013.01); *C12N 2310/10* (2013.01); *C12N 2310/531* (2013.01)

(58) Field of Classification Search
None
See application file for complete search history.

(56) References Cited

U.S. PATENT DOCUMENTS

| | | | | |
|---|---|---|---|---|
| 8,901,288 B2 * | 12/2014 | Fellmann | ............... | C12N 15/85 536/24.5 |
| 2014/0287511 A1 * | 9/2014 | Ko | ............. | C12N 15/85 435/456 |
| 2016/0030514 A1 * | 2/2016 | Ko | ............. | A61P 13/10 |

OTHER PUBLICATIONS

Portney, Benjamin, "The Role of ZSCAN4 in Cancer Stemness" Doctoral dissertation, 2018, publicly available from the University of Maryland, Baltimore Online Digital Archive. Retrieved Sep. 20, 2024 from the internet, http://hdl.handle.net/10713/8186. (Year: 2018).*

Portney et al. 2018 "The Role of ZSCAN4 in Cancer Stemness" Doctoral dissertation, 2018, publicly available from the University of Maryland, Baltimore Online Digital Archive. http://hdl.handle.net/10713/8186 (Year: 2018).*

* cited by examiner

*Primary Examiner* — Jennifer Dunston
*Assistant Examiner* — Tiffany Nicole Grooms
(74) *Attorney, Agent, or Firm* — Nevrivy Patent Law Group P.L.L.C.

(57) ABSTRACT

Provided herein are methods of treating cancer in a subject, comprising administering to the subject a therapeutically effective amount of an agent that inhibits the activity of ZSCAN4 in cancer cells in the subject, thereby treating the cancer.

4 Claims, 30 Drawing Sheets
Specification includes a Sequence Listing.

METHODS OF TREATING CANCER BY TARGETING ZSCAN4 ACTIVITY IN CANCER STEM CELLS

CROSS REFERENCE TO RELATED APPLICATIONS

This application claims the benefit of U.S. Provisional Appl. No. 62/851,325, filed May 22, 2019, the contents of which are hereby incorporated by reference in their entirety.

STATEMENT OF FEDERALLY SPONSORED RESEARCH AND DEVELOPMENT

This invention was made with government support under Grant Numbers AR070819 and NS095088 awarded by The National Institutes of Health. The government has certain rights in the invention.

INCORPORATION-BY-REFERENCE OF MATERIAL SUBMITTED ELECTRONICALLY

Incorporated by reference in its entirety herein is a computer-readable sequence listing submitted concurrently herewith and identified as follows: One 12,306 Byte ASCII (Text) file named "Sequence_Listing_ST25.txt," created on May 22, 2020.

FIELD OF THE INVENTION

The field of the invention generally relates to medicine and pharmaceuticals. In particular, the field of the invention relates to compositions and methods for the treatment of cancer, in particularly by inhibiting cancer stem cells.

BACKGROUND

Embryonic stem (ES) cells and cancer cells have unlimited capacity for self-renewal and share many properties, including gene expression networks. The naïve "stemness" state in ES cells is maintained by the core pluripotency master regulators OCT3/4, NANOG and SOX2 (Boyer L A, Lee T I, Cole M F, Johnstone S E, Levine S S, Zucker J P et al. Core transcriptional regulatory circuitry in human embryonic stem cells. Cell (Research Support, N.I.H., Extramural Research Support, Non-U.S. Gov't Research Support, U.S. Gov't, P.H.S.) 2005; 122: 947-956; Loh Y H, Wu Q, Chew J L, Vega V B, Zhang W, Chen X et al. The Oct4 and Nanog transcription network regulates pluripotency in mouse embryonic stem cells. Nat Genet (Research Support, N.I.H., Extramural Research Support, Non-U.S. Gov't) 2006; 38: 431-440.) Previous studies have demonstrated that, similar to ES cells, cancer cells can harness these pluripotency factors for survival, inhibition of differentiation (Boyer L A, Plath K, Zeitlinger J, Brambrink T, Medeiros L A, Lee T I et al. Polycomb complexes repress developmental regulators in murine embryonic stem cells. Nature 2006; 441: 349-353.; Lee T I, Jenner R G, Boyer L A, Guenther M G, Levine S S, Kumar R M et al. Control of developmental regulators by Polycomb in human embryonic stem cells. Cell 2006; 125: 301-313.) and self-renewal (Ben-Porath I, Thomson M W, Carey V J, Ge R, Bell G W, Regev A et al. An embryonic stem cell-like gene expression signature in poorly differentiated aggressive human tumors. Nat Genet 2008; 40: 499-507. (Su Y J, Lai H M, Chang Y W, Chen G Y, Lee J L. Direct reprogramming of stem cell properties in colon cancer cells by CD44. The EMBO journal (Research Support, Non-U.S. Gov't) 2011; 30: 3186-3199.; Chiou S H, Yu C C, Huang C Y, Lin S C, Liu C J, Tsai T H et al. Positive correlations of Oct-4 and Nanog in oral cancer stem-like cells and high-grade oral squamous cell carcinoma. Clin Cancer Res 2008; 14: 4085-4095. Indeed, combinations of the core pluripotency factors have been shown to reprogram cells back to an "ES cell like state", known as induced pluripotent stem cells (iPSC) (Takahashi K, Yamanaka S. Induction of pluripotent stem cells from mouse embryonic and adult fibroblast cultures by defined factors. Cell (Research Support, Non-U.S. Gov't) 2006; 126: 663-676.)

ES cells and cancer cells are characterized by open and permissive chromatin signatures, enriched in active histone marks (Azuara V, Perry P, Sauer S, Spivakov M, Jorgensen H F, John R M et al. Chromatin signatures of pluripotent cell lines. Nat Cell Biol (Research Support, Non-U.S. Gov't) 2006; 8: 532-538.; Meshorer E, Misteli T. Chromatin in pluripotent embryonic stem cells and differentiation. Nat Rev Mol Cell Biol (Research Support, Non-U.S. Gov't Review) 2006; 7: 540-546; Bibikova M, Laurent L C, Ren B, Loring J F, Fan J B. Unraveling epigenetic regulation in embryonic stem cells. Cell Stem Cell 2008; 2: 123-134.; Gaspar-Maia A, Alajem A, Meshorer E, Ramalho-Santos M. Open chromatin in pluripotency and reprogramming. Nat Rev Mol Cell Biol (Research Support, N.I.H., Extramural Research Support, Non-U.S. Gov't Review) 2011; 12: 36-47.; Orkin S H, Hochedlinger K. Chromatin connections to pluripotency and cellular reprogramming. Cell 2011; 145: 835-850.) Many embryonic factors have emerged as key regulators of cancer stem cells (CSCs) and thus, therapeutic targets. CSCs, or tumor-initiating cells, have unlimited capacity to self-renew, and recapitulate all cell types within the tumor from a single cell (Ben-Porath I, Thomson M W, Carey V J, Ge R, Bell G W, Regev A et al. An embryonic stem cell-like gene expression signature in poorly differentiated aggressive human tumors. Nat Genet 2008; 40: 499-507.; Chiou S H, Yu C C, Huang C Y, Lin S C, Liu C J, Tsai T H et al. Positive correlations of Oct-4 and Nanog in oral cancer stem-like cells and high-grade oral squamous cell carcinoma. Clin Cancer Res 2008; 14: 4085-4095.; Prince M E, Sivanandan R, Kaczorowski A, Wolf G T, Kaplan M J, Dalerba P et al. Identification of a subpopulation of cells with cancer stem cell properties in head and neck squamous cell carcinoma. Proc Natl Acad Sci USA 2007; 104: 973-978.; Prince M E, Ailles L E. Cancer stem cells in head and neck squamous cell cancer. Journal of clinical oncology: official journal of the American Society of Clinical Oncology (Review) 2008; 26: 2871-2875.; Okamoto A, Chikamatsu K, Sakakura K, Hatsushika K, Takahashi G, Masuyama K. Expansion and characterization of cancer stem-like cells in squamous cell carcinoma of the head and neck. Oral Oncol 2009; 45: 633-639.; Ailles L, Prince M. Cancer stem cells in head and neck squamous cell carcinoma. Methods Mol Biol 2009; 568: 175-193.) CSCs are the suggested driving force of tumorigenicity, contributing to an aggressive phenotype and tumor recurrence (Ailles L, Prince M. Cancer stem cells in head and neck squamous cell carcinoma. Methods Mol Biol 2009; 568: 175-193; Chinn S B, Darr O A, Owen J H, Bellile E, McHugh J B, Spector M E et al. Cancer stem cells: mediators of tumorigenesis and metastasis in head and neck squamous cell carcinoma. Head & neck (Research Support, N.I.H., Extramural) 2015; 37: 317-326.) Much like other embryonic factors, the human ZSCAN4 has been proposed to have significance in cancer (Zalzman M, Falco G, Sharova L V, Nishiyama A, Thomas M, Lee S L et al. Zscan4 regulates telomere elongation and genomic stability in ES cells. Nature 2010; 464: 858-U866.;

Lee K, Gollahon L S. Zscan4 interacts directly with human Rap1 in cancer cells regardless of telomerase status. Cancer biology & therapy (Research Support, Non-U.S. Gov't) 2014; 15: 1094-1105.) However, to date, the function of human ZSCAN4 or how it exerts its effects remains unknown.

The murine mZscan4 gene cluster is transiently expressed in mouse embryonic stem (mES) cells (Zalzman M, Falco G, Sharova L V, Nishiyama A, Thomas M, Lee S L et al. Zscan4 regulates telomere elongation and genomic stability in ES cells. Nature 2010; 464: 858-863) and 2-cell stage embryos (Falco G, Lee S L, Stanghellini I, Bassey U C, Hamatani T, Ko M S. Zscan4: a novel gene expressed exclusively in late 2-cell embryos and embryonic stem cells. Dev Biol 2007; 307: 539-550.; Sharov A A, Piao Y, Matoba R, Dudekula D B, Qian Y, VanBuren V et al. Transcriptome analysis of mouse stem cells and early embryos. PLoS Biol 2003; 1: E74). In mES cells, mZscan4 regulates telomere maintenance and genomic stability (Zalzman M, Falco G, Sharova L V, Nishiyama A, Thomas M, Lee S L et al. Zscan4 regulates telomere elongation and genomic stability in ES cells. Nature 2010; 464: 858-863.) It was further shown to restore mES cell developmental potency (Amano T, Hirata T, Falco G, Monti M, Sharova L V, Amano M et al. Zscan4 restores the developmental potency of embryonic stem cells. Nat Commun 2013; 4: 1966.,) replace c-Myc, and to facilitate the reactivation of early embryonic genes during generation of iPSC (Hirata T, Amano T, Nakatake Y, Amano M, Piao Y, Hoang H G et al. Zscan4 transiently reactivates early embryonic genes during the generation of induced pluripotent stem cells. Sci Rep 2012; 2: 208.) In combination with the core pluripotency factors, mZscan4 promotes the generation of iPSC (Jiang J, Lv W, Ye X, Wang L, Zhang M, Yang H et al. Zscan4 promotes genomic stability during reprogramming and dramatically improves the quality of iPS cells as demonstrated by tetraploid complementation. Cell Res 2013; 23: 92-106.) Additional reports suggest that ZSCAN4 expression positively correlates with chromatin de-repression (Akiyama T, Xin L, Oda M, Sharov A A, Amano M, Piao Y et al. Transient bursts of Zscan4 expression are accompanied by the rapid derepression of heterochromatin in mouse embryonic stem cells. DNA Res 2015.)

What is needed are improved compositions and methods of treating cancer by targeting cancer stem cells.

SUMMARY

It is to be understood that both the foregoing general description of the embodiments and the following detailed description are exemplary, and thus do not restrict the scope of the embodiments.

The present inventors have studied the role of human ZSCAN4 in cancer. The data herein establish a novel and unexpected role for ZSCAN4 in marking and facilitating the CSC phenotype. It is shown that ZSCAN4 is transiently expressed in head and neck squamous cell carcinoma (HN-SCCs) cell lines and is enriched in and marks CSCs. It is shown that ZSCAN4 induction leads to a significant increase in CSC frequency both in vitro and in vivo. The data further reveal that ZSCAN4 interacts with the core pluripotency gene promoters and facilitates a functional histone hyperacetylation of histone H3, which in turn results in an upregulation of CSC markers. Conversely, ZSCAN4 depletion leads to downregulation of CSC markers, a reduction in open chromatin marks, a reduced ability to form tumorspheres in vitro, and severely affects the ability of HNSCCs cells to form tumors in vivo. Overall, the studies suggest ZSCAN4 plays a critical role in the maintenance of HNSCC cancer stem cells.

In one aspect, the invention provides a method of treating cancer in a subject, comprising administering to the subject a therapeutically effective amount of an agent that inhibits the activity of ZSCAN4 in cancer cells in the subject, thereby treating the cancer. In some embodiments, the cancer is head and neck squamous cell carcinoma. In some embodiments, the cancer cells are cancer stem cells.

In some embodiments, ZSCAN4 is contained in a complex, and the activity of ZSCAN4 that is inhibited is an activity of the ZSCAN4 containing complex. In some embodiments, the ZSCAN4 containing complex comprises RNF20.

In some embodiments, the activity of ZSCAN4 that is inhibited comprises maintenance of a cancer stem cell phenotype. In some embodiments, the activity of ZSCAN4 that is inhibited comprises ubiquitination of histone 2B.

In some embodiments, the activity of ZSCAN4 that is inhibited comprises histone 3 hyperacetylation in chromatin of the cancer cells.

In some embodiments, the activity of ZSCAN4 that is inhibited comprises upregulation of OCT3/4 and NANOG in the cancer cells.

In some embodiments, the activity of ZSCAN4 that is inhibited comprises upregulation of cancer stem cell factors in the cancer cells.

In some embodiments, the activity of ZSCAN4 that is inhibited comprises ability to the cancer cells to form tumorspheres.

In some embodiments, the activity of ZSCAN4 that is inhibited comprises tumor growth.

In some embodiments, the agent comprises a nucleic acid molecule comprising a nucleotide sequence that binds to at least a portion of a nucleotide sequence of ZSCAN4 or RNF20. In some embodiments, a portion of the nucleic acid molecule is at least 70%, 75%, 80%, 85%, 90%, 91%, 92%, 93%, 94%, 95%, 96% 97%, 97%, 98% or 99% complementary to at least a portion of SEQ ID NO:1.

In some embodiments, the nucleotide sequence of ZSCAN4 is SEQ ID NO: 1.

In some embodiments, the nucleotide sequence of RNF20 is SEQ ID NO: 2.

In some embodiments, a portion of the nucleic acid molecule is at least 70%, 75%, 80%, 85%, 90%, 91%, 92%, 93%, 94%, 95%, 96% 97%, 97%, 98% or 99% complementary to at least a portion of SEQ ID NO:1.

In some embodiments, a portion of the nucleic acid molecule is at least 70%, 75%, 80%, 85%, 90%, 91%, 92%, 93%, 94%, 95%, 96% 97%, 97%, 98% or 99% complementary to at least a portion of SEQ ID NO:2.

In some embodiments, the agent comprises a DNA molecule or an RNA molecule.

In some embodiments, the agent comprises an anti-sense DNA molecule or an anti-sense RNA molecule.

In some embodiments, the agent comprises a small interfering RNA (siRNA) molecule.

In some embodiments, the agent comprises a small hairpin RNA (shRNA) molecule.

In some embodiments, the agent comprises a nanoparticle comprising the nucleic acid.

In some embodiments, the agent comprises an expression vector.

In some embodiments, the expression vector is a viral vector or a non-viral vector.

In some embodiments, the viral vector is an adenoviral vector, an adeno-associated viral vector, a lentiviral vector, or a retroviral vector.

In some embodiments, the expression vector is a lentiviral vector.

In some embodiments, the agent binds to ZSCAN4 and inhibits its activity.

In some embodiments, the agent binds to RNF20 and inhibits its activity.

In some embodiments, the agent disrupts the interaction between ZSCAN4 and one or more components of a ZSCAN4-containing complex.

In some embodiments, the agent disrupts the interaction between ZSCAN4 and RNF20.

In another aspect, the invention provides a composition for treating cancer in a subject, comprising an effective amount of an agent that inhibits the activity of ZSCAN4 in cancer cells in the subject and a pharmaceutically acceptable carrier. In some embodiments, the composition comprises a nucleic acid molecule that comprises a nucleotide sequence that binds to at least a portion of a nucleotide sequence of ZSCAN4. In some embodiments, the composition comprises a nucleic acid molecule that comprises a nucleotide sequence that binds to at least a portion of a nucleotide sequence of RNF20.

In some embodiments, the composition comprises a DNA molecule or an RNA molecule.

In some embodiments, the composition comprises an anti-sense DNA molecule or an anti-sense RNA molecule.

In some embodiments, the composition comprises a small interfering RNA (siRNA) molecule.

In some embodiments, the composition comprises a small hairpin RNA (shRNA) molecule.

In some embodiments, the composition comprises an expression vector. In some embodiments, the expression vector is a viral vector or a non-viral vector. In some embodiments, the viral vector is an adenoviral vector, an adeno-associated viral vector, a lentiviral vector, or a retroviral vector.

In some embodiments, the composition comprises an agent that binds to ZSCAN4 and inhibits its activity.

In some embodiments, the composition comprises an agent that binds to RNF20 and inhibits its activity.

In some embodiments, the composition comprises an agent that disrupts the interaction between ZSCAN4 and one or more components of a ZSCAN4-containing complex. In some embodiments, the composition comprises an agent that disrupts the interaction between ZSCAN4 and RNF20.

In another aspect, the invention provides a method of screening for an agent that inhibits an activity of ZSCAN4 comprising:
i) contacting cells expressing ZSCAN4 with the agent; and
ii) assaying the agent's effect on the activity of ZSCAN4.

In some embodiments, the cells are cancer cells. In some embodiments, the cells are cancer stem cells. In some embodiments, the ZSCAN4 is contained in a complex, and the activity of ZSCAN4 that is inhibited is an activity of the ZSCAN4 containing complex. In some embodiments, the ZSCAN4 containing complex comprises RNF20. In some embodiments, the activity of ZSCAN4 that is inhibited comprises ubiquitination of histone 2B. In some embodiments, the activity of ZSCAN4 that is inhibited comprises maintenance of a cancer stem cell phenotype. In some embodiments, the activity of ZSCAN4 that is inhibited comprises histone 3 hyperacetylation in chromatin of the cancer cells. In some embodiments, the activity of ZSCAN4 that is inhibited comprises upregulation of OCT3/4 and NANOG in the cancer cells. In some embodiments, the activity of ZSCAN4 that is inhibited comprises upregulation of cancer stem cell factors in the cancer cells. In some embodiments, the activity of ZSCAN4 that is inhibited comprises ability to the cancer cells to form tumorspheres. In some embodiments, the activity of ZSCAN4 that is inhibited comprises tumor growth.

In some embodiments, the cells have been engineered to express ZSCAN4 and/or RNF20.

In some embodiments, the agent reduces expression levels of ZSCAN4 and the expression levels of ZSCAN4 is assayed in the cells. In some embodiments, the level of ZSCAN4 mRNA is assayed. In some embodiments, the level of ZSCAN4 protein is assayed. In some embodiments, the agent reduces expression levels of RNF20 and the expression levels of RNF20 is assayed in the cells.

In some embodiments, the agent is a nucleic acid. In some embodiments, the agent is a small molecule.

It is to be understood that both the foregoing general description and the following detailed description are exemplary, and thus do not restrict the scope of the invention. Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The skilled artisan will understand that the drawings, described below, are for illustration purposes only. The drawings are not intended to limit the scope of the present teachings in any way.

DETAILED DESCRIPTION

Figure 1:
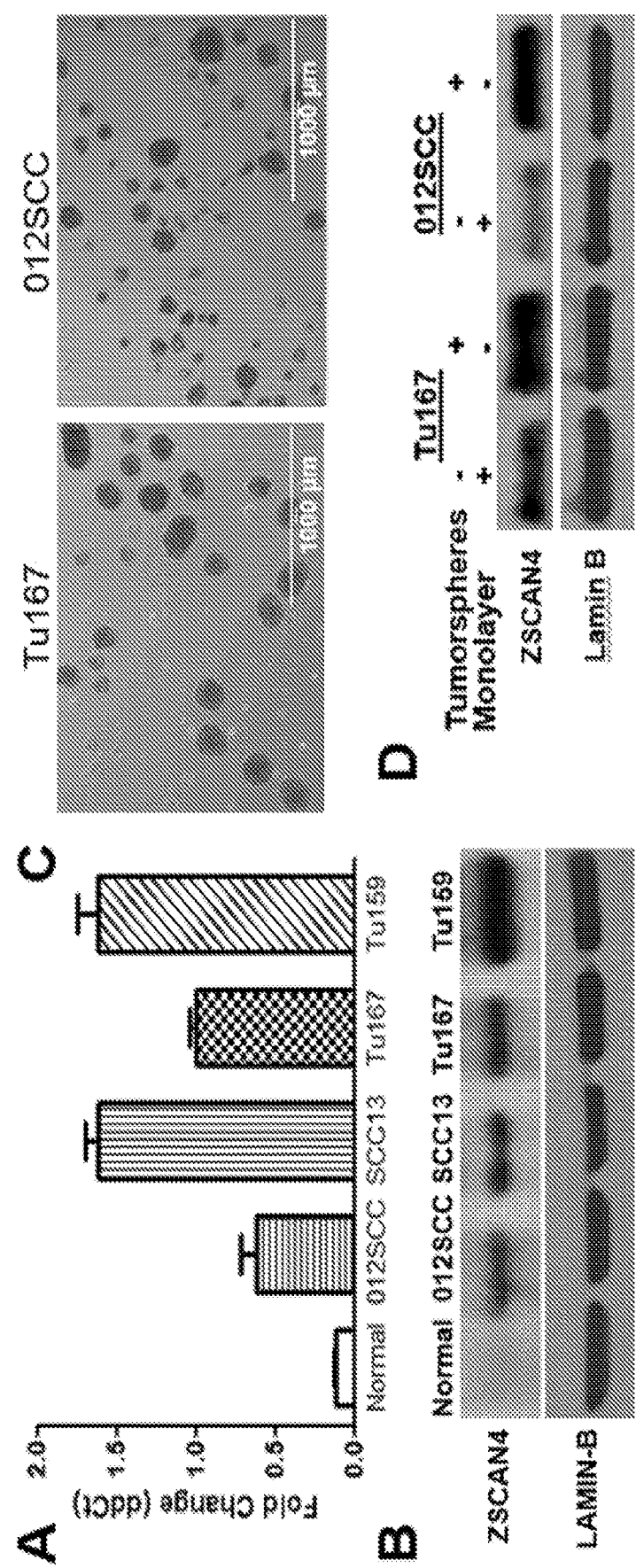
FIG. 1. ZSCAN4 is expressed in HNSCC and is upregulated in tumorspheres. A, ZSCAN4 is expressed in HNSCC cell lines, as shown by qPCR and by B, immunoblot analyses, whereas normal human tonsil primary control cells from 4 different donors are negative. Error bars indicate S.E.M. C, Representative phase contrast images of tumorspheres in WT HNSCC cell lines Tu167 and 012SCC. Scale bar indicates 1000 μm D, Immunoblot assays indicate that ZSCAN4 expression is enriched for in tumorspheres compared to attached cells in complete medium (monolayer).

Cancer stem cells (CSCs) are cells within tumors that maintain the ability to self-renew, drive tumor growth, and contribute to therapeutic resistance and cancer recurrence. As shown herein, the role of Zinc finger and SCAN domain containing 4 (ZSCAN4) in human head and neck squamous cell carcinoma (HNSCC) was investigated. The murine Zscan4 is involved in telomere maintenance and genomic stability of mouse embryonic stem cells. The data herein indicate that the human ZSCAN4 is enriched for, marks and is co-expressed with CSC markers in HNSCC. It is shown that transient ZSCAN4 induction for just two days increases CSC frequency both in vitro and in vivo and leads to upregulation of pluripotency and CSC factors. Importantly, it is defined for the first time the role of ZSCAN4 in altering the epigenetic profile and regulating the chromatin state. The data show that ZSCAN4 leads to a functional histone 3 hyperacetylation at the promoters of OCT3/4 and NANOG, leading to an upregulation of CSC factors. Consistently, ZSCAN4 depletion leads to downregulation of CSC markers, decreased ability to form tumorspheres and severely inhibits tumor growth. The results provide that ZSCAN4 plays an important role in the maintenance of the CSC phenotype, indicating that ZSCAN4 is a therapeutic target for treating HNSCC and other cancers.

Previous work has indicated that RNF20 poly-ubiquitinates ZSCAN4 to promote its clearance from cells by the ubiquitin proteasome system. It has also been shown that RNF20 also catalyzes the addition of a single molecule of ubiquitin to lysine 120 at Histone 2B (H2B) to generate H2Bub1. As Lysine 120 at H2B is located at the edge of adjacent nucleosomes, the addition of a single ubiquitin is proposed to disrupt nucleosome stacking, permitting an open chromatin state. Consequently, H2Bub1 marks highly transcribed genes and plays central roles in many cellular processes. It is shown herein that RNF20 plays critical roles in ZSCAN4 activity in maintaining CSC gene expression and is a marker of open chromatin. The results herein indicate that RNF20 depletion eliminates the effect of ZSCAN4 on the stemness master regulators OCT3/4, SOX2 and NANOG and telomere length. Blocking the interaction of ZSCAN4 with RNF20 (or other interacting candidates) will allow the elimination of cancer stem cells. The invention described herein can be used to eliminate cancer stem cells as a treatment for cancer and to prevent cancer recurrence, e.g., by inhibiting the interactions between ZSCAN4 and its interacting proteins such as RNF20 and others—using peptides, small molecules, RNAi, dominant negative proteins, and the like. This novel cancer therapeutic can be used alone or in combination with conventional cancer treatments.

Reference will now be made in detail to embodiments of the invention which, together with the drawings and the following examples, serve to explain the principles of the invention. These embodiments describe in sufficient detail to enable those skilled in the art to practice the invention, and it is understood that other embodiments may be utilized, and that structural, biological, and chemical changes may be made without departing from the spirit and scope of the present invention. Unless defined otherwise, all technical and scientific terms used herein have the same meanings as commonly understood by one of ordinary skill in the art.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Furthermore, where the description of one or more embodiments uses the term "comprising," those skilled in the art would understand that, in some specific instances, the embodiment or embodiments can be alternatively described using the language "consisting essentially of" and/or "consisting of." As used herein, the term "about" means at most plus or minus 10% of the numerical value of the number with which it is being used.

It is contemplated that any method or composition described herein can be implemented with respect to any other method or composition described herein.

One skilled in the art may refer to general reference texts for detailed descriptions of known techniques discussed herein or equivalent techniques. These texts include *Current Protocols in Molecular Biology* (Ausubel et. al., eds. John Wiley & Sons, N.Y. and supplements thereto), *Current Protocols in Immunology* (Coligan et al., eds., John Wiley St Sons, N.Y. and supplements thereto), *Current Protocols in Pharmacology* (Enna et al., eds. John Wiley & Sons, N.Y. and supplements thereto) and *Remington: The Science and Practice of Pharmacy* (Lippincott Williams & Wilicins, 2Vt edition (2005)), for example.

The terms "antagonist" and "antagonistic" as used herein refer to or describe an agent that is capable of, directly or indirectly, partially or fully blocking, inhibiting, reducing, or neutralizing a biological activity of a target and/or pathway. The term "antagonist" is used herein to include any agent that partially or fully blocks, inhibits, reduces, or neutralizes the activity of a protein.

The terms "modulation" and "modulate" as used herein refer to a change or an alteration in a biological activity. Modulation includes, but is not limited to, stimulating an activity or inhibiting an activity. Modulation may be an increase or a decrease in activity, a change in binding characteristics, or any other change in the biological, functional, or immunological properties associated with the activity of a protein, a pathway, a system, or other biological targets of interest.

The terms "polypeptide" and "peptide" and "protein" are used interchangeably herein and refer to polymers of amino acids of any length. The polymer may be linear or branched, it may comprise modified amino acids, and it may be interrupted by non-amino acids. The terms also encompass an amino acid polymer that has been modified naturally or by intervention, for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids), as well as other modifications known in the art. It is understood that, because the polypeptides of this invention may be based upon antibodies or other members of the immunoglobulin superfamily, in certain embodiments, a "polypeptide" can occur as a single chain or as two or more associated chains.

The terms "polynucleotide" and "nucleic acid" and "nucleic acid molecule" are used interchangeably herein and refer to polymers of nucleotides of any length, and include DNA and RNA. The nucleotides can be deoxyribonucleotides, ribonucleotides, modified nucleotides or bases, and/or their analogs, or any substrate that can be incorporated into a polymer by DNA or RNA polymerase.

The terms "identical" or percent "identity" in the context of two or more nucleic acids or polypeptides, refer to two or more sequences or subsequences that are the same or have a specified percentage of nucleotides or amino acid residues that are the same, when compared and aligned (introducing gaps, if necessary) for maximum correspondence, not considering any conservative amino acid substitutions as part of the sequence identity. The percent identity may be measured using sequence comparison software or algorithms or by visual inspection. Various algorithms and software that may be used to obtain alignments of amino acid or nucleotide sequences are well-known in the art. These include, but are not limited to, BLAST, ALIGN, Megalign, BestFit, GCG Wisconsin Package, and variants thereof. In some embodiments, two nucleic acids or polypeptides of the invention are substantially identical, meaning they have at least 70%, at least 75%, at least 80%, at least 85%, at least 90%, and in some embodiments at least 95%, 96%, 97%, 98%, 99% nucleotide or amino acid residue identity, when compared and aligned for maximum correspondence, as measured using a sequence comparison algorithm or by visual inspection. In some embodiments, identity exists over a region of the sequences that is at least about 10, at least about 20, at least about 40-60 nucleotides or amino acid residues, at least about 60-80 nucleotides or amino acid residues in length or any integral value there between. In some embodiments, identity exists over a longer region than 60-80 nucleotides or amino acid residues, such as at least about 80-100 nucleotides or amino acid residues, and in some embodiments the sequences are substantially identical over the full length of the sequences being compared, for example, the coding region of a nucleotide sequence.

A "conservative amino acid substitution" is one in which one amino acid residue is replaced with another amino acid residue having a similar side chain. Families of amino acid residues having similar side chains have been generally defined in the art, including basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). For example, substitution of a phenylalanine for a tyrosine is considered to be a conservative substitution. Generally, conservative substitutions in the sequences of polypeptides and/or antibodies of the invention do not abrogate the binding of the polypeptide or antibody containing the amino acid sequence, to the target binding site. Methods of identifying nucleotide and amino acid conservative substitutions which do not eliminate binding are well-known in the art.

The term "vector" as used herein means a construct, which is capable of delivering, and usually expressing, one or more gene(s) or sequence(s) of interest in a host cell. Examples of vectors include, but are not limited to, viral vectors, naked DNA or RNA expression vectors, plasmid, cosmid, or phage vectors, DNA or RNA expression vectors associated with cationic condensing agents, and DNA or RNA expression vectors encapsulated in liposomes.

A polypeptide, soluble protein, antibody, polynucleotide, vector, cell, or composition which is "isolated" is a polypeptide, soluble protein, antibody, polynucleotide, vector, cell, or composition which is in a form not found in nature. Isolated polypeptides, soluble proteins, antibodies, polynucleotides, vectors, cells, or compositions include those which have been purified to a degree that they are no longer in a form in which they are found in nature. In some embodiments, a polypeptide, soluble protein, antibody, polynucleotide, vector, cell, or composition which is isolated is substantially pure.

The term "substantially pure" as used herein refers to material which is at least 50% pure (i.e., free from contaminants), at least 90% pure, at least 95% pure, at least 98% pure, or at least 99% pure.

The terms "cancer" and "cancerous" as used herein refer to or describe the physiological condition in mammals in which a population of cells are characterized by unregulated cell growth. Examples of cancer include, but are not limited to, carcinoma, blastoma, sarcoma, and hematologic cancers such as lymphoma and leukemia.

The terms "tumor" and "neoplasm" as used herein refer to any mass of tissue that results from excessive cell growth or proliferation, either benign (non-cancerous) or malignant (cancerous) including pre-cancerous lesions.

The term "metastasis" as used herein refers to the process by which a cancer spreads or transfers from the site of origin to other regions of the body with the development of a similar cancerous lesion at a new location. Generally, a "metastatic" or "metastasizing" cell is one that loses adhesive contacts with neighboring cells and migrates via the bloodstream or lymph from the primary site of disease to secondary sites throughout the body.

The terms "cancer stem cell" and "CSC" and "tumor stem cell" and "tumor initiating cell" are used interchangeably herein and refer to cells from a cancer or tumor that: (1) have extensive proliferative capacity; 2) are capable of asymmetric cell division to generate one or more types of differentiated cell progeny wherein the differentiated cells have reduced proliferative or developmental potential; and (3) are capable of symmetric cell divisions for self-renewal or self-maintenance.

Without being bound by theory, a cancer stem cell can have a variety of cellular properties. For instance, a cancer stem cell can re-grow a tumor as demonstrated by its ability to form tumors in an immuno-compromised mammal such as a mouse, and can form tumors upon subsequent serial transplantation in immuno-compromised mammal such as a mouse. Cancer stem cells can divide asymmetrically and symmetrically and can show variable rates of proliferation. Additionally, a cancer stem cell can grow in vitro under established cancer stem cell conditions such as in a serum-free medium and/or in suspension or on low-attachment plates.

The terms "cancer cell" and "tumor cell" refer to the total population of cells derived from a cancer or tumor or pre-cancerous lesion, including both non-tumorigenic cells, which comprise the bulk of the cancer cell population, and tumorigenic stem cells (cancer stem cells). As used herein, the terms "cancer cell" or "tumor cell" will be modified by the term "non-tumorigenic" when referring solely to those cells lacking the capacity to renew and differentiate to distinguish those tumor cells from cancer stem cells.

The term "tumorigenic" as used herein refers to the functional features of a cancer stem cell including the properties of self-renewal (giving rise to additional tumorigenic cancer stem cells) and proliferation to generate all other tumor cells (giving rise to differentiated and thus non-tumorigenic tumor cells).

The term "tumorigenicity" as used herein refers to the ability of a random sample of cells from the tumor to form palpable tumors upon serial transplantation into appropriate hosts (e.g., mice).

The term "subject" refers to any animal (e.g., a mammal), including, but not limited to, humans, non-human primates, canines, felines, rabbits, rodents, and the like, which is to be the recipient of a particular treatment. Typically, the terms "subject" and "patient" are used interchangeably herein in reference to a human subject.

The term "pharmaceutically acceptable" refers to a substance approved or approvable by a regulatory agency of the Federal government or a state government or listed in the U.S. Pharmacopeia or other generally recognized pharmacopeia for use in animals, including humans.

The terms "pharmaceutically acceptable excipient, carrier, or adjuvant" or "acceptable pharmaceutical carrier" refer to an excipient, carrier, or adjuvant that can be administered to a subject, together with at least one agent of the present disclosure, and which does not destroy the pharmacological activity thereof and is non-toxic when administered in doses sufficient to deliver a therapeutic effect. In general, those of skill in the art and the U.S. FDA consider a pharmaceutically acceptable excipient, carrier, or adjuvant to be an inactive ingredient of any formulation.

The terms "effective amount" or "therapeutically effective amount" or "therapeutic effect" refer to an amount of an agent described herein, an antibody, a polypeptide, a polynucleotide, a small organic molecule, or other drug effective to "treat" a disease or disorder in a subject such as, a mammal. In the case of cancer or a tumor, the therapeutically effective amount of an agent (e.g., polynucleotide or small molecule) has a therapeutic effect and as such can enhance or boost the immune response, enhance or boost the anti-tumor response, increase cytolytic activity of immune cells, increase killing of tumor cells, increase killing of tumor cells by immune cells, reduce the number of tumor cells; decrease tumorigenicity, tumorigenic frequency, or tumorigenic capacity; reduce the number or frequency of cancer stem cells; reduce the tumor size; reduce the cancer cell population; inhibit or stop cancer cell infiltration into peripheral organs including, for example, the spread of cancer into soft tissue and bone; inhibit and stop tumor or cancer cell metastasis; inhibit and stop tumor or cancer cell growth; relieve to some extent one or more of the symptoms associated with the cancer; reduce morbidity and mortality; improve quality of life; or a combination of such effects.

The terms "treating" or "treatment" or "to treat" or "alleviating" or "to alleviate" refer to both (1) therapeutic measures that cure, slow down, lessen symptoms of, and/or halt progression of a diagnosed pathologic condition or disorder and (2) prophylactic or preventative measures that prevent or slow the development of a targeted pathologic condition or disorder. Thus those in need of treatment include those already with the disorder; those prone to have the disorder; and those in whom the disorder is to be prevented. In the case of cancer or a tumor, a subject is successfully "treated" according to the methods of the present invention if the patient shows one or more of the following: a reduction in tumorigenicity, a reduction in the number or frequency of cancer stem cells, an increased immune response, an increased anti-tumor response, increased cytolytic activity of immune cells, increased killing of tumor cells, increased killing of tumor cells by immune cells, a reduction in the number of or complete absence of cancer cells; a reduction in the tumor size; inhibition of or an absence of cancer cell infiltration into peripheral organs including the spread of cancer cells into soft tissue and bone; inhibition of or an absence of tumor or cancer cell metastasis; inhibition or an absence of cancer growth; relief of one or more symptoms associated with the specific cancer; reduced morbidity and mortality; improvement in quality of life; or some combination of effects.

The term "and/or" as used in a phrase such as "A and/or B" herein is intended to include both A and B; A or B; A (alone); and B (alone). Likewise, the term "and/or" as used in a phrase such as "A, B. and/or C" is intended to encompass each of the following embodiments: A. B, and C; A, B. or C; A or C; A or B; B or C; A and C; A and B; B and C; A (alone), B (alone); and C (alone).

In one embodiment, the invention provides a method of treating cancer in a subject, comprising administering to the subject a therapeutically effective amount of an agent that inhibits the activity of ZSCAN4 in cancer cells in the subject, thereby treating the cancer.

In another embodiment, the invention provides a composition for treating cancer in a subject, comprising an effective amount of an agent as provided herein that inhibits the activity of ZSCAN4 in cancer cells in a subject and a pharmaceutically acceptable carrier.

In some embodiments, ZSCAN4 is contained in a complex, and the activity of ZSCAN4 that is inhibited is an activity of the ZSCAN4 containing complex. As used herein, "inhibits the activity of ZSCAN4" includes the inhibition of a ZSCAN4 containing complex as well as inhibiting the activity of ZSCAN4 that is not contained in a complex.

In some embodiments, the activity of ZSCAN4 that is inhibited is in cancer stem cells.

In some embodiments, the method inhibits growth of the cancer stem cells.

In some embodiments, the method inhibits maintenance of a cancer stem cell phenotype.

In some embodiments, the method inhibits ubiquitination of histone 2B in the cancer cells.

In some embodiments, the method inhibits histone 3 hyperacetylation in chromatin of the cancer cells.

In some embodiments, the method inhibits upregulaton of OCT3/4 and NANOG in the cancer cells.

In some embodiments, the method inhibits upregulation of cancer stem cell factors in the cancer cells.

In some embodiments, the method inhibits ability of the cancer cells to form tumorspheres.

In some embodiments, the method inhibits tumor growth.

Examples of cancer stem cells wherein the activity of ZSCAN4 is inhibited by an agent of the invention include cancer stem cells from leukemias, such as acute leukemia, acute lymphocytic leukemia, acute myelocytic leukemias, such as, myeloblastic, promyelocytic, myelomonocytic, monocytic, and erythroleukemia leukemias and myelodysplastic syndrome (MDS); chronic leukemias, such as but not limited to, chronic myelocytic (granulocytic) leukemia, chronic lymphocytic leukemia, hairy cell leukemia; polycythemia vera; lymphomas such as but not limited to Hodgkin's disease, non-Hodgkin's disease; multiple myelomas such as but not limited to smoldering multiple myeloma, nonsecretory myeloma, osteosclerotic myeloma, plasma cell leukemia, solitary plasmacytoma and extramedullary plasmacytoma; Waldenstrom's macroglobulinemia; monoclonal gammopathy of undetermined significance; benign monoclonal gammopathy; heavy chain disease; bone and connective tissue sarcomas such as but not limited to bone sarcoma, osteosarcoma, chondrosarcoma, Ewing's sarcoma, malignant giant cell tumor, fibrosarcoma of bone, chordoma, periosteal sarcoma, soft-tissue sarcomas, angiosarcoma (hemangiosarcoma), fibrosarcoma, Kaposi's sarcoma, leiomyosarcoma, liposarcoma, lymphangiosarcoma, neurilemmoma, rhabdomyosarcoma, synovial sarcoma; brain tumors such as but not limited to, glioma, astrocytoma, brain stem glioma, ependymoma, oligodendroglioma, nonglial tumor, acoustic neurinoma, craniopharyngioma, medulloblastoma, meningioma, pineocytoma, pineoblastoma, primary brain lymphoma; breast cancer including but not limited to ductal carcinoma, adenocarcinoma, lobular (small cell) carcinoma, intraductal carcinoma, medullary breast cancer, mucinous breast cancer, tubular breast cancer, papillary breast cancer, Paget's disease, and inflammatory breast cancer; adrenal cancer such as but not limited to pheochromocytoma and adrenocortical carcinoma; thyroid cancer such as but not limited to papillary or follicular thyroid cancer, medullary thyroid cancer and anaplastic thyroid cancer; pancreatic cancer such as but not limited to, insulinoma, gastrinoma, glucagonoma, vipoma, somatostatin-secreting tumor, and carcinoid or islet cell tumor; pituitary cancers such as but limited to Cushing's disease, prolactin-secreting tumor, acromegaly, and diabetes insipius; eye cancers such as but not limited to ocular melanoma such as iris melanoma, choroidal melanoma, and cilliary body melanoma, and retinoblastoma; vaginal cancers such as squamous cell carcinoma, adenocarcinoma, and melanoma; vulvar cancer such as squamous cell carcinoma, melanoma, adenocarcinoma, basal cell carcinoma, sarcoma, and Paget's disease; cervical cancers such as but not limited to, squamous cell carcinoma, and adenocarcinoma; uterine cancers such as but not limited to endometrial carcinoma and uterine sarcoma; ovarian cancers such as but not limited to, ovarian epithelial carcinoma, borderline tumor, germ cell tumor, and stromal tumor; esophageal cancers such as but not limited to, squamous cancer, adenocarcinoma, adenoid cystic carcinoma, mucoepidermoid carcinoma, adenosquamous carcinoma, sarcoma, melanoma, plasmacytoma, verrucous carcinoma, and oat cell (small cell) carcinoma; stomach cancers such as but not limited to, adenocarcinoma, fungaling (polypoid), ulcerating, superficial spreading, diffusely spreading, malignant lymphoma, liposarcoma, fibrosarcoma, and carcinosarcoma; colon cancers; rectal cancers; liver cancers such as but not limited to hepatocellular carcinoma and hepatoblastoma; gallbladder cancers such as adenocarcinoma; cholangiocarcinomas such as but not limited to papillary, nodular, and diffuse; lung cancers such as non-small cell lung cancer, squamous cell carcinoma (epidermoid carcinoma), adenocarcinoma, large-cell carcinoma and small-cell lung cancer; testicular cancers such as but not limited to germinal tumor, seminoma, anaplastic, classic (typical), spermatocytic, nonseminoma, embryonal carcinoma, teratoma carcinoma, choriocarcinoma (yolk-sac tumor), prostate cancers such as but not limited to, prostatic intraepithelial neoplasia, adenocarcinoma, leiomyosarcoma, and rhabdomyosarcoma; penal cancers; oral cancers such as but not limited to squamous cell carcinoma; basal cancers; salivary gland cancers such as but not limited to adenocarcinoma, mucoepidermoid carcinoma, and adenoidcystic carcinoma; pharynx cancers such as but not limited to squamous cell cancer, and verrucous; skin cancers such as but not limited to, basal cell carcinoma, squamous cell carcinoma and melanoma, superficial spreading melanoma, nodular melanoma, lentigo malignant melanoma, acral lentiginous melanoma; kidney cancers such as but not limited to renal cell carcinoma, adenocarcinoma, hypernephroma, fibrosarcoma, transitional cell cancer (renal pelvis and/or uterer); Wilms' tumor; bladder cancers such as but not limited to transitional cell carcinoma, squamous cell cancer, adenocarcinoma, carcinosarcoma. In addition, cancers include myxosarcoma, osteogenic sarcoma, endothelio sarcoma, lymphangioendotheliosarcoma, mesothelioma, synovioma, hemangioblastoma, epithelial carcinoma, cystadenocarcinoma, bronchogenic carcinoma, sweat gland carcinoma, sebaceous gland carcinoma, papillary carcinoma and papillary adenocarcinomas.

In one embodiment, the cancer stem cells wherein the activity of ZSCAN4 is inhibited by an agent of the invention include cancer stem cells from head and neck cancer. Head and neck cancer is a term used to define cancer that develops in the mouth, throat, nose, salivary glands, oral cancers or other areas of the head and neck. Most of these cancers are squamous cell carcinomas, or cancers that begin in the lining of the mouth, nose and throat. In one embodiment, the cancer is head and neck squamous cell carcinoma.

In some embodiments, the "effective amount" of the agent is sufficient to reduce the growth of cancer stem cells by any degree. Any assay known in the art can be used to measure cancer stem cell growth. For example, cancer stem cell growth can be measured by colony count, total cell count, or volume/size of a cell population or colony. In some embodiments, cancer stem cell growth can be measured by the tumorsphere growth described below in the Example.

In some embodiments, an effective amount of an agent that can inhibit the activity of ZSCAN4 can be measured by at least a 5%, 10%, 15%, 20%, 30%, 40%, 50%, 60%, 70%, 80%, 90%, 95%, 96%, 97%, 98%, 99%, or 100% reduction in the cancer stem cell population or tumorsphere growth, or any percentage in between any of the aforementioned numbers.

In some embodiments, an effective amount of an agent that can inhibit the activity of ZSCAN4 can be measured by at least about 5%-99%, a 5%-80%, a 5 to 40%, a 10% to 99%, a 10 to 80%, a 10-60%, a 10%-40%, a 20 to 99%, a 20%-80%, a 20%-60%, a 20%-40%, a 50%-98%, 50%-80%, or a 60%-99% reduction in the cancer stem cell population or tumorsphere growth.

In some embodiments, an effective amount of an agent that can inhibit the activity of ZSCAN4 can be measured by at least about a 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 10, 25, 50, 75, 100, 200, or 1000-fold reduction in the cancer stem cell population or tumorsphere growth, or any fold-reduction in between any of the aforementioned numbers.

In some embodiments, the method of treating cancer comprises administering to the subject a therapeutically effective amount of an agent that inhibits the activity of ZSCAN4 as described herein. In certain embodiments, the subject is a human. In certain embodiments, the subject has a tumor or the subject had a tumor which was at least partially removed. In some embodiments, a method of treating cancer in a subject comprises administering to the subject a therapeutically effective amount of polynucleotide that inhibits expression of ZSCAN4 or RNF20.

In some embodiments, the invention provides use of an agent that inhibits the activity of ZSCAN4 described herein in the manufacture or preparation of a medicament for treating cancer. In certain embodiments, the cancer comprises cancer stem cells. In certain embodiments, the frequency of cancer stem cells in the tumor is reduced by administration of the composition. In some embodiments, a method of reducing the frequency of cancer stem cells in a tumor in a subject, comprising administering to the subject a therapeutically effective amount of an agent that inhibits the activity of ZSCAN4 is provided.

In addition, the invention provides a method of reducing the tumorigenicity of a tumor in a subject, comprising administering to the subject a therapeutically effective amount of an agent that inhibits the activity of ZSCAN4 described herein. In certain embodiments, the tumor comprises cancer stem cells. In some embodiments, the tumorigenicity of a tumor is reduced by reducing the frequency of cancer stem cells in the tumor. In some embodiments, the methods comprise using the agent that inhibits the activity of ZSCAN4 described herein. In certain embodiments, the frequency of cancer stem cells in the tumor is reduced by administration of a composition that inhibits the activity of ZSCAN4 described herein. In some embodiments, a method of reducing the tumorigenicity of a tumor in a subject comprises administering to the subject a therapeutically effective amount of polynucleotide that inhibits expression of ZSCAN4 or RNF20.

In some embodiments, the cancer comprises a tumor that is a solid tumor. In some embodiments, the tumor is a primary tumor. In some embodiments, the tumor is a secondary tumor comprising cells that have metastasized. In certain embodiments, the tumor is a tumor selected from the group consisting of: colorectal tumor, pancreatic tumor, lung tumor, ovarian tumor, liver tumor, breast tumor, kidney tumor, prostate tumor, neuroendocrine tumor, gastrointestinal tumor, melanoma, cervical tumor, bladder tumor, glioblastoma, and head and neck tumor. In certain embodiments, the tumor is a head and neck tumor. In certain embodiments, the tumor is an ovarian tumor. In some embodiments, the tumor is a lung tumor. In certain embodiments, the tumor is a pancreatic tumor. In certain embodiments, the tumor is a melanoma tumor.

In some embodiments, the cancer is a hematologic cancer. In some embodiments, the hematologic cancer is a leukemia. In other embodiments, the hematologic cancer is a lymphoma. In some embodiment, the cancer is selected from the group consisting of: acute myelogenous leukemia (AML), Hodgkin lymphoma, multiple myeloma. T-cell acute lymphoblastic leukemia (T-ALL), chronic lymphocytic leukemia (CLL), hairy cell leukemia, chronic myelogenous leukemia (CML), non-Hodgkin lymphoma, diffuse large B-cell lymphoma (DLBCL), mantle cell lymphoma (MCL), and cutaneous T-cell lymphoma (CTCL).

In some embodiments, an agent that inhibits the activity of ZSCAN4 acts as an antagonist of ZSCAN4 or a ZSCAN4 containing complex. In some embodiments, the ZSCAN4 containing complex comprises RNF20.

In some embodiments, the agent binds to ZSCAN4 and inhibits its activity.

In some embodiments, the agent binds to RNF20 and inhibits its activity.

In some embodiments, the agent disrupts the interaction between ZSCAN4 and one or more components of a ZSCAN4-containing complex.

In some embodiments, the agent disrupts the interaction between one or more components of the ZSCAN4 containg complex with one or more other components of the ZSCAN4-containing complex.

In some embodiments, the composition comprises an agent that disrupts the interaction between ZSCAN4 and RNF20.

In some embodiments, the agent is a dominant negative version of ZSCAN4 or RNF20.

In some embodiments the agent is an RNF20 inhibitor. In some embodiments, the agent is arsenite.

In some embodiments, the agent is a small inhibitory peptides to inhibit the interaction between ZSCAN4 and RNF20. In some embodiments, the peptide is formulated in a nanoparticle for delivery to the cell.

n some embodiments, an agent that inhibits the activity of ZSCAN4 acts by modulating expression of ZSCAN4 or one or more components of a ZSCAN4 containing complex. The expression can be at the mRNA level, protein level or both. In some embodiments, the agent modulates the expression by reducing or inhibiting expression of ZSCAN4 and/or one or more components of a ZSCAN4 containing complex.

In some embodiments, an agent useful in the methods of the invention comprises a nucleic acid molecule. In some embodiments, the nucleic acid molecule is capable of modulating the expression of ZSCAN4 or a component of a ZSCAN4 containing complex, including RFN20. In some embodiments, the nucleic acid molecule comprises a nucleotide sequence that binds to at least a portion of a nucleotide sequence of ZSCAN4 or RNF20. The nucleic acid molecule can be of any length, so long as at least part of the molecule hybridizes sufficiently and specifically to ZSCAN4 or RNF20 mRNA. The nucleic acid molecule can bind to any region of the mRNA. In some embodiments, the nucleotide sequence of ZSCAN4 cDNA is shown in SEQ ID NO: 1 (NCBI Reference Sequence: AK092424.1). In some embodiments, the nucleotide sequence of RNF20 cDNA is shown in SEQ ID NO: 2 (NCBI Reference Sequence: AF265230.1).

In some embodiments, a region of the nucleic acid molecule is at least 70%, 75%, 80%, 85%, 90%, 91%, 92%, 93%, 94%, 95%, 96%, 97%, 98% or 99% complementary to at least a portion of SEQ ID NO:1 or 2.

In some embodiments, the composition can comprise a DNA molecule, such as an antisense DNA molecule. In some embodiments, the composition can comprise an RNA molecule, such as an anti-sense RNA molecule, a small interfering RNA (siRNA) molecule, or small hairpin RNA (shRNA) molecule, which may or may not be comprised on a vector, including a viral vector (such as an adeno-associated viral vector, an adenoviral vector, a retroviral vector, or a lentiviral vector) or a non-viral vector. In some embodiments, the expression of the DNA or RNA molecule may be regulated by a regulatory region present in the cancer cells.

In some embodiments, the composition comprises a nucleic acid comprising a ZSCAN4 shRNA selected from SEQ ID NO:3: 5'-GAGAACGGTCCTAGGCCTGT-CAAGAGGAGAACGGTCCTAGGCCTG-3';
SEQ ID NO:4: 5'-GATATCAGACCTACGGGTGT-CAAGAGGATATCAGACCTACGGGTG-3';
and SEQ ID NO:5: 5'-CTCGAGTAAATGAAAATATT-CAAGAGCTCGAGTAAATGAAAATAT-3.

The ZSCAN4-inhibiting agent can be an RNA interference molecule, the RNA interference molecule may be a shRNA, siRNA, miRNA, or guide RNA to CRISPR/CAS9 CRISPRi, etc.

Combinations of shRNAs can also be used in accordance with the present invention.

In some embodiments, the RNF20 inhibitory agent comprises an siRNA. In some embodiments, the siRNA comprises SEQ ID NO:6 (GCUAAACAGUGGAGAUAAU). In some embodiments, the siRNA comprises SEQ ID NO:7 (GUAUCAUCCUUAAACGUUA). SMARTpool siRNA reagent targeting human RNF20 (Dharmacon) can also be used.

A target sequence on a target mRNA can be selected from a given cDNA sequence corresponding to ZSCAN4 or RNF20, in some embodiments, beginning 50 to 100 nt downstream (i.e., in the 3' direction) from the start codon. In some embodiments, the target sequence can, however, be located in the 5' or 3' untranslated regions, or in the region nearby the start codon.

In one embodiment, the composition comprises a nucleic acid molecule that comprises a nucleotide sequence that binds to at least a portion of a nucleotide sequence of ZSCAN4 or RNF20 mRNA. In some embodiments, the nucleic acid molecule is a DNA. In some embodiments, the nucleic acid molecule is an RNA.

In some embodiments, the composition comprises an anti-sense DNA. Anti-sense DNA binds with mRNA and prevents translation of the mRNA. The anti-sense DNA can be complementary to a portion of ZSCAN4 or RNF20 mRNA. In some embodiments, the anti-sense DNA is complementary to the entire reading frame. In some embodiments, the anti-sense DNA is complementary to the entire reading frame of SEQ ID NO:1. In some embodiments, the antisense DNA is complementary to a portion of SEQ ID NO:1. In some embodiments, the anti-sense DNA is complementary to the entire reading frame of SEQ ID NO:2. In some embodiments, the antisense DNA is complementary to a portion of SEQ ID NO:2. In some embodiments, the antisense DNA is at least 15 nucleotides, at least 20 nucleotides, at least 25 nucleotides, at least 30 nucleotides, at least 35 nucleotides, at least 40 nucleotides, at least 50 nucleotides, at least 75 nucleotides, at least 100 nucleotides, at least 150 nucleotides, at least 200 nucleotides, at least 300 nucleotides, at least 400 nucleotides, at least 500 nucleotides, at least 600 nucleotides, at least 700 nucleotides, at least 800 nucleotides, at least 900 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, or at least 4500 nucleotides.

In some embodiments, the composition comprises an anti-sense RNA. Anti-sense RNA binds with mRNA and prevents translation of the mRNA. The anti-sense RNA can be complementary to a portion of ZSCAN4 or RNF20 mRNA. In some embodiments, the anti-sense RNA is complementary to the entire reading frame of ZSCAN4 or RNF20. In some embodiments, the anti-sense RNA is complementary to the entire reading frame of SEQ ID NO:1. In some embodiments, the antisense RNA is complementary to a portion of SEQ ID NO:1. In some embodiments, the anti-sense RNA is complementary to the entire reading frame of SEQ ID NO:2. In some embodiments, the antisense RNA is complementary to a portion of SEQ ID NO:2. In some embodiments, the antisense RNA is at least 15 nucleotides, at least 20 nucleotides, at least 25 nucleotides, at least 30 nucleotides, at least 35 nucleotides, at least 40 nucleotides, at least 50 nucleotides, at least 75 nucleotides, at least 100 nucleotides, at least 150 nucleotides, at least 200 nucleotides, at least 300 nucleotides, at least 400 nucleotides, at least 500 nucleotides, at least 600 nucleotides, at least 700 nucleotides, at least 800 nucleotides, at least 900 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, or at least 4500 nucleotides.

In some embodiments, the composition is an siRNA targeting ZSCAN4 or RNF20. SiRNAs are small single or dsRNAs that do not significantly induce the antiviral response common among vertebrate cells but that do induce target mRNA degradation via the RNAi pathway. The term siRNA refers to RNA molecules that have either at least one double stranded region or at least one single stranded region and possess the ability to effect RNA interference (RNAi). It is specifically contemplated that siRNA can refer to RNA molecules that have at least one double stranded region and possess the ability to effect RNAi. The dsRNAs (siRNAs) may be generated by various methods including chemical synthesis, enzymatic synthesis of multiple templates, digestion of long dsRNAs by a nuclease with RNAse III domains, and the like. An "siRNA directed to" at least a particular region of ZSCAN4 or RNF20 means that a particular ZSCAN4 or RNF20 siRNA includes sequences that result in the reduction or elimination of expression of the target gene, i.e., the siRNA is targeted to the region or gene.

The nucleotide sequence of the siRNA is defined by the nucleotide sequence of its target gene. The ZSCAN4 or RNF20 siRNA contains a nucleotide sequence that is essentially identical to at least a portion of the target gene. In some embodiments, the siRNA contains a nucleotide sequence that is completely identical to at least a portion of the ZSCAN4 or RNF20 gene. Of course, when comparing an RNA sequence to a DNA sequence, an "identical" RNA sequence will contain ribonucleotides where the DNA sequence contains deoxyribonucleotides, and further that the RNA sequence will typically contain a uracil at positions where the DNA sequence contains thymidine.

In some embodiments, a ZSCAN4 or RNF20 siRNA comprises a double stranded structure, the sequence of which is "substantially identical" to at least a portion of the target gene. "Identity," as known in the art, is the relationship between two or more polynucleotide (or polypeptide) sequences, as determined by comparing the sequences. In the art, identity also means the degree of sequence relatedness between polynucleotide sequences, as determined by the match of the order of nucleotides or amino acids between such sequences. Unless otherwise stated, sequence identity/similarity values provided herein refer to the value obtained using the BLAST 2.0 suite of programs using default parameters (Altschul, et al., (1997) Nucleic Acids Res. 25:3389-402).

One of skill in the art will appreciate that two polynucleotides of different lengths may be compared over the entire length of the longer fragment. Alternatively, small regions may be compared. Normally sequences of the same length are compared for a final estimation of their utility in the practice of the present invention. In some embodiments, there is 100% sequence identity between the dsRNA for use as siRNA and at least 15 contiguous nucleotides of the target gene, although a dsRNA having 70%, 75%, 80%, 85%, 90%, or 95% or greater may also be used in the present invention. A siRNA that is essentially identical to a least a portion of the target gene may also be a dsRNA wherein one of the two complementary strands (or, in the case of a self-complementary RNA, one of the two self-complementary portions) is either identical to the sequence of that portion or the target gene or contains one or more insertions, deletions or single point mutations relative to the nucleotide sequence of that portion of the target gene. siRNA technology thus has the property of being able to tolerate sequence variations that might be expected to result from genetic mutation, strain polymorphism, or evolutionary divergence.

In some embodiments, the invention provides an ZSCAN4 or RNF20 siRNA that is capable of triggering RNA interference, a process by which a particular RNA sequence is destroyed (also referred to as gene silencing). In specific embodiments, GPR64 siRNA are dsRNA molecules that are 100 bases or fewer in length (or have 100 base pairs or fewer in its complementarity region). In some embodiments, a dsRNA may be 15, 16, 17, 18, 19, 20, 21, 22, 23, 24, 25, 26, 27, 28, 29, 30, 40, 50, 60, 70, 80, 90, 100 110, 120, 130, 140, 150, 160, 170, 180, 190, 200, 225, 250, 275, 300, 325, 350, 375, 400, 450, 500, 550, 600, 650, 700, 750, 800, 850, 900, 950, or 1000 nucleotides or more in length. In certain embodiments, ZSCAN4 or RNF20 siRNA may be approximately 21 to 25 nucleotides in length. In some cases, it has a two nucleotide 3' overhang and a 5' phosphate. The particular ZSCAN4 or RNF20 RNA sequence is targeted as a result of the complementarity between the dsRNA and the particular ZSCAN4 or RNF20 RNA sequence. It will be understood that dsRNA or siRNA of the disclosure can effect at least a 20, 30, 40, 50, 60, 70, 80, 90 percent or more reduction of expression of a targeted ZSCAN4 or RNF20 RNA in target cell. dsRNA of the invention (the term "dsRNA" will be understood to include "siRNA" and/or "candidate siRNA") is distinct and distinguishable from antisense and ribozyme molecules by virtue of the ability to trigger RNAi. Structurally, dsRNA molecules for RNAi differ from antisense and ribozyme molecules in that dsRNA has at least one region of complementarity within the RNA molecule. In some embodiments, the complementary (also referred to as "complementarity") region comprises at least or at most 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 contiguous bases. In some embodiments, long dsRNA are employed in which "long" refers to dsRNA that are 1000 bases or longer (or 1000 base pairs or longer in complementarity region). The term "dsRNA" includes "long dsRNA", "intermediate dsRNA" or "small dsRNA" (lengths of 2 to 100 bases or base pairs in complementarity region) unless otherwise indicated. In some embodiments, dsRNA can exclude the use of siRNA, long dsRNA, and/or "intermediate" dsRNA (lengths of 100 to 1000 bases or base pairs in complementarity region).

It is specifically contemplated that a dsRNA may be a molecule comprising two separate RNA strands in which one strand has at least one region complementary to a region on the other strand. Alternatively, a dsRNA includes a molecule that is single stranded yet has at least one complementarity region as described above (such as when a single strand with a hairpin loop is used as a dsRNA for RNAi). For convenience, lengths of dsRNA may be referred to in terms of bases, which simply refers to the length of a single strand or in terms of base pairs, which refers to the length of the complementarity region. It is specifically contemplated that embodiments discussed herein with respect to a dsRNA comprised of two strands are contemplated for use with respect to a dsRNA comprising a single strand, and vice versa. In a two-stranded dsRNA molecule, the strand that has a sequence that is complementary to the targeted mRNA is referred to as the "antisense strand" and the strand with a sequence identical to the targeted mRNA is referred to as the "sense strand." Similarly, with a dsRNA comprising only a single strand, it is contemplated that the "antisense region" has the sequence complementary to the targeted mRNA, while the "sense region" has the sequence identical to the targeted mRNA. Furthermore, it will be understood that sense and antisense region, like sense and antisense strands, are complementary (i.e., can specifically hybridize) to each other.

Strands or regions that are complementary may or may not be 100% complementary ("completely or fully complementary"). It is contemplated that sequences that are "complementary" include sequences that are at least 50% complementary, and may be at least 50%, 60%, 70%, 80%, or 90% complementary. In some embodiments, siRNA generated from sequence based on one organism may be used in a different organism to achieve RNAi of the cognate target gene. In other words, siRNA generated from a dsRNA that corresponds to a human gene may be used in a mouse cell if there is the requisite complementarity, as described above. Ultimately, the requisite threshold level of complementarity to achieve RNAi is dictated by functional capability. It is specifically contemplated that there may be mismatches in the complementary strands or regions. Mismatches may number at most or at least 1, 2, 3, 4, 5, 6, 7, 8, 9, 10, 11, 12, 13, 14, 15, 16, 17, 18, 19, 20, 21, 22, 23, 24, 25 residues or more, depending on the length of the complementarity region.

In some embodiments, the single RNA strand or each of two complementary double strands of a dsRNA molecule may be of at least or at most the following lengths: 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, or more (including the full-length ZSCAN4 or RNF20 mRNA without the poly-A tail) bases or base pairs. If the dsRNA is composed of two separate strands, the two strands may be the same length or different lengths. If the dsRNA is a single strand, in addition to the complementarity region, the strand may have 1, 2, 3, 4, 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more bases on either or both ends (5' and/or 3') or as forming a hairpin loop between the complementarity regions.

In some embodiments, the strand or strands of dsRNA are 100 bases (or base pairs) or less. In specific embodiments the strand or strands of the dsRNA are less than 70 bases in length. With respect to those embodiments, the dsRNA strand or strands may be from 5-70, 10-65, 20-60, 30-55, 40-50 bases or base pairs in length. A dsRNA that has a complementarity region equal to or less than 30 base pairs (such as a single stranded hairpin RNA in which the stem or complementary portion is less than or equal to 30 base pairs) or one in which the strands are 30 bases or fewer in length is specifically contemplated, as such molecules evade a mammalian's cell antiviral response. Thus, a hairpin dsRNA (one strand) may be 70 or fewer bases in length with a complementary region of 30 base pairs or fewer. In some cases, a dsRNA may be processed in the cell into siRNA.

The siRNA of the invention can comprise partially purified RNA, substantially pure RNA, synthetic RNA, or recombinantly produced RNA, as well as altered RNA that differs from naturally-occurring RNA by the addition, deletion, substitution and/or alteration of one or more nucleotides. Such alterations can include addition of non-nucleotide material, such as to the end(s) of the siRNA or to one or more internal nucleotides of the siRNA, including modifications that make the siRNA resistant to nuclease digestion.

One or both strands of the siRNA of the disclosure can comprise a 3' overhang. As used herein, a "3' overhang" refers to at least one unpaired nucleotide extending from the 3'-end of a duplexed RNA strand.

Thus in some embodiments, the ZSCAN4 or RNF20 siRNA of the invention comprises at least one 3' overhang of from 1 to about 6 nucleotides (which includes ribonucleotides or deoxynucleotides) in length, from 1 to about 5 nucleotides in length, from 1 to about 4 nucleotides in length, or from about 2 to about 4 nucleotides in length.

In some embodiments in which both strands of the ZSCAN4 or RNF20 siRNA molecule comprise a 3' overhang, the length of the overhangs can be the same or different for each strand. In some embodiments, the 3' overhang is present on both strands of the siRNA, and is 2 nucleotides in length. For example, each strand of the ZSCAN4 or RNF20 siRNA of the invention can comprise 3' overhangs of dithymidylic acid ("TT") or diuridylic acid ("UU").

In order to enhance the stability of the present ZSCAN4 or RNF20 siRNA, the 3' overhangs can be also stabilized against degradation. In some embodiments, the overhangs are stabilized by including purine nucleotides, such as adenosine or guanosine nucleotides. In some embodiments, substitution of pyrimidine nucleotides by modified analogues, e.g., substitution of uridine nucleotides in the 3' overhangs with 2'-deoxythymidine, is tolerated and does not affect the efficiency of RNAi degradation. In particular, the absence of a 2' hydroxyl in the 2'-deoxythymidine can significantly enhance the nuclease resistance of the 3' overhang in tissue culture medium.

In some embodiments, the ZSCAN4 or RNF20 siRNA of the disclosure can be targeted to any stretch of approximately 19-25 contiguous nucleotides in any of the target mRNA sequences (the "target sequence"). Techniques for selecting target sequences for siRNA are given, for example, in Tuschl T et al., "The siRNA User Guide," revised Oct. 11, 2002, the entire disclosure of which is herein incorporated by reference. "The siRNA User Guide" is available on the world wide web at a website maintained by Dr. Thomas Tuschl, Department of Cellular Biochemistry, AG 105, Max-Planck-Institute for Biophysical Chemistry, 37077 Gottingen, Germany, and can be found by accessing the website of the Max Planck Institute and searching with the keyword "siRNA." Thus, in some embodiments, the sense strand of the present siRNA comprises a nucleotide sequence identical to any contiguous stretch of about 19 to about 25 nucleotides in the target mRNA.

In some embodiments, the siRNA comprises a 21 nucleotide double stranded sequence. In some embodiments, the siRNA comprises a two-TT overhang (Yang et al., Nucleic Acid Research, 34(4), 1224-1236, 2006).

In some embodiments, the composition useful in the methods of the invention comprises an shRNA molecule that targets ZSCAN4 or RNF20 mRNA (ZSCAN4 or RNF20 shRNA). shRNA is an artificial RNA molecule with a tight hairpin turn that can be used to silence target gene expression via RNA interference (RNAi). In certain cases, expression of ZSCAN4 or RNF20 shRNA in cells is achieved through delivery of non-viral vectors (such as plasmids or bacterial vectors) or through viral vectors. shRNA is useful because it has a relatively low rate of degradation and turnover.

In order to obtain long-term gene silencing, expression vectors that continually express siRNAs in stably transfected mammalian cells can be used (Brummelkamp et al., Science 296: 550-553, 2002; Lee et al., Nature Biotechnol. 20:500-505, 2002; Miyagishi, M, and Taira, K. Nature Biotechnol. 20:497-500, 2002; Paddison, et al., Genes & Dev. 16:948-958, 2002; Paul et al., Nature Biotechnol. 20:505-508, 2002; Sui, Proc. Natl. Acad. Sci. USA 99(6):5515-5520, et al., 2002; Yu et al., Proc. Natl. Acad. Sci. USA 99(9):6047-6052, 2002). Many of these plasmids have been engineered to express shRNAs lacking poly (A) tails. Transcription of shRNAs is initiated at a polymerase III (pol III) promoter and is believed to be terminated at position 2 of a 4-5-thymine transcription termination site. Upon expression, shRNAs are thought to fold into a stem-loop structure with 3' UU-overhangs. Subsequently, the ends of these shRNAs are processed, converting the shRNAs into ~21 nt siRNA-like molecules. The siRNA-like molecules can, in turn, bring about gene-specific silencing in the transfected mammalian cells.

The length of the stem and loop of shRNAs can be varied. In some embodiments, stem lengths could range anywhere from 25 to 29 nucleotides and loop size could range between 4 to 23 nucleotides without affecting silencing activity. Moreover, presence of G-U mismatches between the two strands of the shRNA stem does not necessarily lead to a decrease in potency.

In some embodiments, the present invention is directed to methods of administering subjects with compositions comprising expression vectors and/or chemically synthesized shRNA molecules that target ZSCAN4 or RNF20. In some embodiments, the composition comprises a nucleotide sequence expressing a small hairpin RNA (shRNA) molecule. In some embodiments, the expression vector is a lentivirus expression vector.

In some embodiments, it is contemplated that nucleic acids or other active agents of the invention may be labeled. The label may be fluorescent, radioactive, enzymatic, or calorimetric. It is contemplated that a dsRNA may have one label attached to it or it may have more than one label attached to it. When more than one label is attached to a dsRNA, the labels may be the same or be different. If the labels are different, they may appear as different colors when visualized. The label may be on at least one end and/or it may be internal. Furthermore, there may be a label on each end of a single stranded molecule or on each end of a dsRNA made of two separate strands. The end may be the 3' and/or the 5' end of the nucleic acid. A label may be on the sense strand or the sense end of a single strand (end that is closer to sense region as opposed to antisense region), or it may be on the antisense strand or antisense end of a single strand (end that is closer to antisense region as opposed to sense region). In some cases, a strand is labeled on a particular nucleotide (G, A, U, or C). When two or more differentially colored labels are employed, fluorescent resonance energy transfer (FRET) techniques may be employed to characterize the dsRNA.

Labels contemplated for use in several embodiments are non-radioactive. In many embodiments of the invention, the labels are fluorescent, though they may be enzymatic, radioactive, or positron emitters. Fluorescent labels that may be used include, but are not limited to, BODIPY, Alexa Fluor, fluorescein, Oregon Green, tetramethylrhodamine, Texas Red, rhodamine, cyanine dye, or derivatives thereof. The labels may also more specifically be Alexa 350, Alexa 430, AMCA, BODIPY 630/650, BODIPY 650/665, BODIPY-FL, BODIPY-R6G, BODIPY-TMR, BODIPY-TRX, Cascade Blue, Cy3, Cy5, DAPI, 6-FAM, Killer Red, Fluorescein Isothiocyanate, HEX, 6-JOE, Oregon Green 488, Oregon Green 500, Oregon Green 514, Pacific Blue, REG, Rhodamine Green, Rhodamine Red, Renographin, ROX, SYPRO, TAMRA, TET, Tetramethylrhodamine, and/or Texas Red. A labeling reagent is a composition that comprises a label and that can be incubated with the nucleic acid to effect labeling of the nucleic acid under appropriate conditions. In some embodiments, the labeling reagent comprises an alkylating agent and a dye, such as a fluorescent dye. In some embodiments, a labeling reagent comprises an alkylating agent and a fluorescent dye such as Cy3, Cy5, or fluorescein (FAM). In still further embodiments, the labeling reagent is also incubated with a labeling buffer, which may be any buffer compatible with physiological function (i.e., buffers that is not toxic or harmful to a cell or cell component) (termed "physiological buffer").

In some embodiments, the nucleic acids of the invention can be modified. In some embodiments, the nucleic acids can be modified to include a phosphorothioate (PS) backbone. The modification to the backbone can be throughout the molecule or at one or more defined sites. In some embodiments, the nucleic acids can be modified to encompass peptide nucleic acids (PNA). In some embodiments, the nucleic acids can be modified to encompass phosphorodiamidate morpholino oligomers (PMO).

In some embodiments, the nucleic acid molecules of the invention can include derivatives such as S-oligonucleotides (phosphorothioate derivatives or S-oligos). S-oligos (nucleoside phosphorothioates) are isoelectronic analogs of an oligonucleotide (O-oligo) in which a nonbridging oxygen atom of the phosphate group is replaced by a sulfur atom. The S-oligos of the present invention may be prepared by treatment of the corresponding O-oligos with 3H-1,2-benzodithiol-3-one-1,1-dioxide which is a sulfur transfer reagent. See Iyer et al., *J. Org. Chem.* 55:4693-4698 (1990); and Iyer et al., *J. Am. Chem. Soc.* 112:1253-1254 (1990), the disclosures of which are fully incorporated by reference herein.

In some embodiments of the invention, a dsRNA has one or more non-natural nucleotides, such as a modified residue or a derivative or analog of a natural nucleotide. Any modified residue, derivative or analog may be used to the extent that it does not eliminate or substantially reduce (by at least 50%) RNAi activity of the dsRNA.

A person of ordinary skill in the art is well aware of achieving hybridization of complementary regions or molecules. Such methods typically involve heat and slow cooling of temperature during incubation, for example.

In some embodiments, the nucleic acid molecules of the present methods are encoded by expression vectors. The expression vectors may be obtained and introduced into a cell. Once introduced into the cell the expression vector is transcribed to produce various nucleic acids. Expression vectors include nucleic acids that provide for the transcription of a particular nucleic acid. Expression vectors include plasmid DNA, linear expression elements, circular expression elements, viral expression constructs (including adenoviral, adeno-associated viral, retroviral, lentiviral, and so forth), and the like, all of which are contemplated as being used in the compositions and methods of the present disclosure. In some embodiments one or at least 2, 3, 4, 5, 6, 7, 8, 9, 10 or more nucleic acid molecules binding to ZSCAN4 or RNF20 RNA are encoded by a single expression construct. Expression of the nucleic acid molecules binding to ZSCAN4 or RNF20 RNA may be independently controlled by at least 1, 2, 3, 4, 5, 6, 7, 8, 9, 10 or more regulatory elements. In certain embodiments, at least 1, 2, 3, 4, 5, 6, 7, 8, 9, 10 or more expression constructs can be introduced into a cell. Each expression construct can encode 1, 2, 3, 4, 5, 6, 7, 8, 9, 10 or more nucleic acid molecules binding to ZSCAN4 or RNF20 RNA. In some embodiments, nucleic acid molecules binding to ZSCAN4 or RNF20 RNA may be encoded as expression domains. Expression domains include a transcription control element, which may or may not be independent of other control or promoter elements; a nucleic acid; and optionally a transcriptional termination element.

In some embodiments, the invention provides nucleic acid molecules encoding dominant negative ZSCAN4 or RNF20, which can include dominantly negative active fragments or derivatives of the wild type sequences. In some embodiments, the nucleic acid molecule is packaged in a viral vector. In some embodiments, the dominant negative ZSCAN4 or RNF20 or biologically active fragments or derivatives thereof encodes a protein that is at least 90% identical to SEQ ID NOS:1 or 2. In some embodiments, the ZSCAN4 or RNF20 or a biologically active fragment or derivative thereof may be derived from genomic DNA, i.e., cloned directly from the genome of a particular organism. In some embodiments, however, the vector comprising ZSCAN4 or RNF20 comprises complementary DNA (cDNA).

The organismal source of ZSCAN4 or RNF20 is not limiting. In some embodiments, the ZSCAN4 or RNF20 nucleic acid sequence is derived from a mammal, bird, reptile or fish. In some embodiments, the ZSCAN4 or RNF20 is of human origin. In some embodiments, the ZSCAN4 or RNF20 is from dog, cat, horse, mouse, rat, guinea pig, sheep, cow, pig, monkey, or ape. The nucleic acid molecules may be produced using recombinant DNA technology (e.g., polymerase chain reaction (PCR) amplification, cloning) or chemical synthesis. ZSCAN4 or RNF20 nucleic acids include natural nucleic acid molecules and homologues thereof, including, but not limited to, natural allelic variants and modified nucleic acid molecules in which nucleotides have been inserted, deleted, substituted, and/or inverted in such a manner that such modifications provide the desired effect.

In some embodiments, the nucleic acid sequence encoding dominant negative ZSCAN4 or RNF20 is at least 60%, 70%, 75%, 80%, 85%, 90%, 91%, 92%, 93%, 94%, 95%, 96%, 97%, 98%, or 99% identical to the coding sequence of SEQ ID NOS:1 or 2.

Any suitable viral vector can be used in the methods of the invention. For example, vectors derived from adenovirus (AV); adeno-associated virus (AAV; including AAV serotypes); retroviruses (e.g, lentiviruses (LV), Rhabdoviruses, murine leukemia virus); herpes virus, and the like. The tropism of the viral vectors can also be modified by pseudotyping the vectors with envelope proteins or other surface antigens from other viruses. For example, an AAV vector of the invention can be pseudotyped with surface proteins from vesicular stomatitis virus (VSV), rabies, Ebola, Mokola, and the like.

Selection of recombinant viral vectors suitable for use in the invention, are within the skill in the art. See, for example, Dornburg R (1995), Gene Therap. 2: 301-310; Eglitis M A (1988), Biotechniques 6: 608-614; Miller A D (1990), Hum Gene Therap. 1: 5-14; and Anderson W F (1998), Nature 392: 25-30, the entire disclosures of which are herein incorporated by reference.

The ability of a RNA of the claimed invention to cause RNAi-mediated degradation of the target mRNA can be evaluated using standard techniques for measuring the levels of RNA or protein in cells. For example, ZSCAN4 or RNF20 siRNA of the invention can be delivered to cultured cells, and the levels of target mRNA can be measured by Northern blot or dot blotting techniques, or by quantitative RT-PCR. Alternatively, the levels of ZSCAN4 or RNF20 protein in the cultured cells can be measured by ELISA or Western blot. A suitable cell culture system for measuring the effect of the present siRNA on target mRNA or protein levels may be utilized. RNAi-mediated degradation of ZSCAN4 or RNF20 mRNA by an siRNA containing a given target sequence can also be evaluated with animal models, for example.

In some embodiments, the nucleic acids can be administered to the subject either as naked nucleic acid, in conjunction with a delivery reagent, or as a recombinant plasmid or viral vector that expresses the nucleic acids. Delivery of nucleic acids or vectors to an individual may occur by any suitable means, but in specific embodiments it occurs by one of the following: cyclodextrin delivery system; ionizable lipids; DPC conjugates; GalNAc-conjugates; self-assembly of oligonucleotide nanoparticles (DNA tetrahedra carrying multiple siRNAs); or polymeric nanoparticles made of low-molecular-weight polyamines and lipids (see Kanasty et al. Nature Materials 12, 967-977 (2013) for review of same).

Suitable delivery reagents for administration in conjunction with the present nucleic acids or vectors include at least the Mirus Transit TKO lipophilic reagent; lipofectin; lipofectamine; cellfectin; or polycations (e.g., polylysine), or liposomes. In specific embodiments, a particular delivery reagent comprises a liposome.

Liposomes can aid in the delivery of the present nucleic acids or vectors to a particular tissue, and can also increase the blood half-life of the nucleic acids. Liposomes suitable for use in the invention can be formed from standard vesicle-forming lipids, which generally include neutral or negatively charged phospholipids and a sterol, such as cholesterol. The selection of lipids is generally guided by consideration of factors such as the desired liposome size and half-life of the liposomes in the blood stream. A variety of methods are known for preparing liposomes, for example as described in Szoka et al. (1980), Ann. Rev. Biophys. Bioeng. 9: 467; and U.S. Pat. Nos. 4,235,871, 4,501,728, 4,837,028, and 5,019,369, the entire disclosures of which are herein incorporated by reference.

In certain aspects, the liposomes encapsulating the present nucleic acids comprise a ligand molecule that can target the liposome to a particular cell or tissue at or near the site of interest. Ligands that bind to receptors prevalent in the tissues to be targeted, such as monoclonal antibodies that bind to surface antigens, are contemplated. In particular cases, the liposomes are modified so as to avoid clearance by the mononuclear macrophage and reticuloendothelial systems, for example by having opsonization-inhibition moieties bound to the surface of the structure. In one embodiment, a liposome of the invention can comprise both opsonization-inhibition moieties and a ligand. Opsonization-inhibition moieties for use in preparing the liposomes of the disclosure are typically large hydrophilic polymers that are bound to the liposome membrane. As used herein, an opsonization inhibiting moiety is "bound" to a liposome membrane when it is chemically or physically attached to the membrane, e.g., by the intercalation of a lipid-soluble anchor into the membrane itself, or by binding directly to active groups of membrane lipids. These opsonization-inhibiting hydrophilic polymers form a protective surface layer which significantly decreases the uptake of the liposomes by the macrophage-monocyte system ("MMS") and reticuloendothelial system ("RES"); e.g., as described in U.S. Pat. No. 4,920,016, the entire disclosure of which is herein incorporated by reference. Liposomes modified with opsonization-inhibition moieties thus remain in the circulation much longer than unmodified liposomes. For this reason, such liposomes are sometimes called "stealth" liposomes.

Stealth liposomes are known to accumulate in tissues fed by porous or "leaky" microvasculature. Thus, target tissue characterized by such microvasculature defects, for example solid tumors, will efficiently accumulate these liposomes; see Gabizon, et al. (1988), P.N.A.S., USA, 18: 6949-53. In addition, the reduced uptake by the RES lowers the toxicity of stealth liposomes by preventing significant accumulation in the liver and spleen. Thus, liposomes of the invention that are modified with opsonization-inhibition moieties can deliver the present nucleic acids to tumor cells.

In some embodiments, opsonization inhibiting moieties suitable for modifying liposomes are water-soluble polymers with a number-average molecular weight from about 500 to about 40,000 Daltons, and in some embodiments. from about 2,000 to about 20,000 Daltons. Such polymers can include polyethylene glycol (PEG) or polypropylene glycol (PPG) derivatives; e.g., methoxy PEG or PPG, and PEG or PPG stearate; synthetic polymers such as polyacrylamide or poly N-vinyl pyrrolidone; linear, branched, or dendrimeric polyamidoamines; polyacrylic acids; polyalcohols, e.g., polyvinylalcohol and polyxylitol to which carboxylic or amino groups are chemically linked, as well as gangliosides, such as ganglioside GM1. Copolymers of PEG, methoxy PEG, or methoxy PPG, or derivatives thereof, are also suitable. In addition, the opsonization inhibiting polymer can be a block copolymer of PEG and either a polyamino acid, polysaccharide, polyamidoamine, polyethyleneamine, or polynucleotide. The opsonization inhibiting polymers can also be natural polysaccharides containing amino acids or carboxylic acids, e.g., galacturonic acid, glucuronic acid, mannuronic acid, hyaluronic acid, pectic acid, neuraminic acid, alginic acid, carrageenan; aminated polysaccharides or oligosaccharides (linear or branched); or carboxylated polysaccharides or oligosaccharides, e.g., reacted with derivatives of carbonic acids with resultant linking of carboxylic groups.

In some embodiments the opsonization-inhibiting moiety is a PEG, PPG, or derivatives thereof. Liposomes modified with PEG or PEG-derivatives are sometimes called "PEGylated liposomes." The opsonization inhibiting moiety can be bound to the liposome membrane by any one of numerous well-known techniques. For example, an N-hydroxysuccinimide ester of PEG can be bound to a phosphatidyl-ethanolamine lipid-soluble anchor, and then bound to a membrane. Similarly, a dextran polymer can be derivatized with a stearylamine lipid-soluble anchor via reductive amination using $Na(CN)BH_3$ and a solvent mixture such as tetrahydrofuran and water in a 30:12 ratio at 60 degrees C.

Recombinant plasmids that express nucleic acids of the invention are discussed above. Such recombinant plasmids can also be administered directly or in conjunction with a suitable delivery reagent, including the Mirus Transit LT 1 lipophilic reagent; lipofectin; lipofectamine; cellfectin; polycations (e.g., polylysine) or liposomes.

The nucleic acids that inhibit the activity of ZSCAN4 can be administered to the subject by any suitable means. For example, the nucleic acids can be administered by gene gun, electroporation, or by other suitable parenteral or enteral administration routes, or by injection, for example, by intramuscular or intravenous injection.

Suitable parenteral administration routes include intravascular administration (e.g. intravenous bolus injection, intravenous infusion, intra-arterial bolus injection, intra-arterial infusion and catheter instillation into the vasculature); peri- and intra-tissue administration (e.g., peri-tumoral and intra-tumoral injection, intra-retinal injection or subretinal injection); subcutaneous injection or deposition including subcutaneous infusion (such as by osmotic pumps); direct (e.g., topical) application to the area at or near the site of interest, for example by a catheter or other placement device (e.g., a corneal pellet or a suppository, eye-dropper, or an implant comprising a porous, non-porous, or gelatinous material); and inhalation. In a particular embodiment, injections or infusions of the composition(s) are given at or near the site of disease.

The nucleic acids that inhibit the activity of ZSCAN4 can be administered in a single dose or in multiple doses. Where the administration of a composition is by infusion, the infusion can be a single sustained dose or can be delivered by multiple infusions. Injection of the agent directly into the tissue is at or near the site of need. Multiple injections of the agent into the tissue at or near the site of interest are encompassed within this disclosure.

One skilled in the art can also readily determine an appropriate dosage regimen for administering the nucleic acids that inhibit the activity of ZSCAN4 to a given subject. For example, the composition(s) can be administered to the subject once, such as by a single injection or deposition at or near the site of interest. In some embodiments, the composition(s) can be administered to a subject once or twice daily to a subject once weekly for a period of from about three to about twenty-eight days, in some embodiments, from about seven to about ten weeks. In some dosage regimens, the composition(s) is injected at or near the site of interest once a day for seven days. Where a dosage regimen comprises multiple administrations, it is understood that the effective amount of composition(s) administered to the subject can comprise the total amount of composition(s) administered over the entire dosage regimen.

In some embodiments, the method further comprises one or more additional treatments for cancer. Combination therapy with two or more therapeutic agents often uses agents that work by different mechanisms of action, although this is not required. Combination therapy using agents with different mechanisms of action may result in additive or synergetic effects. Combination therapy may allow for a lower dose of each agent than is used in monotherapy, thereby reducing toxic side effects and/or increasing the therapeutic index of the agent(s). Combination therapy may decrease the likelihood that resistant cancer cells will develop. In some embodiments, combination therapy comprises a therapeutic agent that affects the immune response (e.g., enhances or activates the response) and a therapeutic agent that affects (e.g., inhibits or kills) the tumor/cancer cells.

In some embodiments, the combination of an agent described herein and at least one additional therapeutic agent results in additive or synergistic results. In some embodiments, the combination therapy results in an increase in the therapeutic index of the agent. In some embodiments, the combination therapy results in an increase in the therapeutic index of the additional therapeutic agent(s). In some embodiments, the combination therapy results in a decrease in the toxicity and/or side effects of the agent. In some embodiments, the combination therapy results in a decrease in the toxicity and/or side effects of the additional therapeutic agent(s).

In certain embodiments, in addition to administering a composition that inhibits the activity of ZSCAN4 described herein, the method or treatment further comprises administering at least one additional therapeutic agent. An additional therapeutic agent can be administered prior to, concurrently with, and/or subsequently to, administration of the agent. In some embodiments, the at least one additional therapeutic agent comprises 1, 2, 3, or more additional therapeutic agents.

Therapeutic agents that may be administered in combination with the agents described herein include chemotherapeutic agents. Thus, in some embodiments, the method or treatment involves the administration of an agent of the present invention in combination with a chemotherapeutic agent or in combination with a cocktail of chemotherapeutic agents. Treatment with an agent can occur prior to, concurrently with, or subsequent to administration of chemotherapies. Combined administration can include co-administration, either in a single pharmaceutical formulation or using separate formulations, or consecutive administration in either order but generally within a time period such that all active agents can exert their biological activities simultaneously. Preparation and dosing schedules for such chemotherapeutic agents can be used according to manufacturers' instructions or as determined empirically by the skilled practitioner. Preparation and dosing schedules for such chemotherapy are also described in The Chemotherapy Source Book. $4^{th}$ Edition, 2008, M. C. Perry, Editor, Lippincott, Williams & Wilkins, Philadelphia, Pa.

Useful classes of therapeutic agents include, for example, anti-tubulin agents, auristatins, DNA minor groove binders, DNA replication inhibitors, alkylating agents (e.g., platinum complexes such as cisplatin, mono(platinum), bis(platinum) and tri-nuclear platinum complexes and carboplatin), anthracyclines, antibiotics, anti-folates, antimetabolites, chemotherapy sensitizers, duocarmycins, etoposides, fluorinated pyrimidines, ionophores, lexitropsins, nitrosoureas, platinols, purine antimetabolites, puromycins, radiation sensitizers, steroids, taxanes, topoisomerase inhibitors, vinca alkaloids, or the like. In certain embodiments, the second therapeutic agent is an alkylating agent, an antimetabolite, an antimitotic, a topoisomerase inhibitor, or an angiogenesis inhibitor.

Chemotherapeutic agents useful in the instant invention include, but are not limited to, alkylating agents such as thiotepa and cyclosphosphamide (CYTOXAN); alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamime; nitrogen mustards such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, caminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytosine arabinoside, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenishers such as folinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK; razoxane; sizofuran; spirogermanium; tenuazonic acid; triaziquone; 2,2', 2"-trichlorotriethylamine; urethan; vindesine; dacarbazine; mannomustine; mitobronitol; mitolactol; pipobroman; gacytosine; arabinoside (Ara-C); taxoids, e.g. paclitaxel (TAXOL) and docetaxel (TAXOTERE); chlorambucil; gemcitabine; 6-thioguanine; mercaptopurine; platinum analogs such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; ibandronate; CPT 11; topoisomerase inhibitor RFS 2000; difluoromethylornithine (DMFO); retinoic acid; esperamicins; capecitabine (XELODA); and pharmaceutically acceptable salts, acids or derivatives of any of the above. Chemotherapeutic agents also include anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (FARESTON); and anti-androgens such as flutamide, nilutamide, bicalutamide, leuprolide, and goserelin; and pharmaceutically acceptable salts, acids or derivatives of any of the above. In certain embodiments, the additional therapeutic agent is cisplatin. In certain embodiments, the additional therapeutic agent is carboplatin. In certain embodiments, a combination of cisplatin and paclitaxel is administered in combination with the composition that inhibits the activity of ZSCAN4 described herein.

In certain embodiments, the chemotherapeutic agent is a topoisomerase inhibitor. Topoisomerase inhibitors are chemotherapy agents that interfere with the action of a topoisomerase enzyme (e.g., topoisomerase I or II). Topoisomerase inhibitors include, but are not limited to, doxorubicin HCl, daunorubicin citrate, mitoxantrone HCl, actinomycin D, etoposide, topotecan HCl, teniposide (VM-26), and irinotecan, as well as pharmaceutically acceptable salts, acids, or derivatives of any of these. In some embodiments, the additional therapeutic agent is irinotecan.

In certain embodiments, the chemotherapeutic agent is an anti-metabolite. An anti-metabolite is a chemical with a structure that is similar to a metabolite required for normal biochemical reactions, yet different enough to interfere with one or more normal functions of cells, such as cell division. Anti-metabolites include, but are not limited to, gemcitabine, fluorouracil, capecitabine, methotrexate sodium, ralitrexed, pemetrexed, tegafur, cytosine arabinoside, thioguanine, 5-azacytidine, 6-mercaptopurine, azathioprine, 6-thioguanine, pentostatin, fludarabine phosphate, and cladribine, as well as pharmaceutically acceptable salts, acids, or derivatives of any of these. In certain embodiments, the additional therapeutic agent is gemcitabine.

In certain embodiments, the chemotherapeutic agent is an antimitotic agent, including, but not limited to, agents that bind tubulin. In some embodiments, the agent is a taxane. In certain embodiments, the agent is paclitaxel or docetaxel, or a pharmaceutically acceptable salt, acid, or derivative of paclitaxel or docetaxel. In certain embodiments, the agent is paclitaxel (TAXOL), docetaxel (TAXOTERE), albumin-bound paclitaxel (ABRAXANE), DHA-paclitaxel, or PG-paclitaxel. In certain alternative embodiments, the antimitotic agent comprises a vinca alkaloid, such as vincristine, vinblastine, vinorelbine, or vindesine, or pharmaceutically acceptable salts, acids, or derivatives thereof. In some embodiments, the antimitotic agent is an inhibitor of kinesin Eg5 or an inhibitor of a mitotic kinase such as Aurora A or Plk1. In certain embodiments, the additional therapeutic agent is paclitaxel. In certain embodiments, the additional therapeutic agent is albumin-bound paclitaxel (ABRAXANE).

In some embodiments, an additional therapeutic agent comprises an agent such as a small molecule. For example, treatment can involve the combined administration of an agent of the present invention with a small molecule that acts as an inhibitor against tumor-associated antigens including, but not limited to, EGFR, HER2 (ErbB2), and/or VEGF. In some embodiments, an agent of the present invention is administered in combination with a protein kinase inhibitor selected from the group consisting of: gefitinib (IRESSA), erlotinib (TARCEVA), sunitinib (SUTENT), lapatanib, vandetanib (ZACTIMA), AEE788, CI-1033, cediranib (RECENTIN), sorafenib (NEXAVAR), and pazopanib (GW786034B). In some embodiments, an additional therapeutic agent comprises an mTOR inhibitor.

In certain embodiments, the additional therapeutic agent is an agent that inhibits a cancer stem cell pathway. In some embodiments, the additional therapeutic agent is an inhibitor of the Notch pathway. In some embodiments, the additional therapeutic agent is an inhibitor of the Wnt pathway. In some embodiments, the additional therapeutic agent is an inhibitor of the BMP pathway. In some embodiments, the additional therapeutic agent is an inhibitor of the Hippo pathway. In some embodiments, the additional therapeutic agent is an inhibitor of the RSPO/LGR pathway. In some embodiments, the additional therapeutic agent is an inhibitor of the mTOR/AKR pathway.

In some embodiments, an additional therapeutic agent comprises a biological molecule, such as an antibody. For example, treatment can involve the combined administration of an agent of the present invention with antibodies against tumor-associated antigens including, but not limited to, antibodies that bind EGFR, HER2/ErbB2, and/or VEGF. In certain embodiments, the additional therapeutic agent is an antibody specific for a cancer stem cell marker. In some embodiments, the additional therapeutic agent is an antibody that binds a component of the Notch pathway. In some embodiments, the additional therapeutic agent is an antibody that binds a component of the Wnt pathway. In certain embodiments, the additional therapeutic agent is an antibody that inhibits a cancer stem cell pathway. In some embodiments, the additional therapeutic agent is an inhibitor of the Notch pathway. In some embodiments, the additional therapeutic agent is an inhibitor of the Wnt pathway. In some embodiments, the additional therapeutic agent is an inhibitor of the BMP pathway. In some embodiments, the additional therapeutic agent is an antibody that inhibits β-catenin signaling. In certain embodiments, the additional therapeutic agent is an antibody that is an angiogenesis inhibitor (e.g., an anti-VEGF or VEGF receptor antibody). In certain embodiments, the additional therapeutic agent is bevacizumab (AVASTIN), ramucirumab, trastuzumab (HERCEPTIN), pertuzumab (OMNITARG), panitumumab (VECTIBIX), nimotuzumab, zalutumumab, or cetuximab (ERBITUX).

In certain embodiments, the agent that inhibits the activity of ZSCAN4 described herein is administered in combination with at least one immunotherapeutic agent. In some embodiments, the immunotherapeutic agent is an immune response stimulating agent. In some embodiments, the immunotherapeutic agent (e.g., immune response stimulating agent) includes, but is not limited to, a colony stimulating factor (e.g., granulocyte-macrophage colony stimulating factor (GM-CSF), macrophage colony stimulating factor (M-CSF), granulocyte colony stimulating factor (G-CSF), stem cell factor (SCF)), an interleukin (e.g., IL-1, IL2, IL-3, IL-7, Il-12, IL-15, IL-18), an antibody that blocks immunosuppressive functions (e.g., an anti-CTLA4 antibody, anti-CD28 antibody, anti-CD3 antibody, anti-PD-1 antibody, anti-PD-L1 antibody), an antibody that enhances immune cell functions (e.g., an anti-GITR antibody or an anti-OX-40 antibody), a toll-like receptor (e.g., TLR4, TLR7, TLR9), a soluble ligand (e.g., GITRL or OX-40L), or a member of the B7 family (e.g., CD80, CD86). An immunotherapeutic agent (e.g., an immune response stimulating agent) can be administered prior to, concurrently with, and/or subsequently to, administration of the agent that inhibits the activity of ZSCAN4 described herein. Pharmaceutical compositions comprising an agent that inhibits the activity of ZSCAN4 described herein and an immunotherapeutic agent (e.g., an immune response stimulating agent(s)) are also provided. In some embodiments, the immunotherapeutic agent comprises 1, 2, 3, or more immunotherapeutic agents. In some embodiments, the immune response stimulating agent comprises 1, 2, 3, or more immune response stimulating agents.

In some embodiments, the additional therapeutic agent is an antibody that is an immune checkpoint inhibitor. In some embodiments, the immune checkpoint inhibitor is an anti-PD-1 antibody, an anti-PD-L1 antibody, an anti-CTLA4 antibody, an anti-CD28 antibody, an anti-LAG3 antibody, an anti-TIM3 antibody, an anti-GITR antibody, or an anti-OX-40 antibody. In some embodiments, the immune checkpoint inhibitor is an anti-4-1BB antibody. In some embodiments, the additional therapeutic agent is an anti-PD-1 antibody selected from the groups consisting of: nivolumab (OPDIVO), pembrolizumab (KEYTRUDA), or pidilzumab. In some embodiments, the additional therapeutic agent is an anti-PD-1 antibody selected from the groups consisting of: MEDIO0680, REGN2810, BGB-A317, and PDR001. In some embodiments, the additional therapeutic agent is an anti-PD-L1 antibody selected from the group consisting of: BMS935559 (MDX-1105), atexolizumab (MPDL3280A), durvalumab (MEDI4736), or avelumab (MSB0010718C). In some embodiments, the additional therapeutic agent is an anti-CTLA-4 antibody selected from the group consisting of: ipilimumab (YERVOY) or tremelimumab. In some embodiments, the additional therapeutic agent is an anti-LAG-3 antibody selected from the group consisting of: BMS-986016 and LAG525. In some embodiments, the additional therapeutic agent is an anti-OX-40 antibody selected from the group consisting of: MED16469, MEDI0562, and MOXR0916. In some embodiments, the additional therapeutic agent is an anti-4-1BB antibody selected from the group consisting of: PF-05082566.

Furthermore, treatment with a composition that inhibits the activity of ZSCAN4 described herein described herein can include combination treatment with biologic molecules, such as one or more cytokines (e.g., lymphokines, interleukins, interferons, tumor necrosis factors, and/or growth factors).

In some embodiments, the agent that inhibits the activity of ZSCAN4 can be administered in combination with a biologic molecule selected from the group consisting of: adrenomedullin (AM), angiopoietin (Ang), BMPs, BDNF, EGF, erythropoietin (EPO), FGF, GDNF, G-CSF, GM-CSF, GDF9, HGF, HDGF, IGF, migration-stimulating factor, myostatin (GDF-8), NGF, neurotrophins, PDGF, thrombopoietin, TGF-α, TGF-β. TNF-α, VEGF, PlGF, gamma-IFN, IL-1, IL-2, IL-3, IL-4, IL-5, IL-6, IL-7, IL-12, IL-15, and IL-18. In some embodiments, the agent that inhibits the activity of ZSCAN4 can be administered in combination with a biologic molecule selected from the group consisting of: macrophage colony stimulating factor (M-CSF) and stem cell factor (SCF), In some embodiments, treatment with an agent that inhibits the activity of ZSCAN4 described herein can be accompanied by surgical removal of tumors, removal of cancer cells, or any other surgical therapy deemed necessary by a treating physician.

In certain embodiments, treatment involves the administration of an agent that inhibits the activity of ZSCAN4 of the present invention in combination with radiation therapy. Treatment with an agent can occur prior to, concurrently with, or subsequent to administration of radiation therapy. Dosing schedules for such radiation therapy can be determined by the skilled medical practitioner.

In certain embodiments, treatment involves the administration of an agent that inhibits the activity of ZSCAN4 of the present invention in combination with anti-viral therapy. Treatment with an agent can occur prior to, concurrently with, or subsequent to administration of antiviral therapy. The anti-viral drug used in combination therapy will depend upon the virus the subject is infected with.

Combined administration can include co-administration, either in a single pharmaceutical formulation or using separate formulations, or consecutive administration in either order but generally within a time period such that all active agents can exert their biological activities simultaneously.

It will be appreciated that the combination of an agent that inhibits the activity of ZSCAN4 described herein and at least one additional therapeutic agent may be administered in any order or concurrently. In some embodiments, the agent will be administered to patients that have previously undergone treatment with a second therapeutic agent. In certain other embodiments, the agent that inhibits the activity of ZSCAN4 and a second therapeutic agent will be administered substantially simultaneously or concurrently. For example, a subject may be given an agent while undergoing a course of treatment with a second therapeutic agent (e.g., chemotherapy). In certain embodiments, a composition that inhibits the activity of ZSCAN4 will be administered within 1 year of the treatment with a second therapeutic agent. In certain alternative embodiments, an agent that inhibits the activity of ZSCAN4 will be administered within 10, 8, 6, 4, or 2 months of any treatment with a second therapeutic agent. In certain other embodiments, an agent that inhibits the activity of ZSCAN4 will be administered within 4, 3, 2, or 1 weeks of any treatment with a second therapeutic agent. In some embodiments, an agent will be administered within 5, 4, 3, 2, or 1 days of any treatment with a second therapeutic agent. It will further be appreciated that the two (or more) agents or treatments may be administered to the subject within a matter of hours or minutes (i.e., substantially simultaneously).

For the treatment of a disease, the appropriate dosage of an agent that inhibits the activity of ZSCAN4 of the present invention depends on the type of disease to be treated, the severity and course of the disease, the responsiveness of the disease, whether the agent is administered for therapeutic or preventative purposes, previous therapy, the patient's clinical history, and so on, all at the discretion of the treating physician. The agent that inhibits the activity of ZSCAN4 can be administered one time or over a series of treatments lasting from several days to several months, or until a cure is effected or a diminution of the disease state is achieved (e.g., reduction in tumor size). Optimal dosing schedules can be calculated from measurements of drug accumulation in the body of the patient and will vary depending on the relative potency of an individual agent. The administering physician can determine optimum dosages, dosing methodologies, and repetition rates. In certain embodiments, dosage is from 0.01 µg to 100 mg/kg of body weight, from 0.1 µg to 100 mg/kg of body weight, from 1 µg to 100 mg/kg of body weight, from 1 mg to 100 mg/kg of body weight, 1 mg to 80 mg/kg of body weight from 10 mg to 100 mg/kg of body weight, from 10 mg to 75 mg/kg of body weight, or from 10 mg to 50 mg/kg of body weight. In certain embodiments, the dosage of the agent is from about 0.1 mg to about 20 mg/kg of body weight. In some embodiments, the dosage of the agent is about 0.5 mg/kg of body weight. In some embodiments, the dosage of the agent is about 1 mg/kg of body weight. In some embodiments, the dosage of the agent is about 1.5 mg/kg of body weight. In some embodiments, the dosage of the agent is about 2 mg/kg of body weight. In some embodiments, the dosage of the agent is about 2.5 mg/kg of body weight. In some embodiments, the dosage of the agent is about 5 mg/kg of body weight. In some embodiments, the dosage of the agent is about 7.5 mg/kg of body weight. In some embodiments, the dosage of the agent is about 10 mg/kg of body weight. In some embodiments, the dosage of the agent is about 12.5 mg/kg of body weight. In some embodiments, the dosage of the agent is about 15 mg/kg of body weight. In certain embodiments, the dosage can be given once or more daily, weekly, monthly, or yearly. In certain embodiments, the agent is given once every week, once every two weeks, once every three weeks, or once every four weeks.

In some embodiments, an agent that inhibits the activity of ZSCAN4 may be administered at an initial higher "loading" dose, followed by one or more lower doses. In some embodiments, the frequency of administration may also change. In some embodiments, a dosing regimen may comprise administering an initial dose, followed by additional doses (or "maintenance" doses) once a week, once every two weeks, once every three weeks, or once every month. For example, a dosing regimen may comprise administering an initial loading dose, followed by a weekly maintenance dose of, for example, one-half of the initial dose. Or a dosing regimen may comprise administering an initial loading dose, followed by maintenance doses of, for example one-half of the initial dose every other week. Or a dosing regimen may comprise administering three initial doses for 3 weeks, followed by maintenance doses of, for example, the same amount every other week.

As is known to those of skill in the art, administration of any therapeutic agent may lead to side effects and/or toxicities. In some cases, the side effects and/or toxicities are so severe as to preclude administration of the particular agent at a therapeutically effective dose. In some cases, drug therapy must be discontinued, and other agents may be tried. However, many agents in the same therapeutic class often display similar side effects and/or toxicities, meaning that the patient either has to stop therapy, or if possible, suffer from the unpleasant side effects associated with the therapeutic agent.

In some embodiments, the dosing schedule may be limited to a specific number of administrations or "cycles". In some embodiments, the agent is administered for 3, 4, 5, 6, 7, 8, or more cycles. For example, the agent is administered every 2 weeks for 6 cycles, the agent is administered every 3 weeks for 6 cycles, the agent is administered every 2 weeks for 4 cycles, the agent is administered every 3 weeks for 4 cycles, etc. Dosing schedules can be decided upon and subsequently modified by those skilled in the art.

The present invention provides methods of administering to a subject an agent that inhibits the activity of ZSCAN4 described herein comprising using an intermittent dosing strategy for administering one or more agents, which may reduce side effects and/or toxicities associated with administration of an agent, chemotherapeutic agent, etc. In some embodiments, a method for treating cancer in a human subject comprises administering to the subject a therapeutically effective dose of an agent in combination with a therapeutically effective dose of a chemotherapeutic agent, wherein one or both of the agents are administered according to an intermittent dosing strategy. In some embodiments, the intermittent dosing strategy comprises administering an initial dose of an agent to the subject, and administering subsequent doses of the agent about once every 2 weeks. In some embodiments, the intermittent dosing strategy comprises administering an initial dose of an agent to the subject, and administering subsequent doses of the agent about once every 3 weeks. In some embodiments, the intermittent dosing strategy comprises administering an initial dose of an agent to the subject, and administering subsequent doses of the agent about once every 4 weeks. In some embodiments, the agent is administered using an intermittent dosing strategy and the chemotherapeutic agent is administered weekly.

The present invention provides compositions comprising an agent that inhibits the activity of ZSCAN4 described herein. The present invention also provides pharmaceutical compositions comprising an agent that inhibits the activity of ZSCAN4 described herein and a pharmaceutically acceptable vehicle. In some embodiments, the pharmaceutical compositions find use in immunotherapy. In some embodiments, the compositions find use in inhibiting tumor growth. In some embodiments, the pharmaceutical compositions find use in inhibiting tumor growth in a subject (e.g., a human patient). In some embodiments, the compositions find use in treating cancer. In some embodiments, the pharmaceutical compositions find use in treating cancer in a subject (e.g., a human patient). In some embodiments, the compositions find use in inhibiting cancer stem cells in a subject. In some embodiments, the compositions find use in reducing the number or frequency of cancer stem cells in a subject.

Formulations can be prepared for storage and use by combining the compositions or active agents of the present invention with a pharmaceutically acceptable vehicle (e.g., a carrier or excipient). Those of skill in the art generally consider pharmaceutically acceptable carriers, excipients, and/or stabilizers to be inactive ingredients of a formulation or pharmaceutical composition.

Suitable pharmaceutically acceptable vehicles include, but are not limited to, nontoxic buffers such as phosphate, citrate, and other organic acids; salts such as sodium chloride; antioxidants including ascorbic acid and methionine; preservatives such as octadecyldimethylbenzyl ammonium chloride, hexamethonium chloride, benzalkonium chloride, benzethonium chloride, phenol, butyl or benzyl alcohol, alkyl parabens, such as methyl or propyl paraben, catechol, resorcinol, cyclohexanol, 3-pentanol, and m-cresol; low molecular weight polypeptides (e.g., less than about 10 amino acid residues); proteins such as serum albumin, gelatin, or immunoglobulins; hydrophilic polymers such as polyvinylpyrrolidone; amino acids such as glycine, glutamine, asparagine, histidine, arginine, or lysine; carbohydrates such as monosaccharides, disaccharides, glucose, mannose, or dextrins; chelating agents such as EDTA; sugars such as sucrose, mannitol, trehalose or sorbitol; salt-forming counter-ions such as sodium; metal complexes such as Zn-protein complexes; and non-ionic surfactants such as TWEEN or polyethylene glycol (PEG). (*Remington: The Science and Practice of Pharmacy.* 22$^{st}$ Edition, 2012, Pharmaceutical Press, London.).

The pharmaceutical compositions of the present invention can be administered in any number of ways for either local or systemic treatment. Administration can be topical by epidermal or transdermal patches, ointments, lotions, creams, gels, drops, suppositories, sprays, liquids and powders; pulmonary by inhalation or insufflation of powders or aerosols, including by nebulizer, intratracheal, and intranasal; oral; or parenteral including intravenous, intraarterial, intratumoral, subcutaneous, intraperitoneal, intramuscular (e.g., injection or infusion), or intracranial (e.g., intrathecal or intraventricular).

The therapeutic formulation can be in unit dosage form. Such formulations include tablets, pills, capsules, powders, granules, solutions or suspensions in water or non-aqueous media, or suppositories. In solid compositions such as tablets the principal active ingredient is mixed with a pharmaceutical carrier. Conventional tableting ingredients include corn starch, lactose, sucrose, sorbitol, talc, stearic acid, magnesium stearate, dicalcium phosphate or gums, and diluents (e.g., water). These can be used to form a solid preformulation composition containing a homogeneous mixture of a compound of the present invention, or a non-toxic pharmaceutically acceptable salt thereof. The solid preformulation composition is then subdivided into unit dosage forms of a type described above. The tablets, pills, etc. of the formulation or composition can be coated or otherwise compounded to provide a dosage form affording the advantage of prolonged action. For example, the tablet or pill can comprise an inner composition covered by an outer component. Furthermore, the two components can be separated by an enteric layer that serves to resist disintegration and permits the inner component to pass intact through the stomach or to be delayed in release. A variety of materials can be used for such enteric layers or coatings, such materials include a number of polymeric acids and mixtures of polymeric acids with such materials as shellac, cetyl alcohol and cellulose acetate.

The agent that inhibits the activity of ZSCAN4 described herein can also be entrapped in microcapsules. Such microcapsules are prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nanoparticles and nanocapsules) or in macroemulsions as described in *Remington: The Science and Practice of Pharmacy,* 22$^{st}$ Edition, 2012, Pharmaceutical Press, London.

In certain embodiments, pharmaceutical formulations include an agent of the present invention complexed with liposomes. Methods to produce liposomes are known to those of skill in the art. For example, some liposomes can be generated by reverse phase evaporation with a lipid composition comprising phosphatidylcholine, cholesterol, and PEG-derivatized phosphatidylethanolamine (PEG-PE). Liposomes can be extruded through filters of defined pore size to yield liposomes with the desired diameter.

In some embodiments, the agent that inhibits the activity of ZSCAN4 can be formulated in a lipid nanoparticle.

In certain embodiments, sustained-release preparations comprising the agent that inhibits the activity of ZSCAN4 described herein can be produced. Suitable examples of sustained-release preparations include semi-permeable matrices of solid hydrophobic polymers containing an agent, where the matrices are in the form of shaped articles (e.g., films or microcapsules). Examples of sustained-release matrices include polyesters, hydrogels such as poly(2-hydroxyethyl-methacrylate) or poly(vinyl alcohol), polylactides, copolymers of L-glutamic acid and 7 ethyl-L-glutamate, non-degradable ethylene-vinyl acetate, degradable lactic acid-glycolic acid copolymers such as the LUPRON DEPOT™. (injectable microspheres composed of lactic acid-glycolic acid copolymer and leuprolide acetate), sucrose acetate isobutyrate, and poly-D-(−)-3-hydroxybutyric acid.

In some embodiments, the invention provides methods of screening for agents that inhibit the activity of ZSCAN4. The agent can be naturally occurring or synthetic. In some embodiments, the agent inhibits the expression level of ZSCAN4 or RFN20.

In some embodiments, ZSCAN4 is employed in a screening process for compounds which bind the protein and inhibit (antagonists) the activity of ZSCAN4. Thus, in some embodiments, ZSCAN4 is used to assess the binding of molecular substrates and ligands in, for example, cells, cell-free preparations, chemical libraries, and natural product mixtures. These substrates and ligands can be natural substrates and ligands or can be structural or functional mimetics. Inhibitors of ZSCAN4 are particularly advantageous and can be used in methods as therapeutic agents in the treatment of diseases or conditions, such as cancer described herein.

In some embodiments, the assays test binding of a candidate compound to the ZSCAN4 or assays involving competition with a labeled competitor. In some embodiments, inhibitors can be tested in the presence of an agonist and the effect on activation by the agonist in the presence of the candidate compound is observed.

Examples of inhibitors include nucleic acids, antibodies, peptides, carbohydrates, or small molecules which bind to the protein. These agents can be selected and screened 1) at random, 2) by a rational selection or 3) by design using for example, ligand modeling techniques (e.g., computer modeling).

For random screening, agents such as antibodies, peptides, carbohydrates, small molecules and the like are selected at random and are assayed.

In some embodiments, agents can be rationally selected or designed. As used herein, an agent is said to be "rationally selected or designed" when the agent is chosen based on the configuration of the ZSCAN4 or its target transcripts. For example, antibodies can be raised against one or more ZSCAN4 epitopes.

In some embodiments, the invention provides a method of screening for an agent that inhibits the interaction of ZSCAN4 with RNF20 comprising contacting a ZSCAN4 and RNF20 containing complex with an agent, wherein the agent disrupts the interaction between ZSCAN4 and RNF20. In some embodiments, the ZSCAN4 or RNF20 is bound to a solid support. In some embodiments, at least one of ZSCAN4, RNF20 or the agent comprises a detectable label. In some embodiments, the method comprises detecting binding of the agent to ZSCAN4 or RNF20. In some embodiments, the method comprises detecting displacement of ZSCAN4 or RNF20 from the complex.

In some embodiments, the invention provides a method of screening for an agent that inhibits the activity of ZSCAN4 comprising:
  i) contacting cells expressing ZSCAN4 with the agent; and
  ii) assaying the agent's effect on the activity of ZSCAN4.

In some embodiments, ZSCAN4 is contained in a complex, and the activity of ZSCAN4 that is inhibited is an activity of the ZSCAN4 containing complex. In some embodiments, the ZSCAN4 containing complex comprises RNF20.

In some embodiments, the activity of ZSCAN4 that is inhibited comprises ubiquitination of histone 2B.

In some embodiments, the activity of ZSCAN4 that is inhibited comprises maintenance of a cancer stem cell phenotype.

In some embodiments, the activity of ZSCAN4 that is inhibited comprises histone 3 hyperacetylation in chromatin of the cancer cells.

In some embodiments, the activity of ZSCAN4 that is inhibited comprises upregulaton of OCT3/4 and NANOG in the cancer cells.

In some embodiments, the activity of ZSCAN4 that is inhibited comprises upregulation of cancer stem cell factors in the cancer cells.

In some embodiments, the activity of ZSCAN4 that is inhibited comprises ability to the cancer cells to form tumorspheres.

In some embodiments, the activity of ZSCAN4 that is inhibited comprises tumor growth.

In some embodiments, the invention provides a method of screening for an agent which inhibits the activity of ZSCAN4 or RFN20 comprising: (a) contacting cells expressing ZSCAN4 with the agent to be tested; and (b) assaying the agent's effect on the expression level of ZSCAN4 or RFN20.

The cells that can be used are not particularly limiting, and can include primary cells as well as cells from established cell lines. In some embodiments, the cells are cancer cells. In some embodiments, the cells one or more characteristics of cancer stem cells.

In some embodiments, the screening procedures involve producing appropriate cells which express ZSCAN4. Such cells can include cells from mammals, yeast, *Drosophila* or *E. coli*. In some embodiments, the cells express the polypeptide endogenously. In other embodiments, the cells have been transfected or engineered to express the polypeptide.

Assays performed in animals, such as mice, are also included as part of the screening methods provided herein. In some embodiments, transgenic animals expressing wild-type ZSCAN4 or expressing a mutant ZSCAN4 is used for screening inhibitory agents. In some embodiments, the animals are cancer models, such as rodent xenograft cancer models that harbor cancer cells expressing ZSCAN4.

In some embodiments, the cells have been engineered to express ZSCAN4 and/or RNF20.

In some embodiments, the agent reduces expression levels of ZSCAN4 and the expression levels of ZSCAN4 is assayed in the cells.

In some embodiments, the level of ZSCAN4 mRNA is assayed.

In some embodiments, the level of ZSCAN4 protein is assayed.

In some embodiments, the agent reduces expression levels of RNF20 and the expression levels of RNF20 is assayed in the cells.

In some embodiments, the agent is a nucleic acid.

In some embodiments, the agent is a small organic molecule.

In some embodiments, the agent is an antibody.

While the invention has been described with reference to certain particular examples and embodiments herein, those skilled in the art will appreciate that various examples and embodiments can be combined for the purpose of complying with all relevant patent laws (e.g., methods described in specific examples can be used to describe particular aspects of the invention and its operation even though such are not explicitly set forth in reference thereto).

The present invention is further illustrated by the following Examples. These Examples are provided to aid in the understanding of the invention and are not to be construed as a limitation thereof.

EXAMPLES

Example 1—ZSCAN4 Facilitates Chromatin Remodeling and Promotes the Cancer Stem Cell Phenotype Materials and Methods Cell lines and cell culture. HNSCC cell lines were authenticated and tested free of mycoplasma by the University of Maryland translational core facility. All cell lines were cultured in complete DMEM medium (Invitrogen) supplemented with 10% fetal bovine serum (Atlanta Biologicals), 2 mM GlutaMAX, penicillin (100 U/mL), and streptomycin (100 µg/mL) (ThermoFisher Scientific).

RNA extraction and Quantitative Reverse Transcriptase Polymerase Chain Reaction (qRT-PCR). One microgram of total RNA, isolated with Trizol, was reverse transcribed by Superscript III (Invitrogen) following the manufacturer's protocol. For qPCR, 10 ng cDNA was used per well in triplicate using SYBR green reaction mix (Roche) following the manufacturer's instructions with corresponding primers (Table 1). Reactions were run on the LightCycler 480 system (Roche). Fold induction was calculated by the delta-delta Ct method.

TABLE 1

List of qRT-PR primers used for expression analyses.

| Marker | Forward Primer | Reverse Primer |
|---|---|---|
| ZSCAN4 | 5'-ATCCACCTGCCTTAGTCCAC-3<br>SEQ ID NO: 8 | 5'-TCGAAGAACTGTTCCAGCCA-3'<br>SEQ ID NO: 13 |
| RPLP0 | 5'-CAGCAAGTGGGAAGGTGTAATCC-3'<br>SEQ ID NO: 9 | 5'-CCCATTCTATCATCAACGGGTACAA-3<br>SEQ ID NO: 14 |
| OCT3/4 | 5'-TCTTCAGGAGATATGCAAAGC-3<br>SEQ ID NO: 10 | 5'-ATCCTCTCGTTGTGCATAGT-3'<br>SEQ ID NO: 15 |
| SOX2 | 5'-CAAGGAGAGGCTTCTTGCTGA-3<br>SEQ ID NO: 11 | 5'-CACAGAGATGGTTCGCCAGT-3<br>SEQ ID NO: 16 |

TABLE 1-continued

List of qRT-PR primers used for expression analyses.

| Marker | Forward Primer | Reverse Primer |
|---|---|---|
| NANOG | 5'-AGCTACAAACAGGTGAAGAC-3' SEQ ID NO: 12 | 5'-TAGGAAGAGTAAAGGCTGGG-3' SEQ ID NO: 17 |

Generation of pZSCAN4-mCherry cells. The genomic region containing the ZSCAN4 promoter (2.5 Kb upstream of transcription start codon, and 299 base pairs downstream) was cloned into a lentiviral vector (pEZX-LvPM02; GeneCopoeia) in which the mCherry reporter gene and a puromycin resistance gene are downstream to the putative ZSCAN4 promoter.

Immunoblot Assays. Cytosolic proteins were extracted by Cytoskeleton buffer (10 mM PIPES, 300 mM sucrose, 100 mM NaCl, 3 mM $MgCl_2$, 1 mM EGTA and 0.5% Triton X100), and nucleoplasm fraction was isolated. Next, pellets were lysed in urea solution (8 M Urea in 0.01 Tris pH 8+0.1M $NaH_2PO_4$) and sonicated. Samples were electrophoresed in polyacrylamide gels. PVDF membranes were blocked with 5% nonfat milk or Superblock (Thermo Fisher Scientific) for 1 hour, then incubated overnight at 4° C. with the indicated primary antibodies in blocking solution (Table 2). Membranes were washed and incubated with secondary antibodies (1:5000) for 1 hour. Secondary antibodies were visualized by ECL Chemiluminescence (ThermoFisher Scientific).

TABLE 2

List of Antibodies used for immunoblot analyses and ChIP assays.

| Marker | Dilution | Supplier |
|---|---|---|
| ZSCAN4 | 1:2000 | Origene |
| OCT3/4 | 1:1000 | BD Transduction Labs |
| EZH2 | 1:1000 | BD Transduction Labs |
| SOX2 | 1:1000 | Abcam |
| NANOG | 1:1000 | Abcam |
| BMI1 | 1:1000 | Abcam |
| H3 | 1:1000 | Cell signaling |
| H3K9ac | 1:1000 | Cell signaling |
| H3K14ac | 1:1000 | Cell signaling |
| H3K18ac | 1:1000 | Cell signaling |
| H3K27ac | 1:1000 | Cell signaling |

Tumorsphere Formation Assay. Single cells were harvested using accutase (EMD Millipore) and tumorsphere growth was performed in DMEM F12 (Invitrogen), supplemented with B27 serum replacement (Invitrogen), 20 ng/ml basic FGF (Affymetrix, eBioscience), 20 ng/ml recombinant human EGF (Biolegend), and 100 μg/ml Ampicillin (American Bioanalytical). Tumorspheres were maintained in ultralow attachment dishes for up to 11 days. Size and number of spheres were analyzed using ImageJ software.

Immunofluorescence staining. Cells were fixed in 4% PFA and antigen retrieval was performed at 90° C. Slides were blocked in 1% BSA, 10% fetal bovine serum, and 0.2% Tween 20, and incubated at 4° C. overnight with the primary antibodies anti-NANOG (1:1000, Cell Signaling), anti-ZSCAN4 (1:1000, Origene), anti-OCT3/4 (1:250, Santa Cruz Biotechnology), anti-BMI1 (1:1000), anti-SOX2 (1:500) (Cell Signaling), in blocking solution. The FITC-conjugated anti-CD44 (1:100, Invitrogen) was incubated for one hour on ice in blocking solution. Nuclei were stained with DAPI (Roche Life Sciences). Uninduced cells (Dox−) and cells stained without primary antibody were used as controls. Samples were visualized with fluorescent Alexa546, Alexa488 or Alexa647 secondary antibodies (Invitrogen) under a Zeiss 510-confocal microscope.

CSC Markers profiling by flow cytometry. Cells (pZSCAN4-mCherry) were fixed in 4% paraformaldehyde (Alfa Aesar) in DPBS and co-stained for 1 hour on ice with the appropriate antibodies: EFLUOR450-conjugated anti-CD44 (1:100), Alexa 647-conjugated anti-ALDH1A1 (1:100). Samples were washed and analyzed by flow cytometry (FACS Canto II; BD Biosciences) and data was generated using FCS Express 7 software.

Chromatin Immunoprecipitation. (ChIP) was completed with 2.5 million cells/reaction following the Pierce Magnetic ChIP protocol (ThermoFisher Scientific). Sheared chromatin was immunoprecipitated with indicated antibodies (Table 2). The provided anti-RNA Polymerase II (1 μg) (not shown) and a Rabbit IgG (10 μg) were used as additional controls. qRT-PCR primers are shown in Table 3.

TABLE 3

List of qRT-PR primers for ChIP real-time PCR analyses

| Promoter | Forward Primer | Reverse Primer |
|---|---|---|
| pOCT3/4 | 5'-TTACTTAAGTCGACAGAGGTCAGC-3' SEQ ID NO: 18 | 5'-TGGTCTAGTGCTTGATTCTGTTTG-3' SEQ ID NO: 21 |
| pNANOG | 5'-GAAAGACATGACAAACACCAGAC-3' SEQ ID NO: 19 | 5'-CAACTAGCTCCATTTTCCTCTTTC-3' SEQ ID NO: 22 |

TABLE 3-continued

List of qRT-PR primers for ChIP real-time PCR analyses

| Promoter | Forward Primer | Reverse Primer |
| --- | --- | --- |
| Intergenic | 5'-AATGAGTGGGCTCATGGAAA-3'<br>SEQ ID NO: 20 | 5'-TCTGGATGCAGCATTTGTGT-3'<br>SEQ ID NO: 23 |

Extreme Limiting Dilution (ELDA) and Tumorigenicity in NSG mice. Both ELDA in vivo experiments were performed in the Translational Laboratory Shared-Services and conformed with the guidelines of the Institutional Animal Care and Use Committee (IACUC protocol #1016012). tet-ZSCAN4 (Tu167) cells were induced with Dox for 48 hours (Dox+) in culture, or remained untreated (Dox−), followed by harvesting, counting, and inoculation of the desired cell dose (n=8/dose) into both flanks of immune compromised NSG (NOD.Cg-Prkdc$^{scid}$ Il2rg$^{tm1Wjl}$/SzJ) (Ohbo K, Suda T, Hashiyama M, Mantani A, Ikebe M, Miyakawa K et al. Modulation of hematopoiesis in mice with a truncated mutant of the interleukin-2 receptor gamma chain. Blood 1996; 87: 956-967.) female mice (2 months old; Charles River). Mice were monitored over 85 days, and tumors were measured by caliper biweekly. Assessments were done as double-blind assay. The CSC frequency was calculated by L-Calc™ Software (StemCell Technologies)

In vivo and secondary xenograft tumors ELDA assay. All procedures were approved by and performed according to IACUC protocol #1016012. tet-ZSCAN4 (Tu167) cells were diluted to the desired dose and injected into the flank of NSG (Ohbo K, Suda T, Hashiyama M, Mantani A, Ikebe M, Miyakawa K et al. Modulation of hematopoiesis in mice with a truncated mutant of the interleukin-2 receptor gamma chain. Blood 1996; 87: 956-967.) female mice (Charles River) (n=8). To induce ZSCAN4 in vivo, a day after inoculation, 200 µg/ml doxycycline in 5% sucrose was added to the drinking water (Dox+) for 48 hours, while only 5% sucrose was used for the controls (Dox−) (n=4 per group). No Dox was given thereafter. Tumors were measured by a caliper biweekly. For in vivo ELDA, mice were sacrificed, tumors were minced, dissociated with 1.6 U/ml Liberase (Roche), 100 µg/ml DNAase (Sigma) and incubated for 60 min at 37° C. Mice were injected with 1000, 10,000, or 100,000 tumor cells (n=10/group), and monitored daily. Researchers were blinded to the treatment groups. CSC frequency was calculated by L-Calc™ Software.

Generation of ZSCAN4 Knockdown and Control Cells.

ZSCAN4 shRNAs were tested (19-mer sense, a hairpin loop, and 19-mer anti-sense oligos): shRNA1 (SEQ ID NO:3): 5'-GAGAACGGTCCTAGGCCTGTCAAGAG-GAGAACGGTCCTAGGCCT G-3', shRNA2 (SEQ ID NO:4): 5'-GATATCAGACCTACGGGTGTCAAGAGGA-TATCAGACCTACGGG TG-3, shRNA3 (SEQ ID NO:5): 5'-CTCGAGTAAATGAAAATATT-CAAGAGCTCGAGTAAATGAAAATA T-3 and two were cloned into the HuSH shRNA Plasmid pRFP-C-RS (Origene). Vectors were stably transfected into Tu167 or 012SCC cells by Effectene (QIAGEN) according to the manufacturer's protocol. As controls, isogenic cell lines were also generated expressing a non-targeting control shRNA (NTC-shRNA) or an Empty vector (same vector without an shRNA cassette). Cell lines were selected with 1 µg/ml Puromycin (ThermoFisher Scientific). Knockdown was confirmed by immunostaining and by qPCR.

ZSCAN4 knockdown xenograft assay. All procedures were approved and performed according to IACUC protocol no. 0711021. To assess the impact of ZSCAN4 depletion, male or female NSG mice (8-12 weeks old) (Jackson Laboratory, Bar Harbor, ME) were randomized into two groups (n=10 per group) and 10$^6$ of ZSCAN4 knockdown or NTC shRNA cells were injected subcutaneously on the left flank of each mouse. Tumor volume based on external caliper measurements were calculated by the formula: Tumor volume=½(length×width$^2$). Investigators were blinded to experimental groups and outcome assessments during experiments.

Statistical analyses. All data are shown as the mean±S.E.M of multiple independent experiments, with biological replicates. Student's t-test or one-way ANOVAs (when appropriate) were used for statistical analyses. Significant interactions were followed by Tukey or Bonferroni post-hoc comparisons when appropriate. Statistical analyses and figure generation were performed with STATISTICA 13 and GraphPad Prism 5 software. For in vivo experiments, statistical significance of difference in tumor volume was assessed by two-way ANOVA with repeated measures & Tukey's post-hoc comparisons. The mice were randomly assigned to the experimental groups. Investigators were blind to experimental groups and outcome assessments during experiments.

Results

ZSCAN4 is Enriched in Tumorspheres

To study the human ZSCAN4 gene, we first sought to assess the expression of ZSCAN4 by screening a panel of head and neck squamous cell carcinoma (HNSCC) cell lines (012SCC, SCC13, Tu167, Tu159) using quantitative reverse transcription PCR (qRT-PCR; FIG. 1A) and immunoblot analysis (FIG. 1B). Our data indicate ZSCAN4 is expressed in HNSCC cells, while the control human primary tonsillar cells are negative.

CSCs have been identified in HNSCC (Prince M E, Sivanandan R, Kaczorowski A, Wolf G T, Kaplan M J, Dalerba P et al. Identification of a subpopulation of cells with cancer stem cell properties in head and neck squamous cell carcinoma. Proc Natl Acad Sci USA 2007; 104: 973-978.; Ailles L, Prince M. Cancer stem cells in head and neck squamous cell carcinoma. Methods Mol Biol 2009; 568: 175-193. Chinn S B, Darr O A, Owen J H, Bellile E, McHugh J B, Spector M E et al. Cancer stem cells: mediators of tumorigenesis and metastasis in head and neck squamous cell carcinoma. Head & neck (Research Support, N.I.H., Extramural) 2015; 37: 317-326.), contributing to cancer aggressiveness and cancer recurrence. Many stem cell factors are enriched for in cancer and are highly expressed in CSCs, highlighting their importance for prognostic prediction (Joshua B, Kaplan M J, Doweck I, Pai R, Weissman I L, Prince M E et al. Frequency of cells expressing CD44, a head and neck cancer stem cell marker: correlation with tumor aggressiveness. Head & neck 2012; 34: 42-49.) CSCs can be enriched for by their ability to form spheroids (tumorspheres) in non-adherent culture conditions in defined medium (Prince M E, Ailles L E. Cancer stem cells in head and neck squamous cell cancer. Journal of clinical oncology: official journal of the American Society of Clinical Oncology: (Review) 2008; 26: 2871-2875.; Adhikary G, Grun D, Kerr C, Balasubramanian S, Rorke E A, Vemuri M et al. Identification of a population of epidermal squamous cell carcinoma cells with enhanced potential for tumor formation. PloS one (Research Support, N.I.H., Extramural) 2013; 8: e84324.) Therefore, we utilized the tumorsphere assay in Tu167 and 012SCC cells and assessed the effect on ZSCAN4. Following 8 days in culture, tumorspheres were collected from both cell lines (FIG. 1C) to assess ZSCAN4 by immunoblot. We found that ZSCAN4 is enriched for in tumorspheres compared to monolayer isogenic cells (FIG. 1D).

ZSCAN4 Marks Cells with an Enhanced Ability to Form Spheroids

Figure 2:
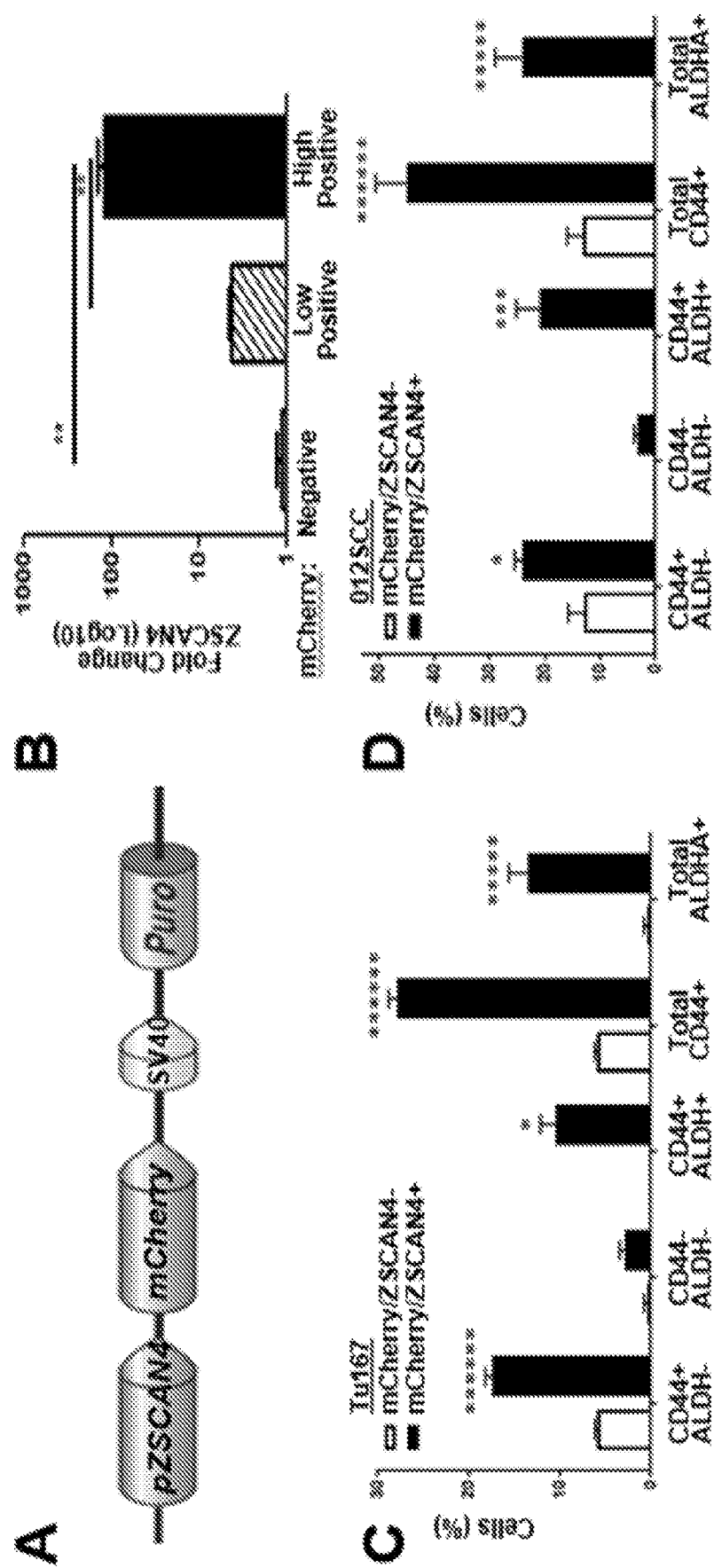
FIG. 2. ZSCAN4 expression is correlated with CSC markers, is upregulated in tumorspheres, and increases tumorsphere frequency and size. A, A schematic illustration of the lentiviral vector with mCherry reporter under the ZSCAN4 promoter. B, qRT-PCR for ZSCAN4 expression in Tu167 pZSCAN4-mCherry cells after FACS sorting into three groups: high mCherry (High-Positive), low (Low-Pos) and negatively sorted, indicating ZSCAN4 correlates with mCherry expression. C, mCherry reporter assay in Tu167 and D, 012SCC cells indicates that mCherry/ZSCAN4 correlates with the CSC Markers CD44 and ALDH1A1. E, Tumorsphere formation assay shows a total increase in the number of tumorspheres in mCherry/ZSCAN4 positive cells compared to negative and Tu167 wild type (WT) cells. F, Classification of tumorspheres according to size demonstrate a major increase in the larger tumorspheres. All data shown as mean±S.E.M. observed in triplicate in at least three independent experiments (Tu167, with consistent results in 012SCC). G, pZSCAN4-mCherry Tu167 and H, 012SCC cells in monolayers (adherent) and 8 days after tumorsphere formation indicate an increase in the frequency of mCherry in tumorspheres. All data shown are mean±SEM. Asterisks indicate: $*p<0.05$, $p<0.01$, $*p<0.001$, $**p<0.0001$, $*****p<10^{-7}$.
Figure 2:
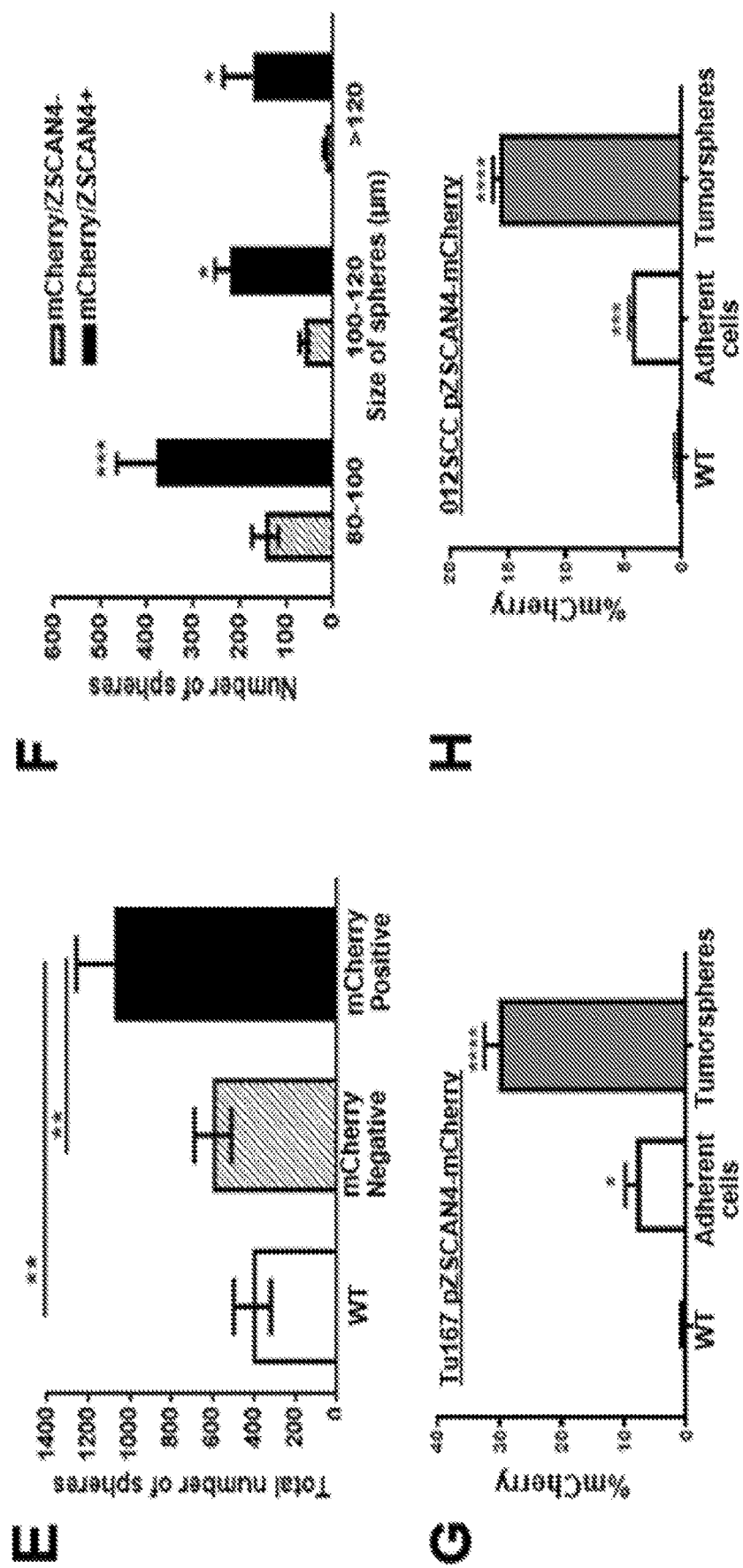

Previous studies in mouse ES cells have shown that mZscan4 is transiently expressed in a small fraction of cells in culture at a given time. However, with time, mZscan4 expression is gradually activated in all cells (Zalzman M, Falco G, Sharova L V, Nishiyama A, Thomas M, Lee S L et al. Zscan4 regulates telomere elongation and genomic stability in ES cells. Nature 2010; 464: 858-U866.) Furthermore, we recently published that the human ZSCAN4 protein is transient and cleared by the proteasome system (Portney B A, Khatri R, Meltzer W A, Mariano J M, Zalzman M. ZSCAN4 is negatively regulated by the ubiquitin-proteasome system and the E3 ubiquitin ligase RNF20. Biochem Biophys Res Commun 2018; 498: 72-78.) To study ZSCAN4 expression in HNSCC cells, we designed a plasmid containing the mCherry reporter gene under the putative promoter of ZSCAN4 (pZSCAN4-mCherry) and a Puromycin selection gene. Following sequence verification, we generated a lentiviral vector (FIG. 2A) and stably transduced two separate lines (Tu167 and 012SCC) to generate pZSCAN4-mCherry cells. Fluorescence activated cell sorting (FACS) allowed us to collect mCherry negative cells and compare them to low and high mCherry expressing cells. Our real time qRT-PCR analysis of ZSCAN4 in the sorted cells validates a positive correlation between mCherry and ZSCAN4 expression levels (FIG. 2B).

Figure 8:
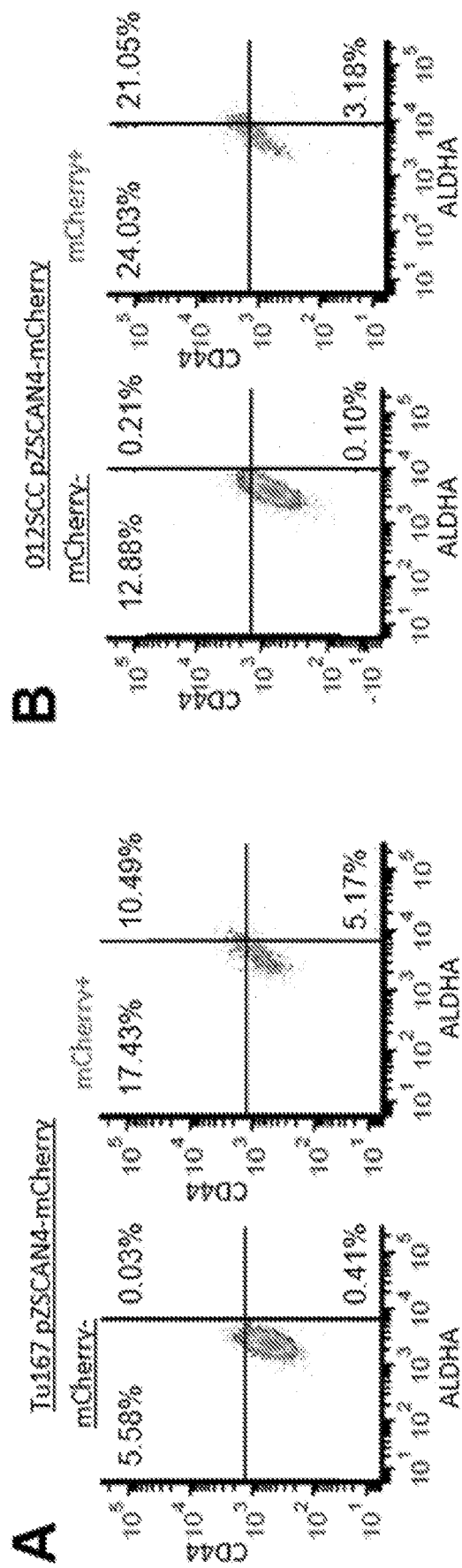
FIG. 8. ZSCAN4 expression in HNSCC cells in transient A, Flow cytometry in mCherry reporter cells pZSCAN4-mCherry Tu167 cells and B, 012SCC cells indicates that mCherry/ZSCAN4 correlates with the CSC Markers CD44 and ALDH1A1. C, FACS analysis of pZSCAN4-mCherry cells demonstrates that 14.8% are mCherry positive (ZSCAN4 expressing). Then, cells were sorted into 100% mCherry expressing cells and 100% mCherry negative cells and allowed to grow in monolayer again. After 10 days of expansion mCherry positive cells constituted 12.2% of the population, while 0.4% of the mCherry negative became mCherry positive.
Figure 8:
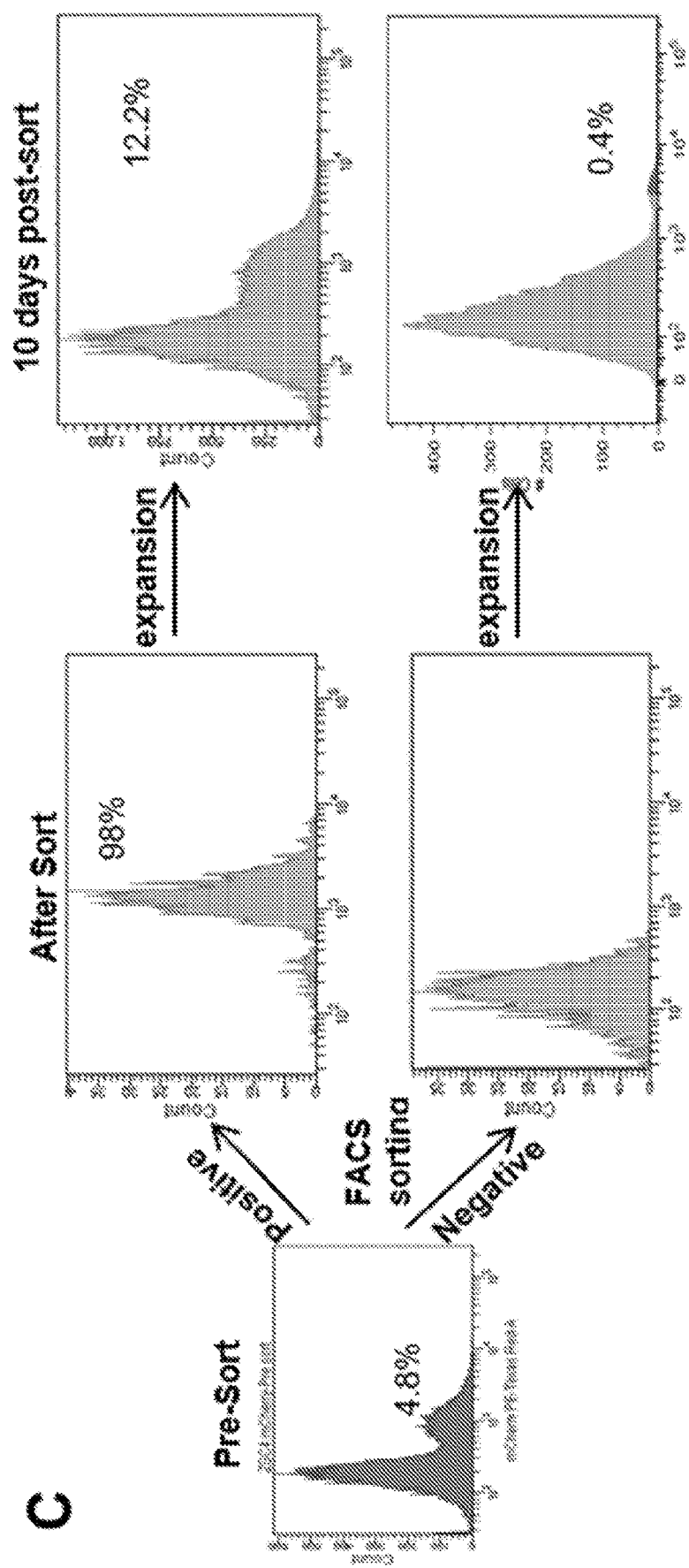

To determine the relationship between ZSCAN4/mCherry and previously reported HNSCC CSC markers, we co-stained pZSCAN4-mCherry cells (both Tu167 and 012SCC) with ALDH1A1 and CD44 and performed a flow cytometry assay. We then analyzed the co-staining in mCherry positive (mCherry+) and negative (mCherry−) cells (FIG. 2C, D; FIG. 8A, B). We found that the total number of mCherry+ expressing CD44 is 4.72-fold higher ($p<10^{-7}$) than mCherry− cells in Tu167 and 3.45-fold higher in 012SCC ($p<0.0001$). Importantly, the average number of Tu167 mCherry+ expressing ALDHA1 was 30.9-fold in Tu167 and 80.77-fold higher in 012SCC cells (FIG. 2C, D; FIG. 8A, B), as the majority >99% of mCherry− (Tu167, 012SCC) cells were ALDHA1 negative. Remarkably, 10.49±1.65% of the Tu167 ($p<00.001$) and 21.05±4.1% of 012SCC ($p<0.001$) mCherry+ were triple positive (FIG. 2C, D; FIG. 8A, B), suggesting the use of ZSCAN4 as a CSC marker may further identify the CSC population.

Figure 7:
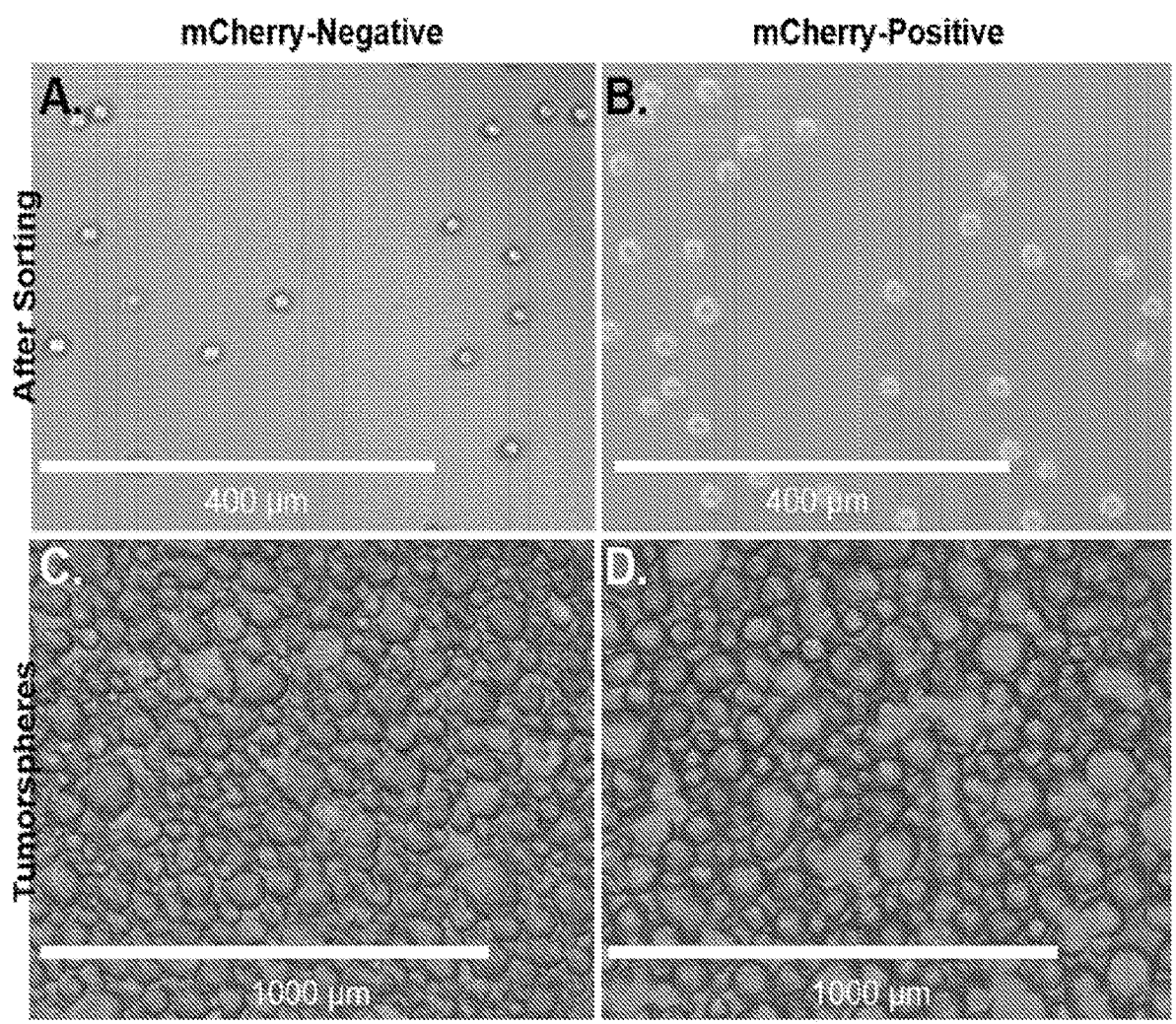
FIG. 7. ZSCAN4 marks tumorsphere forming cells. Representative fluorescent and Phase images of single pZscan4-mCherry cells (Tu167) immediately after FACS sorting and culturing. Size bar=400 um. The cells were divided into two groups: A, mCherry negative and B, mCherry positive. C, D, Cells were then subjected to spheroid formation assay. Representative images showing ZSCAN4 expression marks cells with higher ability to form tumorspheres. Further, tumorsphere from mCherry negative cells are mCherry positive. Scale bar=1000 um. Representative images from data obtained in triplicate in at least three independent experiments.

To assess the effect of ZSCAN4 on tumorsphere formation, we FACS sorted our Tu167 and 012SCC pZSCAN4-mCherry cells to mCherry negative and positive cells and performed a tumorsphere formation assay (FIG. 7). Our data indicate that high mCherry/ZSCAN4 positive cells show significantly enhanced ability to form tumorspheres when compared to WT cells ($p<0.01$) and mCherry negative control cells ($p<0.01$) (FIG. 2E). Positive mCherry expression also correlates with increased spheroid size (FIG. 2F). Consistent with the upregulation of ZSCAN4 observed in tumorspheres, we noted that the negatively sorted cells reactivate mCherry in the tumorsphere conditions (FIG. 7). These findings support the idea that ZSCAN4 expression marks and correlates with an enhanced ability to form spheres.

Next, we sought to find whether the upregulation of ZSCAN4 in tumorspheres represents an increase in the number of cells positive for ZSCAN4 and to find if ZSCAN4-negative cells can generate ZSCAN4-positive cells in monolayer culture. Therefore, we performed a tumorsphere assay with pZSCAN4-mCherry cells (Tu167, 012SCC), and compared the frequency of mCherry in adherent cells versus spheroids by flow cytometry (FIGS. 2G and 2H). Our results indicate a significant enrichment ($p<0.0001$; Tu167, 012SCC) in the frequency of mCherry positive cells in tumorspheres compared to attached cells. Conversely, FACS sorting of mCherry positive and negative cells in adherent condition followed by growing the cells in monolayer again, results in the reduction of mCherry positivity to nearly the starting frequency, while only 0.4% of the negative cells have reactivated mCherry (FIG. 8C). These data validate that spheroid conditions increase ZSCAN4 positive state frequency and suggest its transient expression.

Figure 9:
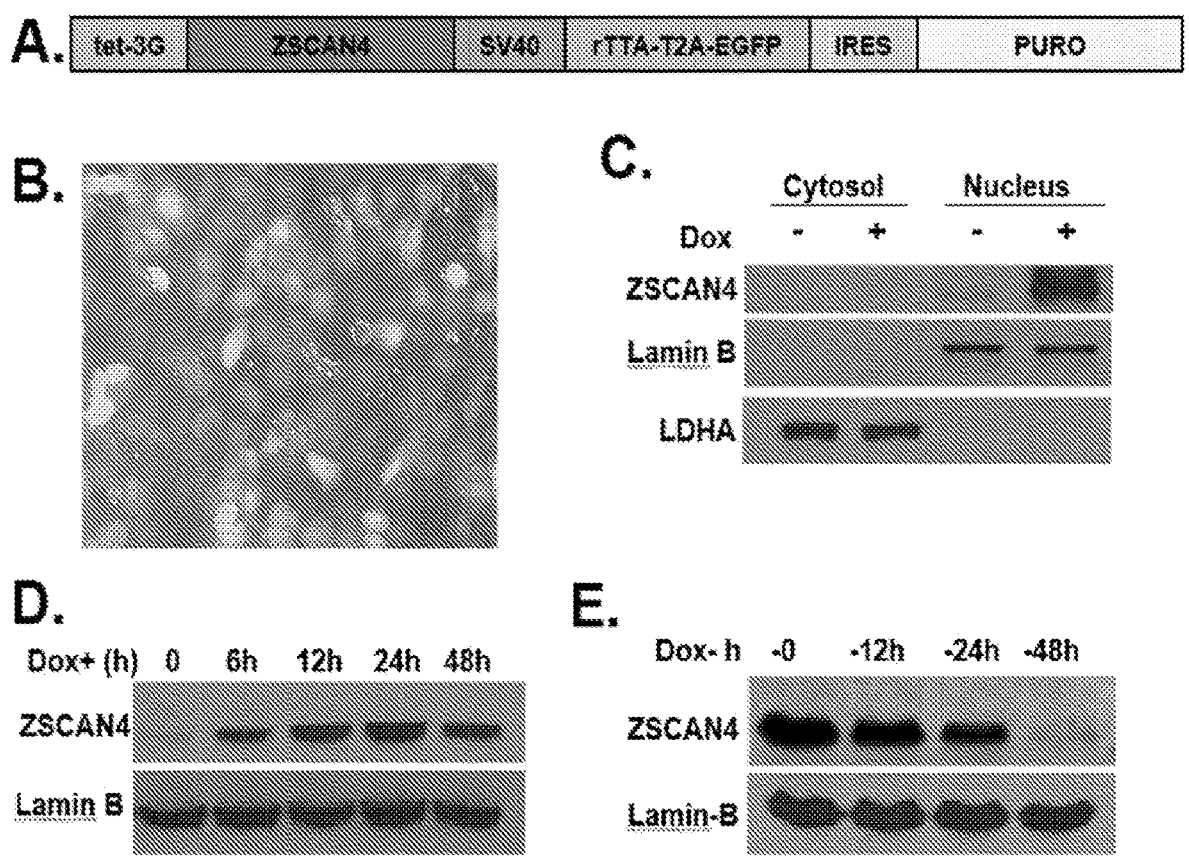
FIG. 9. A, An illustration of the tet-ZSCAN4 expression vector. B, Image of tet-ZSCAN4 (Tu167) cells showing expression of GFP. C, Immunoblot analyses indicate ZSCAN4 is tightly regulated by Dox and localizes to the nucleus; Controls: LDH (cytosol), Lamin-B (nucleus). D, Doxycycline addition to the culture medium (Dox+) induces ZSCAN4 within 6 hours. E, Dox treatment for 48 hours followed by Dox removal (Dox−) leads to clearance of the exogenous ZSCAN4 protein within 48 hours.

ZSCAN4 Induction Increases the Frequency of Tumorspheres In Vitro and CSCs In Vivo We previously reported that ZSCAN4 is cleared from the cells by the proteasome system (Portney B A, Khatri R, Meltzer W A, Mariano J M, Zalzman M. ZSCAN4 is negatively regulated by the ubiquitin-proteasome system and the E3 ubiquitin ligase RNF20. Biochem Biophys Res Commun 2018; 498: 72-78.) To determine the effect of ZSCAN4 in HNSCCs, and to allow us to trigger it transiently, we generated cell lines in which ZSCAN4 is induced in response to Doxycycline (Dox) (Tu167 and 012SCC tet-ZSCAN4 cells) (FIG. 9 A-C). Our data show that upon addition of Dox to the medium, ZSCAN4 is detectable within 6 hours (FIG. 9D). We verified the transient induction of ZSCAN4, by treating the cells for 48 hours, and then removed Dox to follow ZSCAN4 protein clearance. Our data indicate that 48 hours following Dox removal, ZSCAN4 is depleted from the cells (FIG. 9E).

Figure 3:
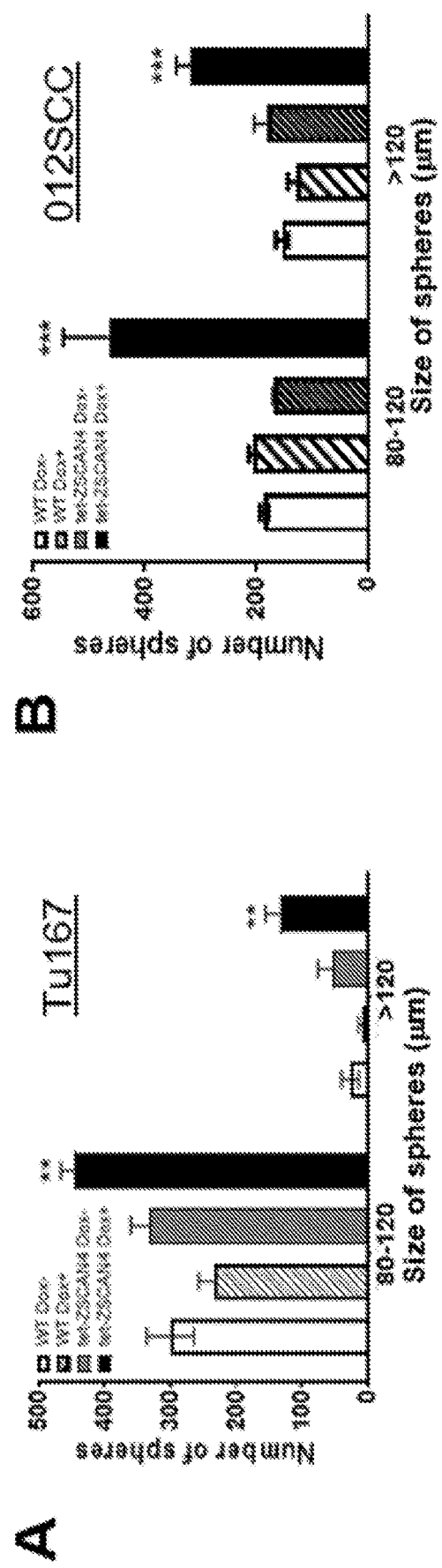
FIG. 3. ELDA shows ZSCAN4 induction increases the frequency and size of tumorspheres and tumors. A, Induction of ZSCAN4 in tet-ZSCAN4 Tu167 cells and B, 012SCC cells by addition of doxycycline for 48 hours (Dox+), prior to generation of tumorspheres, significantly increases the number and size of tumorspheres compared to untreated isogenic controls (Dox−) and to wild type (WT) treated or untreated with Dox. The statistical significance between the groups was determined using two away ANOVA with multiple Tukey's post hoc comparisons. Asterisks indicate a significant difference from isogenic untreated and WT cells: $p<0.01$, $*p<0.001$. C, Illustration of Extreme limiting dilution assay (ELDA) in vivo in NGS immunodeficient mice. tet-ZSCAN4 (Tu167) cells were treated (Dox+) or untreated (Dox−) with Dox for 48 h in culture. No Dox was given to the mice throughout the rest of the experiment. Cells were injected subcutaneously into the right and left flank of NOD/SCID gamma immunodeficient mice in multiple increasing dilutions: 100,000 cells, 10,000 cells, and 1000 cells per inoculation (n=8), and allowed to form tumors for up to 85 days. D, E, Tumor growth shown are mean±SEM for each group (100,000 N=6; 10,000 N=8; 1,000 N=8).
Figure 3:
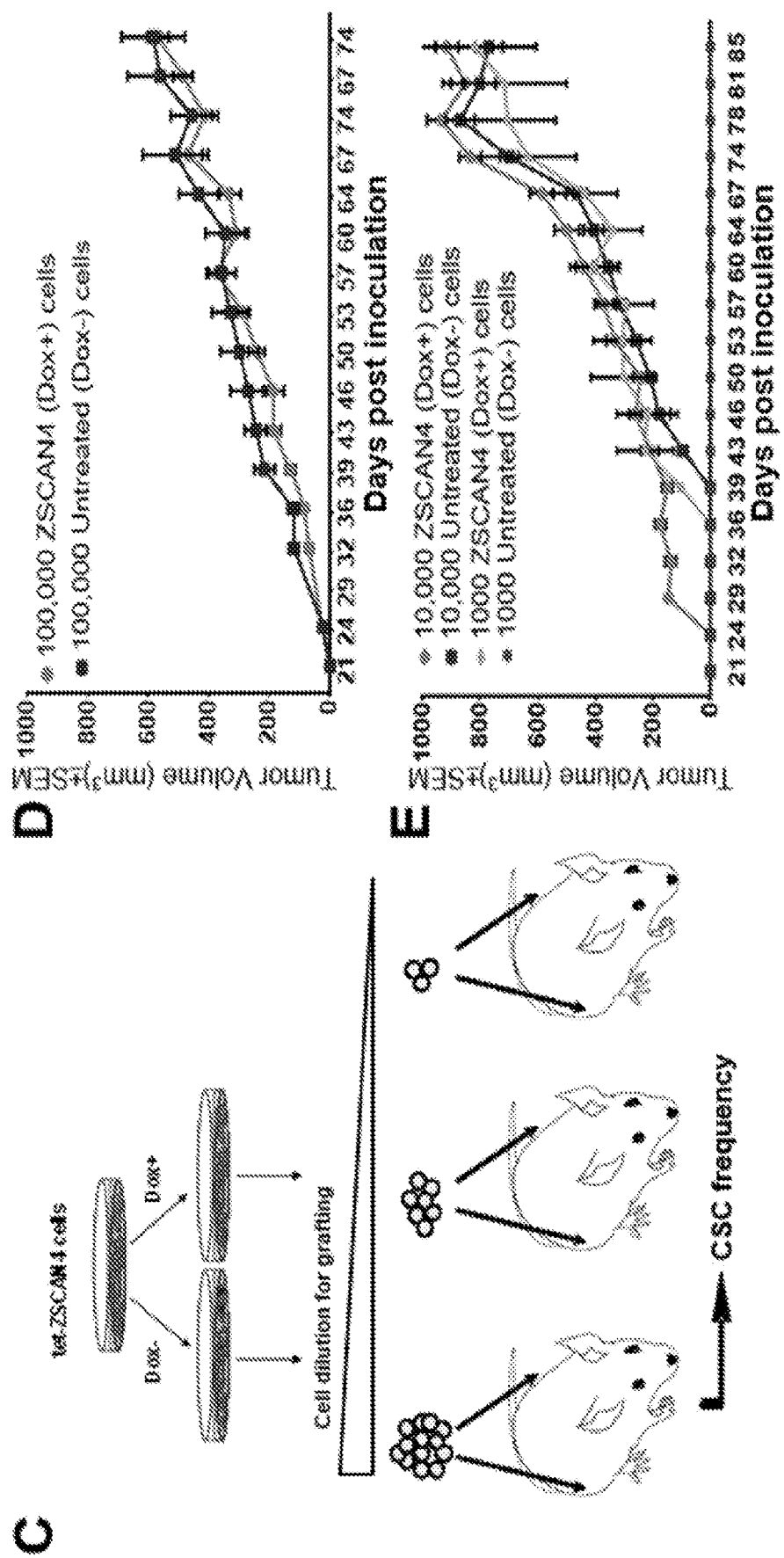

Then, to define the effect of ZSCAN4, we used a pulse of ZSCAN4 induction by incubation of the tet-ZSCAN4 cells (Tu167 and 012SCC) with Dox for 48 hours. Untreated (Dox−) cells were used as controls. Cells were then grown as tumorspheres for up to 11 days without Dox. As additional controls for the potential effects of Dox, we used isogenic Empty wild type (WT) cells in the absence (Dox−) or presence of Dox (Dox+). Our data indicate that ZSCAN4 induction significantly increases both the number and size of tumorspheres (FIG. 3A, B).

To determine the effect of ZSCAN4 on tumorgenicity in vivo, we utilized the extreme limiting dilution assay (ELDA) in the immune compromised NSG (NOD/SCID/IL2Rγ−/−) mouse xenograft model (Ohbo K, Suda T, Hashiyama M, Mantani A, Ikebe M, Miyakawa K et al. Modulation of hematopoiesis in mice with a truncated mutant of the interleukin-2 receptor gamma chain. Blood 1996; 87: 956-967.) tet-ZSCAN4 (Tu167) cells were treated (Dox+) or untreated (Dox−) with Dox for 48 hours in culture and then injected into the right and left flanks of NSG mice at concentrations of 1000 to 100,000 cells and monitored over 85 days (FIG. 3C). No Dox was given to the mice throughout the experiment. When 100,000 cells were inoculated, no significant difference was detected compared to the untreated controls (Dox−) (FIG. 3D). Remarkably however, when 10,000 cells were injected, (Dox+) tumors were measurable within 29 days (n=8) compared to untreated cells which were palpable only after 43 days (n=4), yet tumors measurable only after 60 days (n=7). More strikingly, inoculation of 1,000 cells shows that ZSCAN4 induced cells formed tumors as early as 39 days, while the untreated cells formed no tumors (FIG. 3E). Following the termination of the experiment, the frequency of CSC was calculated by L-Calc software (StemCell Technologies) and indicated that ZSCAN4 induction prior to inoculation significantly increases the CSC frequency to 1 in every 721 cells ($p<0.0001$), whereas only 1 in 4746 control (Dox−) cells had the ability to form tumors (Table 4).

Table 4: ELDA assay In vivo show that ZSCAN4 induction significantly increases the frequency of CSC ($p<0.0001$). Tu167 tet-ZSCAN4 cells were treated (Dox+) or untreated (Dox−) for 48 hours and then engrafted into NGS immune-deficient mice. Mice were not treated with Dox thereafter. The development of xenografts was assessed up to 85 days post inoculation. Frequency of CSC were calculated using L-Calc software.

| Group | No. of Cells/Inoculation | | | CSC Frequency |
|---|---|---|---|---|
| | 100,000 | 10,000 | 1,000 | (1 in/ . . .) $p < 0.0001$ |
| tet-ZSCAN4 Dox− | 6/6 | 7/8 | 0/8 | 4,746 |
| tet-ZSCAN4 Dox+ | 6/6 | 8/8 | 6/8 | 721 |

Figure 10:
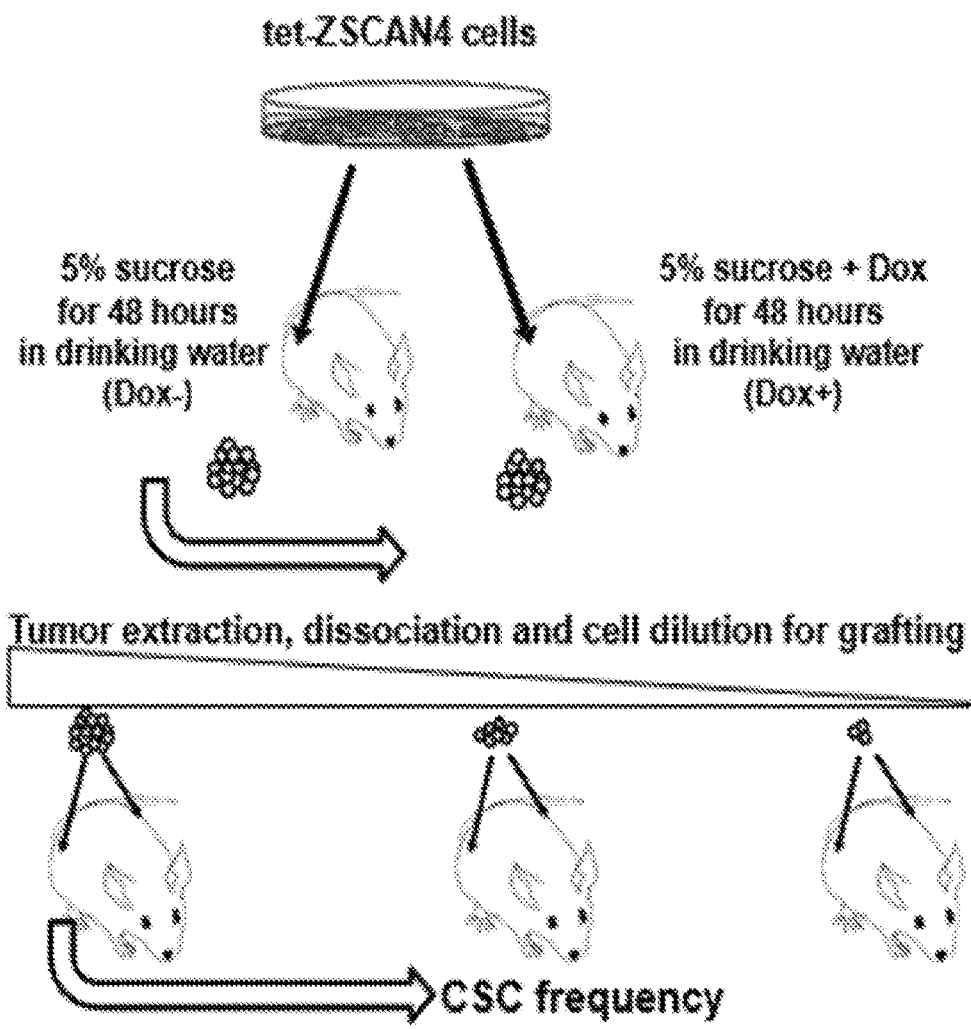
FIG. 10. ELDA assay following ZSCAN4 induction in vivo show that secondary tumors and the frequency of CSC are significantly increased (p<0.001). One million Tu167 tet-ZSCAN4 cells were engrafted into NGS immune-deficient mice. A day later, the mice were treated (Dox+) or untreated (Dox−) in the drinking water for 48 hours. Mice were not treated with Dox thereafter and xenografts were formed for 37 days. Next, tumors were excised and in vivo ELDA was performed without additional Dox treatment, with secondary tumors in the indicated cell concentrations. The development of xenografts was assessed 40 days post inoculation. Frequencies of CSC were calculated using L-Calc software.

CSCs are defined by their ability to form secondary tumors upon injection of cells at extremely low cell numbers into immune-deficient mice. Therefore, to determine the effect of in vivo ZSCAN4 induction on CSC frequency, primary tumors were made in NSG mice (n=8). To induce ZSCAN4 in vivo, a day after inoculation, a solution of 200 µg/ml doxycycline in 5% sucrose was added to drinking water (Dox+) for 48 hours to one group (n=4), while only 5% sucrose was given to the untreated control group (Dox−) (n=4). Mice were allowed to develop tumors and kept thereafter without Dox for an additional 5 weeks. Next, for in vivo ELDA, tumors were excised, and mice were inoculated with 100,000, 10,000 or 1000 dissociated tumor cells (n=10 per group) to generate secondary tumors and monitored daily for 7 weeks. Although the in vivo ZSCAN4 induction event by Dox was temporally remote (total of 12 weeks), our ELDA indicate a significant 2.5-fold increase ($p<0.001$) in CSC frequency in vivo (FIG. 10). These data suggest a long-lasting effect for ZSCAN4 on CSC frequency.

ZSCAN4 Promotes Stem Cell Factor Expression

Figure 4:
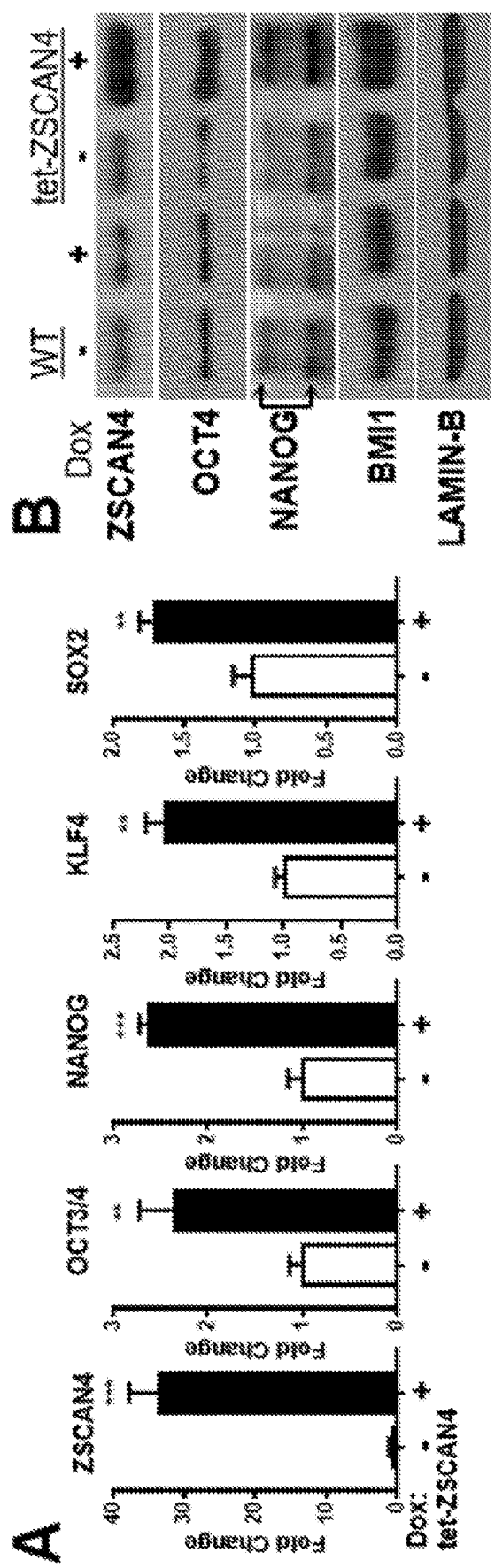
FIG. 4. Induction of ZSCAN4 promotes CSC factor expression and facilitates chromatin remodeling. ZSCAN4 induction (tet-ZSCAN4 Tu167 cells) results in a significant increase in A, pluripotency factor expression (OCT3/4, NANOG, KLF4, and SOX2) as shown by qRT-PCR. Data shown as mean±S.E.M. observed in triplicate in three independent experiments. Separate t-tests confirm a significant difference from isogenic untreated cells: $p<0.01$, $*p<0.001$. B, Immunoblots show a marked increase in pluripotency and CSC markers. C, Immunoblot analyses indicate ZSCAN4 induction leads to an increase in open chromatin marks: histone 3 (H3) acetylation at lysine residues 14, 18 and 27 (K14ac, K18ac, K27ac) and H3K4 methylation (H3K4me). H3 was used as a loading control. D, ChIP-qPCR indicates a significant enrichment in histone 3 acetylation at Lysine 14 and 27 at NANOG and OCT3/4 promoters after ZSCAN4 induction. Data shown as mean±S.E.M. The statistical significance between the two groups was determined by separate t-tests $*p<0.01$. $**p<0.0001$.
Figure 4:
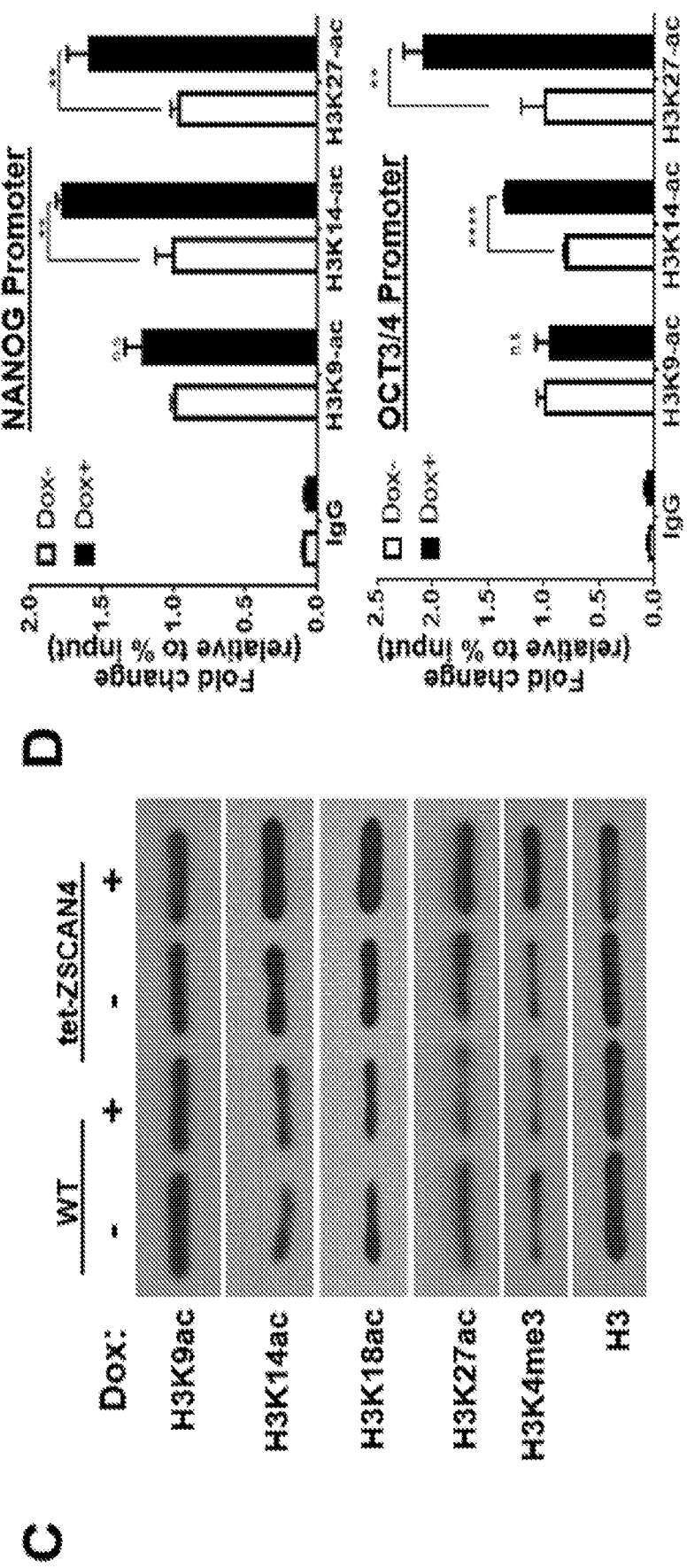
Figure 11:
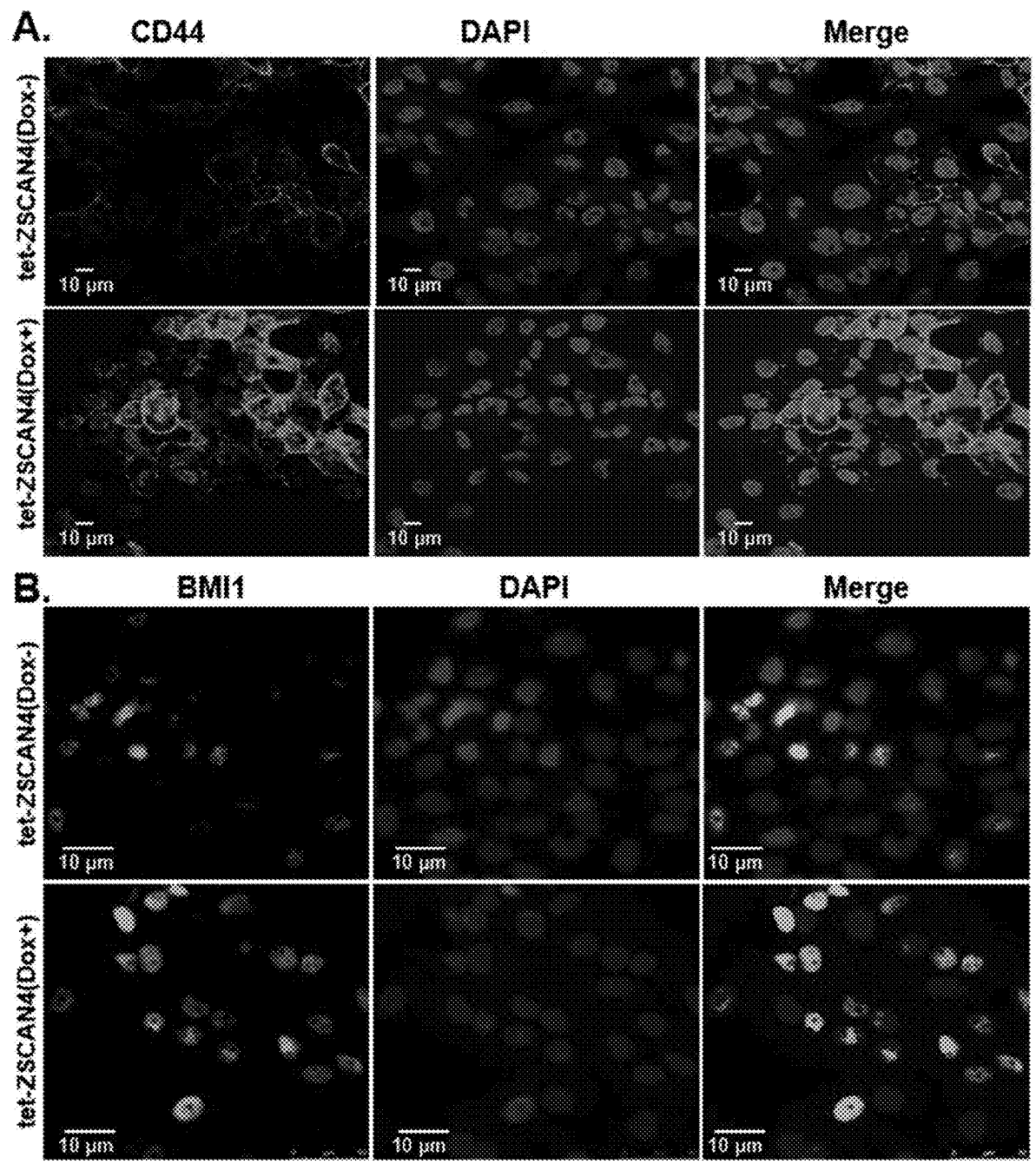
FIG. 11. ZSCAN4 induction leads to increase in CSC markers. Immunostaining of the HNSCC cancer stem cell factors: A, CD44 and B, BMI1 before (Dox−) and after ZSCAN4 induction (Dox+) indicate a significant increase in CSC marker frequency and intensity. (TU167 cell line). Nuclei are stained with DAPI.

CSCs harness stem-cell related mechanisms to improve survival and have been reported to display higher expression levels of the core pluripotency genes OCT3/4, NANOG, KLF4 and SOX2 (Ben-Porath I, Thomson M W, Carey V J, Ge R, Bell G W, Regev A et al. An embryonic stem cell-like gene expression signature in poorly differentiated aggressive human tumors. Nat Genet 2008; 40: 499-507.; Chiou S H, Yu C C, Huang C Y, Lin S C, Liu C J, Tsai T H et al. Positive correlations of Oct-4 and Nanog in oral cancer stem-like cells and high-grade oral squamous cell carcinoma. Clin Cancer Res 2008; 14: 4085-4095.; Prince M E, Ailles L E. Cancer stem cells in head and neck squamous cell cancer. Journal of clinical oncology: official journal of the American Society of Clinical Oncology (Review) 2008; 26: 2871-2875.; Okamoto A, Chikamatsu K, Sakakura K, Hatsushika K, Takahashi G, Masuyama K. Expansion and characterization of cancer stem-like cells in squamous cell carcinoma of the head and neck. Oral Oncol 2009; 45: 633-639.; Ailles L, Prince M. Cancer stem cells in head and neck squamous cell carcinoma. Methods Mol Biol 2009; 568: 175-193.; Chiou S H, Wang M L, Chou Y T, Chen C J, Hong C F, Hsieh W J et al. Coexpression of Oct4 and Nanog enhances malignancy in lung adenocarcinoma by inducing cancer stem cell-like properties and epithelial-mesenchymal transdifferentiation. Cancer research (Research Support, Non-U.S. Gov't) 2010; 70: 10433-10444). Furthermore, high expression of these transcription factors has been shown to mark CSCs and promote their survival and self-renewal (Chiou S H, Yu C C, Huang C Y, Lin S C, Liu C J, Tsai T H et al. Positive correlations of Oct-4 and Nanog in oral cancer stem-like cells and high-grade oral squamous cell carcinoma. Clin Cancer Res 2008; 14: 4085-4095.; (Leis O, Eguiara A, Lopez-Arribillaga E, Alberdi M J, Hernandez-Garcia S, Elorriaga K et al. Sox2 expression in breast tumours and activation in breast cancer stem cells. Oncogene (Research Support, Non-U.S. Gov't) 2012; 31: 1354-1365.; Liu A, Yu X, Liu S. Pluripotency transcription factors and cancer stem cells: small genes make a big difference. Chinese journal of cancer (Research Support, Non-U.S. Gov't Review) 2013; 32: 483-487.; Lu Y, Zhu H, Shan H, Lu J, Chang X, Li X et al. Knockdown of Oct4 and Nanog expression inhibits the stemness of pancreatic cancer cells. Cancer letters (Research Support, Non-U.S. Gov't) 2013; 340: 113-123). We therefore tested the effect of ZSCAN4 on the core pluripotency genes in our tet-ZSCAN4 cell lines (Tu167 and 012SCC cells). Our data by qRT-PCR indicate that ZSCAN4 induction for 48 hours leads to significant upregulation of OCT3/4 ($p<0.01$), NANOG ($p<0.0001$), KLF4 ($p<0.01$) and SOX2 ($p<0.01$) (FIG. 4A). The increase in CSC factors was further validated by immunoblot (FIG. 4B) and by immunostaining with HNSCC CSC markers BMI1 and CD44 (FIG. 11). These findings are important as these factors directly regulate the expression of tumor stemness and proliferation genes (Spafford M F, Koeppe J, Pan Z, Archer P G, Meyers A D, Franklin W A. Correlation of tumor markers p53, bcl-2, CD34, CD44H, CD44v6, and Ki-67 with survival and metastasis in laryngeal squamous cell carcinoma. Arch Otolaryngol Head Neck Surg 1996; 122: 627-632.; Siddique H R, Saleem M. Role of BMI1, a stem cell factor, in cancer recurrence and chemoresistance: preclinical and clinical evidences. Stem Cells (Research Support, U.S. Gov't, Non-P.H.S. Review) 2012; 30: 372-378.) and suggest that ZSCAN4 promotes the upregulation of pluripotency and CSC markers.

ZSCAN4 Induction Facilitates Chromatin Remodeling at Pluripotency Gene Promoters To accommodate the transcriptional programs that maintain pluripotency, ES and iPSC adopt an open chromatin state (Gaspar-Maia A, Alajem A, Meshorer E, Ramalho-Santos M. Open chromatin in pluripotency and reprogramming. Nat Rev Mol Cell Biol (Research Support, N.I.H., Extramural Research Support, Non-U.S. Gov't Review) 2011; 12: 36-47.). Interestingly, murine Zscan4 expression has been found to correlate with more efficient nuclear reprogramming during generation of iPSC, as well as with heterochromatin de-condensation marks in mES cells, specifically with histone hyperacetylation (Portney B A, Khatri R, Meltzer W A, Mariano J M, Zalzman M. ZSCAN4 is negatively regulated by the ubiquitin-proteasome system and the E3 ubiquitin ligase RNF20. Biochem Biophys Res Commun 2018; 498: 72-78.; Akiyama T, Xin L, Oda M, Sharov A A, Amano M, Piao Y et al. Transient bursts of Zscan4 expression are accompanied by the rapid derepression of heterochromatin in mouse embryonic stem cells. DNA research: an interactional journal for rapid publication of reports on genes and genomes (Research Support, N.I.H., Intramural Research Support, Non-U.S. Gov't) 2015; 22: 307-318.) Still, it remained unclear if ZSCAN4 was involved in this process. To determine if expression of human ZSCAN4 leads to similar epigenetic changes in cancer cells, we examined a panel of acetylation patterns of Histone 3 Lysine residues 9, 14, 18, and 27 (H3K9ac, H3K14ac, H3K18ac and H3K27ac) after ZSCAN4 induction. We show by immunoblot analysis that ZSCAN4 induction for 24 hours leads to significantly elevated histone 3 hyperacetylation, particularly on Lysine residues 14, 18, and 27 (FIG. 4C).

To determine the functional relation between ZSCAN4, H3 hyperacetylation and pluripotency gene upregulation, we performed chromatin immunoprecipitation (ChIP) assays with antibodies specific to H3K14ac and H3K27ac following 24 hours of ZSCAN4 induction. We also included the antibody for H3K9ac as a control, as this histone acetylation mark remained at comparable levels after ZSCAN4 induction. Our data confirms the induction of ZSCAN4 leads to histone 3 hyperacetylation at NANOG and OCT3/4 promoters (FIG. 4D), suggesting its role in chromatin de-condensation and promoting CSC factor expression.

ZSCAN4 is Required for Maintenance of the CSC Phenotype

Figure 12:
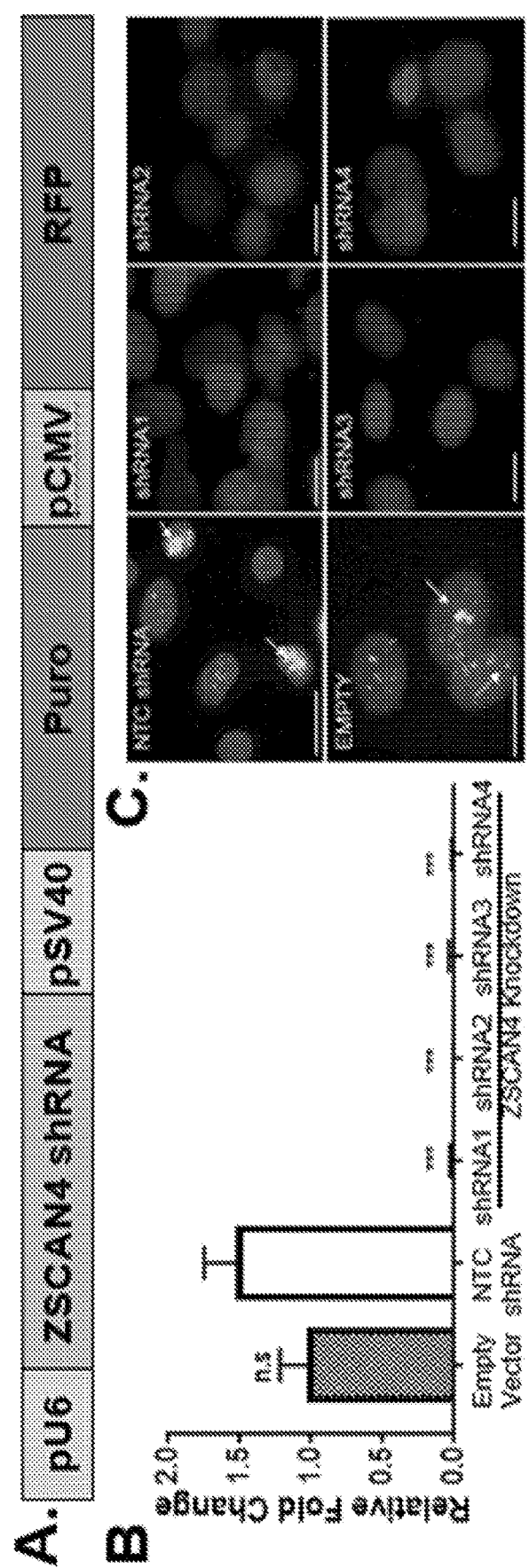
FIG. 12. Generation of ZSCAN4 knockdown cells. A, Illustration of ZSCAN4 knockdown vector used to transfect Tu167 and 012SCC cancer cell lines. B, Confirmation of ZSCAN4 knockdown by all four ZSCAN4 shRNA sequences (shRNA1-shRNA4) in Tu167 cells as shown by real-time qRT-PCR analysis. No significant (n.s) effect in ZSCAN4 expression was detected in NTC-shRNA control compared to isogenic cells transfected with Empty vector (same vector with no shRNA). *** Asterisks indicate p<0.001. C, Representative images of ZSCAN4 immunostaining in knockdown and isogenic controls. Panel shows nuclei of cells transfected with shRNA1-4. As controls we used cells transfected with Empty vector and cells expressing non-targeting control shRNA (NTC-shRNA). Scale bar=10 μm. Nuclei are stained by DAPI. Arrows mark ZSCAN4 foci.
Figure 13:
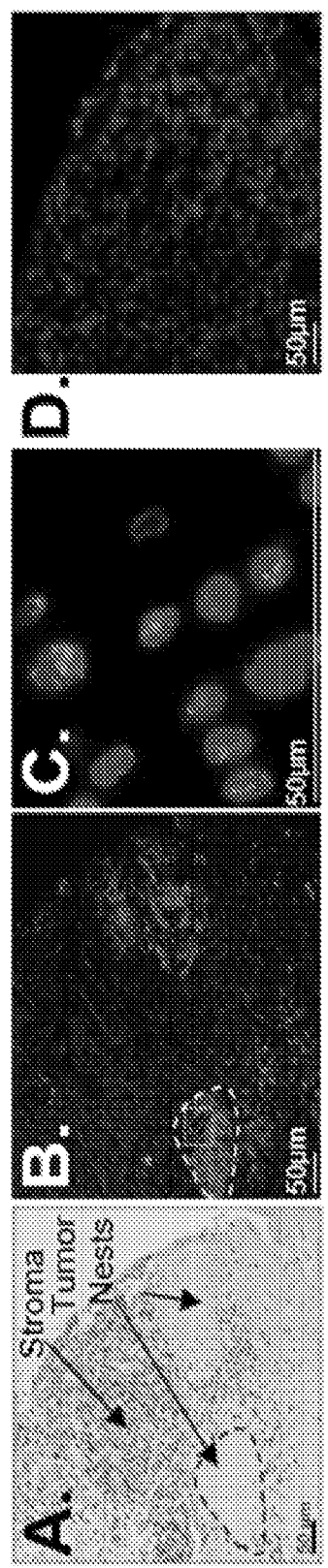
FIG. 13. ZSCAN4 is upregulated in cancer. A, A representative image of an oral cavity cancer core stained with H&E showing typical tumor nests. B, A consecutive slice of the same core, stained with anti-ZSCAN4. Truncated line marks one tumor nest and within it, a rectangle marks an area magnified in: C, A ×63 magnification showing nuclear ZSCAN4 foci. D, A representative image of normal tissue core is ZSCAN4 negative. Nuclei marked by DAPI. Size bars=50 μm. (E). qPCR analysis showing ZSCAN4 is positive in cancer cell lines (whereas normal human tonsil primary cell line controls pooled from five different donors are negative. Asterisks ***$p<0.0001$. Error bars indicate S.E.M. F, Immunoblot analysis of urea extracted nuclear fraction, whereas normal human tonsil primary cell lines and normal human tonsil tissue controls from five different donors are negative. Error bars indicate S.E.M ($p \leq 0.001$).
Figure 13:
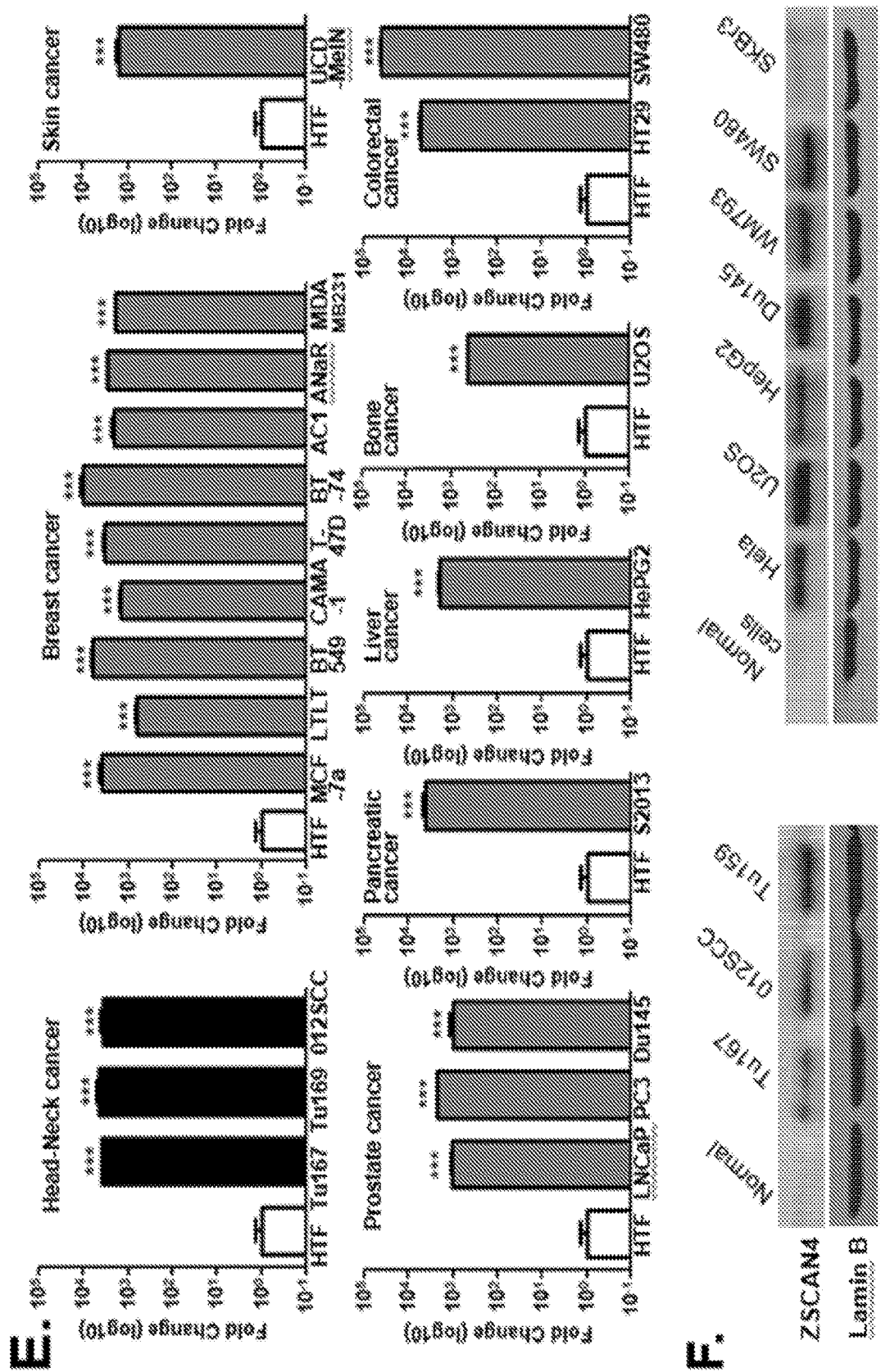

HNSCC CSCs are marked by high expression of the surface maker CD44 (Prince M E, Sivanandan R, Kaczorowski A, Wolf G T, Kaplan M J, Dalerba P et al. Identification of a subpopulation of cells with cancer stem cell properties in head and neck squamous cell carcinoma. Proc Natl Acad Sci USA 2007; 104: 973-978.; Ailles L, Prince M. Cancer stem cells in head and neck squamous cell carcinoma. Methods Mol Biol 2009; 568: 175-193.; Joshua B, Kaplan M J, Doweck I, Pai R, Weissman I L, Prince M E et al. Frequency of cells expressing CD44, a head and neck cancer stem cell marker: correlation with tumor aggressiveness. Head & neck 2012; 34: 42-49.; Spafford M F, Koeppe J, Pan Z, Archer P G, Meyers A D, Franklin W A. Correlation of tumor markers p53, bcl-2, CD34, CD44H, CD44v6, and Ki-67 with survival and metastasis in laryngeal squamous cell carcinoma. Arch Otolaryngol Head Neck Surg 1996; 122: 627-632.) and the polycomb repressive complex members EZH2 and BMI1 (Prince M E, Sivanandan R, Kaczorowski A, Wolf G T, Kaplan M J, Dalerba P et al. Identification of a subpopulation of cells with cancer stem cell properties in head and neck squamous cell carcinoma. Proc Natl Acad Sci USA 2007; 104: 973-978.; Siddique H R, Saleem M. Role of BMI1, a stem cell factor, in cancer recurrence and chemoresistance: preclinical and clinical evidences. Stem Cells (Research Support, U.S. Gov't, Non-P.H.S. Review) 2012; 30: 372-378.; Proctor E, Waghray M, Lee C J, Heidt D G, Yalamanchili M, Li C et al. Bmi1 enhances tumorigenicity and cancer stem cell function in pancreatic adenocarcinoma. PloS one (Research Support, N.I.H., Extramural Research Support, Non-U.S. Gov't) 2013.; 8: e55820; Allegra E, Trapasso S, Pisani D, Puzzo L. The role of BMI1 as a biomarker of cancer stem cells in head and neck cancer: a review. Oncology (Review) 2014; 86: 199-205.) EZH2 has been shown to be enriched in HNSCC where it is required for CSC survival (Adhikary G, Grun D, Balasubramanian S, Kerr C, Huang J M, Eckert R L. Survival of skin cancer stem cells requires the Ezh2 polycomb group protein. Carcinogenesis (Research Support, N.I.H., Extramural) 2015; 36: 800-810.; van Vlerken L E, Kiefer C M, Morehouse C, Li Y, Groves C, Wilson S D et al. EZH2 is required for breast and pancreatic cancer stem cell maintenance and can be used as a functional cancer stem cell reporter. Stem cells translational medicine 2013; 2: 43-52.) BMI-1 is upregulated in multiple cancers where it promotes the CSC phenotype and correlates with poor prognosis (Siddique H R, Saleem M. Role of BMI1, a stem cell factor, in cancer recurrence and chemoresistance: preclinical and clinical evidences. Stem Cells (Research Support, U.S. Gov't, Non-P.H.S. Review) 2012; 30: 372-378.; Proctor E, Waghray M, Lee C J, Heidt D G, Yalamanchili M, Li C et al. Bmi1 enhances tumorigenicity and cancer stem cell function in pancreatic adenocarcinoma. PloS one (Research Support, N.I.H., Extramural Research Support, Non-U.S. Gov't) 2013; 8: e55820; Allegra E, Trapasso S, Pisani D, Puzzo L. The role of BMI1 as a biomarker of cancer stem cells in head and neck cancer: a review. Oncology (Review) 2014; 86: 199-205.) Additionally, high expression of the pluripotency factors OCT3/4, NANOG and SOX2 also mark CSCs (Ben-Porath I, Thomson M W, Carey V J, Ge R, Bell G W, Regev A et al. An embryonic stem cell-like gene expression signature in poorly differentiated aggressive human tumors. Nat Genet 2008; 40: 499-507.; Chiou S H, Yu C C, Huang C Y, Lin S C, Liu C J, Tsai T H et al. Positive correlations of Oct-4 and Nanog in oral cancer stem-like cells and high-grade oral squamous cell carcinoma. Clin Cancer Res 2008; 14: 4085-4095.) To determine if ZSCAN4 is needed for the maintenance of CSC, and CSC marker expression, we first used pU6-ZSCAN4 shRNA knockdown vector (Origene) (containing RFP reporter gene and puromycin resistance gene) (FIG. 12A). We then tested the knockdown efficiency of four ZSCAN4 shRNA sequences (named shRNA1-shRNA4) by transfection into Tu167 HNSCC cells. As controls, we used scrambled non-targeting control shRNA (NTC-shRNA), and Empty vector (same vector without an shRNA sequence). Our data by reverse transcription (RT) qPCR (FIG. 12B), and immunostaining (FIG. 12C), confirm that all four shRNA sequences efficiently downregulate ZSCAN4 expression.

Figure 5:
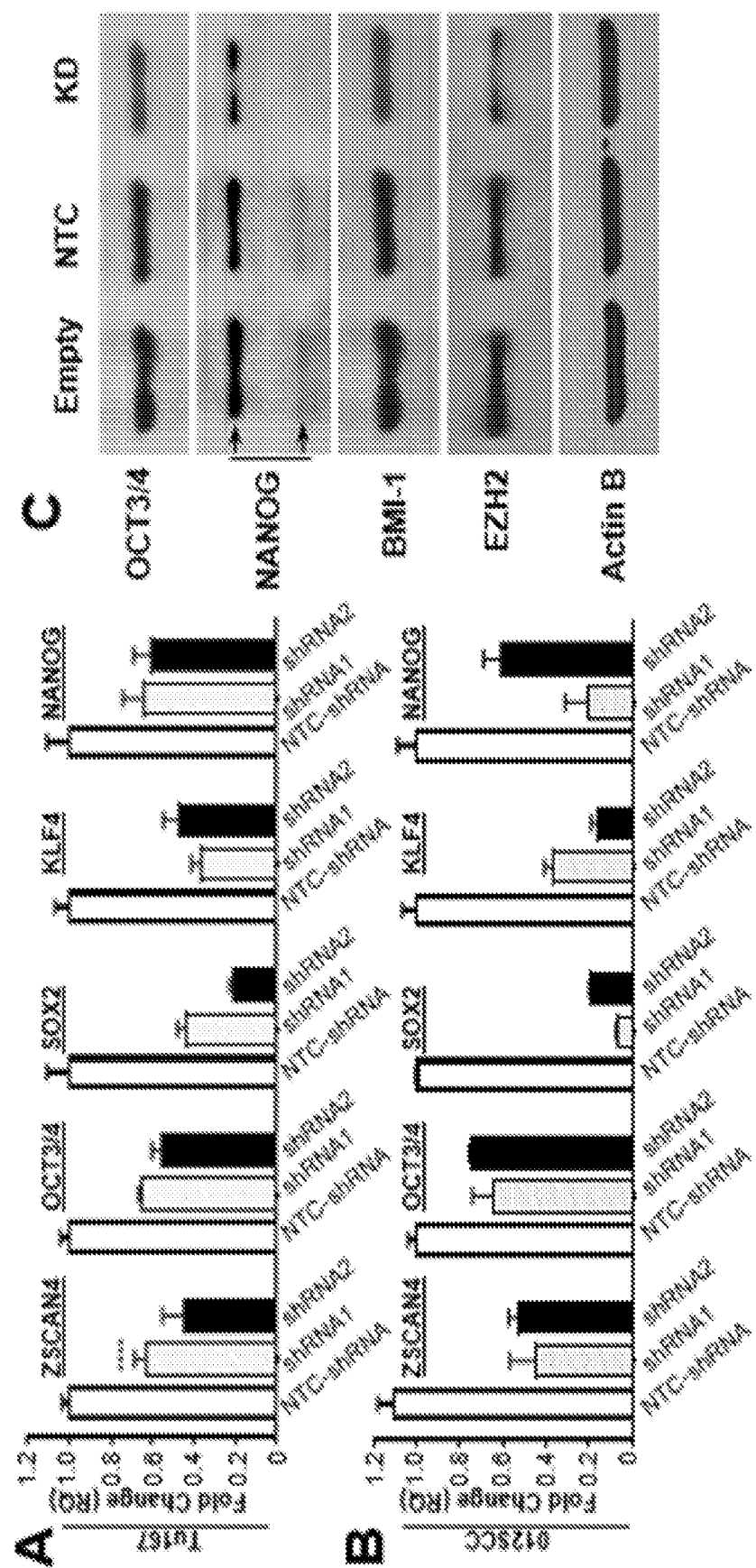
FIG. 5. ZSCAN4 is required for the expression of cancer stem cell markers A, RT-qPCR analysis of ZSCAN4 knockdown (KD) by two different shRNA (shRNA 1 and 2) in Tu167 and B, 012SCC, indicates that ZSCAN4 depletion results in decreased expression of the pluripotent stem cell factors OCT3/4, SOX2, KLF4 and NANOG compared to non-targeting control (NTC) shRNA in isogenic control cells. Asterisks indicate: $*p<0.05$, $p<0.01$, $*p<0.001$. The statistical significance was determined by two away ANOVA with multiple Tukey's post hoc tests. The reduction in pluripotency and CSC factors were further validated by: C, Immunoblot after ZSCAN4 knockdown compared to isogenic cells with Empty vector or NTC-shRNA expressing endogenous levels of ZSCAN4. Actin B was used as loading control. D, Representative images of co-immunostaining of SOX2 and NANOG as well as E, OCT3/4 and ZSCAN4. Nuclei are visualized by DAPI.
Figure 5:
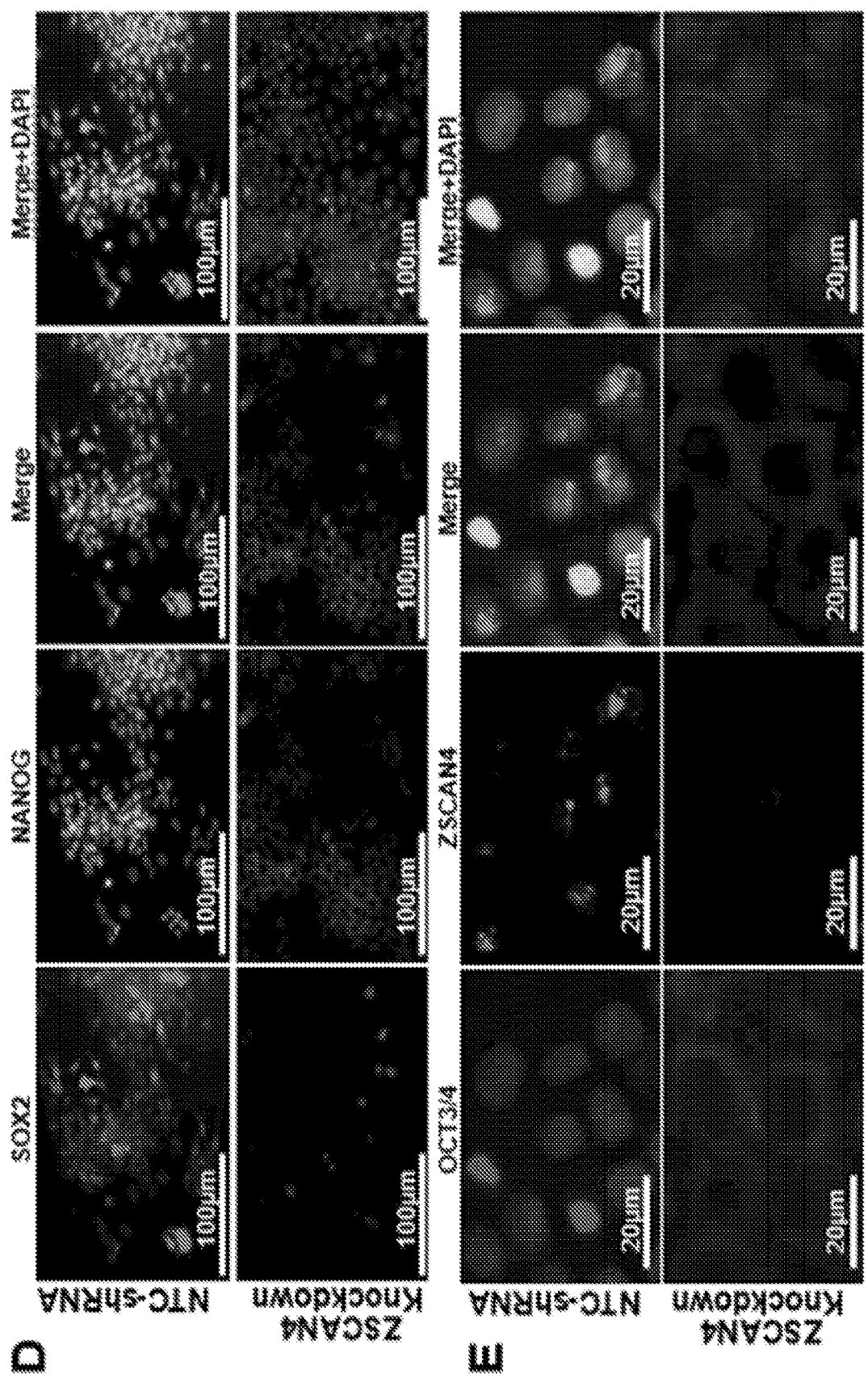

Next, we used two of the shRNA sequences (shRNA1 and shRNA2) to generate stable knockdown cell lines (in Tu167 and 012SCC cells). Isogenic cells for each cell line with NTC-shRNA, or empty vector were used as controls. Consistent with our finding that pluripotency factors are upregulated by ZSCAN4 induction (FIG. 4A, B), our results by qPCR assay in Tu167 (FIG. 5A) and 012SCC cells (FIG. 5B), indicate that ZSCAN4 depletion by two different shRNA (shRNA1 and 2) results in significant downregulation of OCT3/4, SOX2, KLF4 and NANOG. These data were further corroborated by immunoblot (FIG. 5C) and immunostaining (FIG. 5D, E). Our results further indicate a decrease in the CSC markers BMI1 and EZH2 (FIG. 5C). These data suggest that depletion of ZSCAN4 may alter HNSCC CSC potency.

Figure 6:
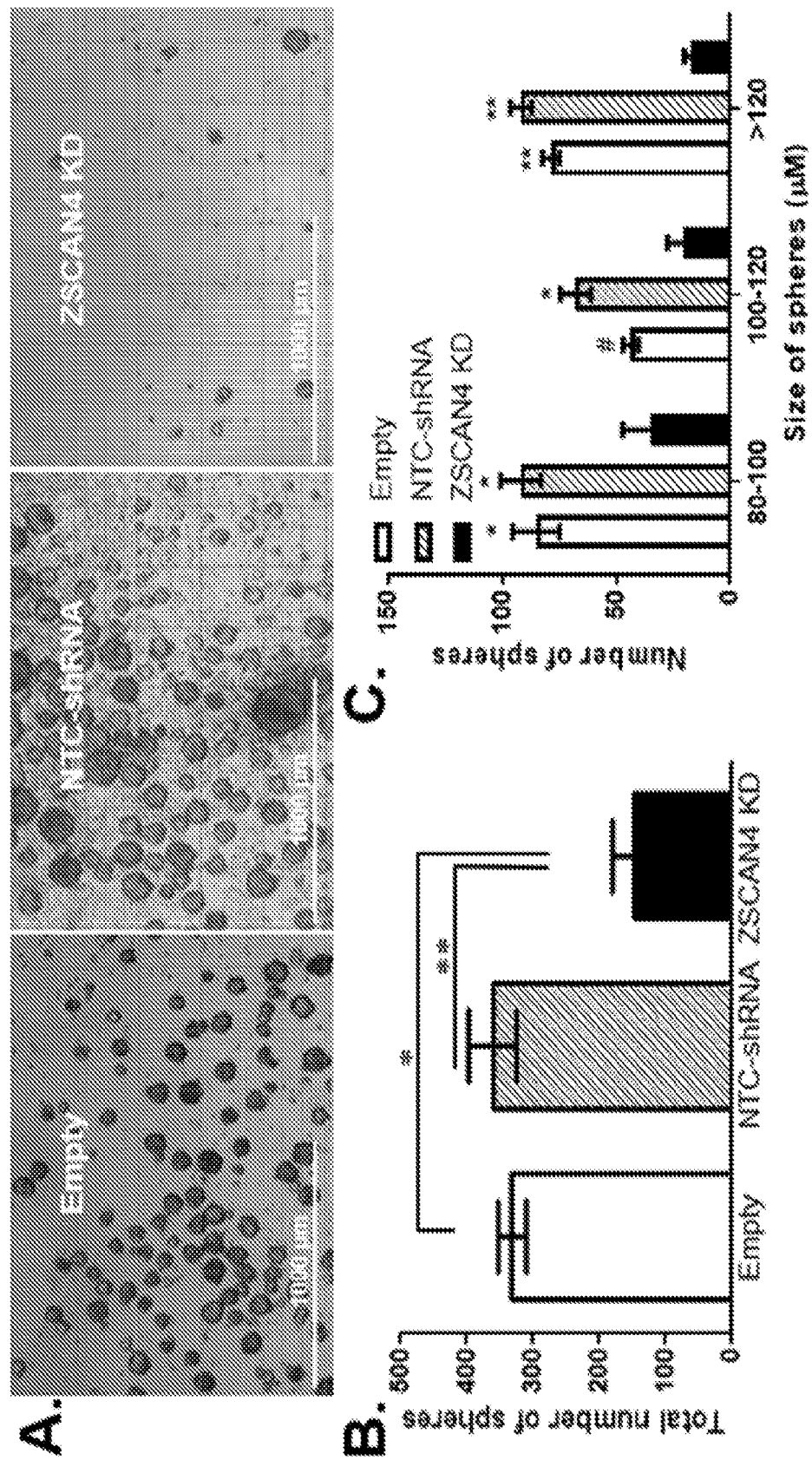
FIG. 6. ZSCAN4 is essential for tumorsphere growth and survival and depletion severely affects tumor growth. A, Representative images of tumorspheres in ZSCAN4 depleted cells compared to isogenic cells with Empty vector or NTC-shRNA. Scale bar indicate 1000 μm. B, ZSCAN4 Knockdown (KD) results in fewer and C, smaller tumorspheres when compared to both control cell lines (Empty and NTC-shRNA). Significance of data were confirmed by separate one-way ANOVAs followed by Tukey's post hoc tests. All data shown as mean±S.E.M. observed in triplicate in at least three independent experiments. Asterisks indicate: $*p<0.05$, $**p<0.01$. D, Schematic illustration of mouse xenograft model. NGS mice were injected subcutaneously with Tu167 ZSCAN4 knockdown cells (n=10), or NTC-shRNA cells as controls (n=10) and allowed to form xenograft tumors. E, Tumor volume at indicated time. Error bars denote S.E.M., (p≤0.001) starting from week 3. F, Kaplan-Meier survival curve of mice inoculated (p≤0.001); results are shown from day of cell injection to the day of euthanasia.
Figure 6:
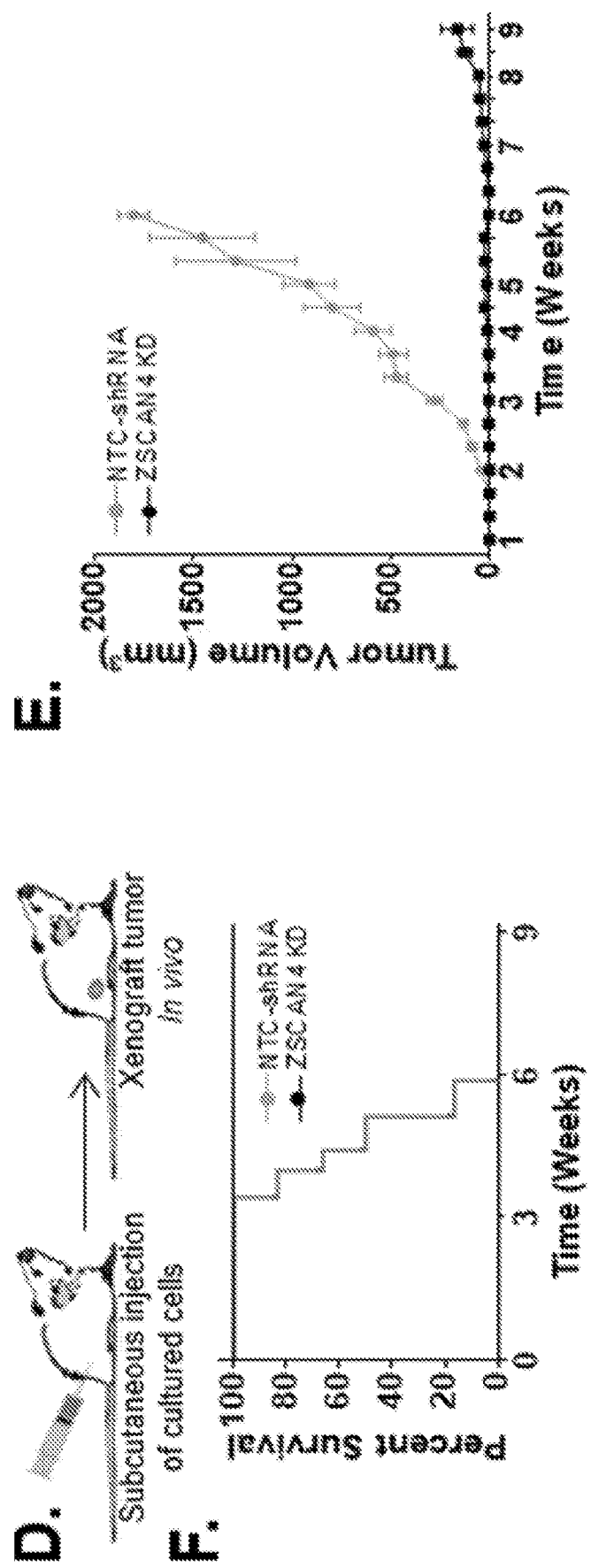

To determine if ZSCAN4 is necessary for spheroid formation, we performed tumorsphere formation assays in ZSCAN4 knockdown cell lines, the control isogenic NTC-shRNA, and Empty vector cells (FIG. 6A). Our results indicate that ZSCAN4 depletion leads to a dramatic reduction in the overall number (FIG. 6B) (p<0.01), and size of spheroids compared to both NTC-shRNA and Empty vector control cells (FIG. 6C) (p<0.01). Collectively, our data suggest that ZSCAN4 is essential for the maintenance of HNSCC CSCs and CSC factors.

ZSCAN4 Depletion Severely Affects Tumor Growth

To assess the potential of ZSCAN4 as a therapeutic target in cancer, we assessed the impact of ZSCAN4 depletion on tumor growth in vivo using the NSG (Ohbo K, Suda T, Hashiyama M, Mantani A, Ikebe M, Miyakawa K et al. Modulation of hematopoiesis in mice with a truncated mutant of the interleukin-2 receptor gamma chain. Blood 1996; 87: 956-967.) mouse xenograft model. We subcutaneously injected either $1 \times 10^6$ freshly generated ZSCAN4 knockdown cells (Tu167) or $1 \times 10^6$ isogenic non-targeting control NTC-shRNA cells into the flanks of female NSG mice (FIG. 6D). As expected, a large tumor develops in all the control mice injected with NTC-shRNA cells leading to the need for euthanasia by five weeks (FIG. 6F). Importantly, our data indicate that ZSCAN4 depletion results in a significant inhibition of more than 98% in tumor growth and only half of the mice present with a palpable tumor after 9 weeks. We show that ZSCAN4 knockdown inoculated mice survive (FIG. 6F) as the tumors remain significantly attenuated even at the 9-week endpoint (FIG. 6E, F). These data suggest that ZSCAN4 is required for tumor growth and development.

Example 2—ZSCAN4 Depletion Leads to Hypersensitivity to Genotoxic Drugs

Figure 14:
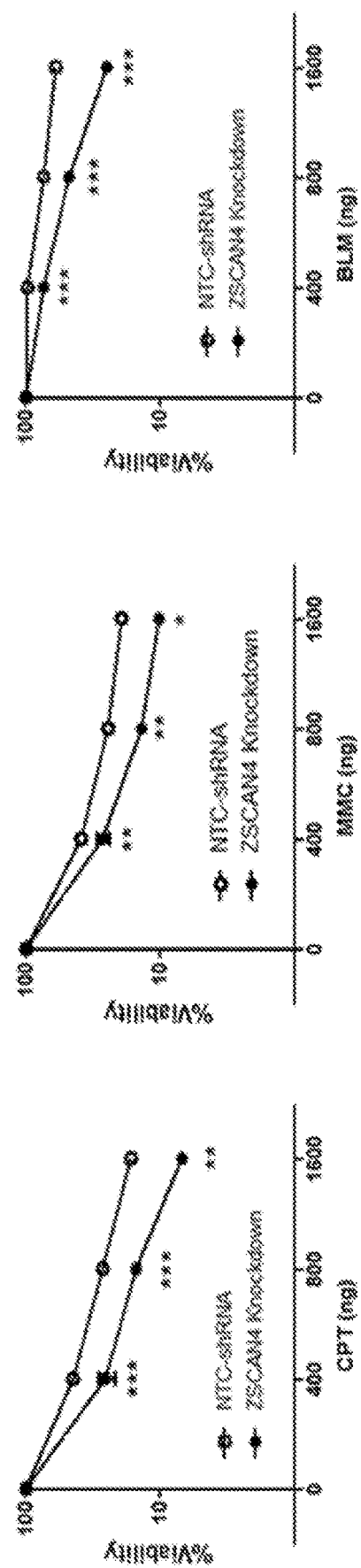
FIG. 14. ZSCAN4 Depletion leads to hypersensitivity to cytotoxic drugs. ZSCAN4 depleted cells display hypersensitivity to cytotoxic drugs when compared to non-targeting control (NTC) shRNA. Increasing doses of A, Cisplatin (CPT), B, Mitomycin C (MMC), and C, Bleomycin (BLM) and their viability was measured by MTT assay. All data shown as mean±S.E.M. observed in triplicate in at least three independent experiments. Asterisks indicate: *$p<0.05$, $p<0.01$, *$p<0.001$.
Figure 15:
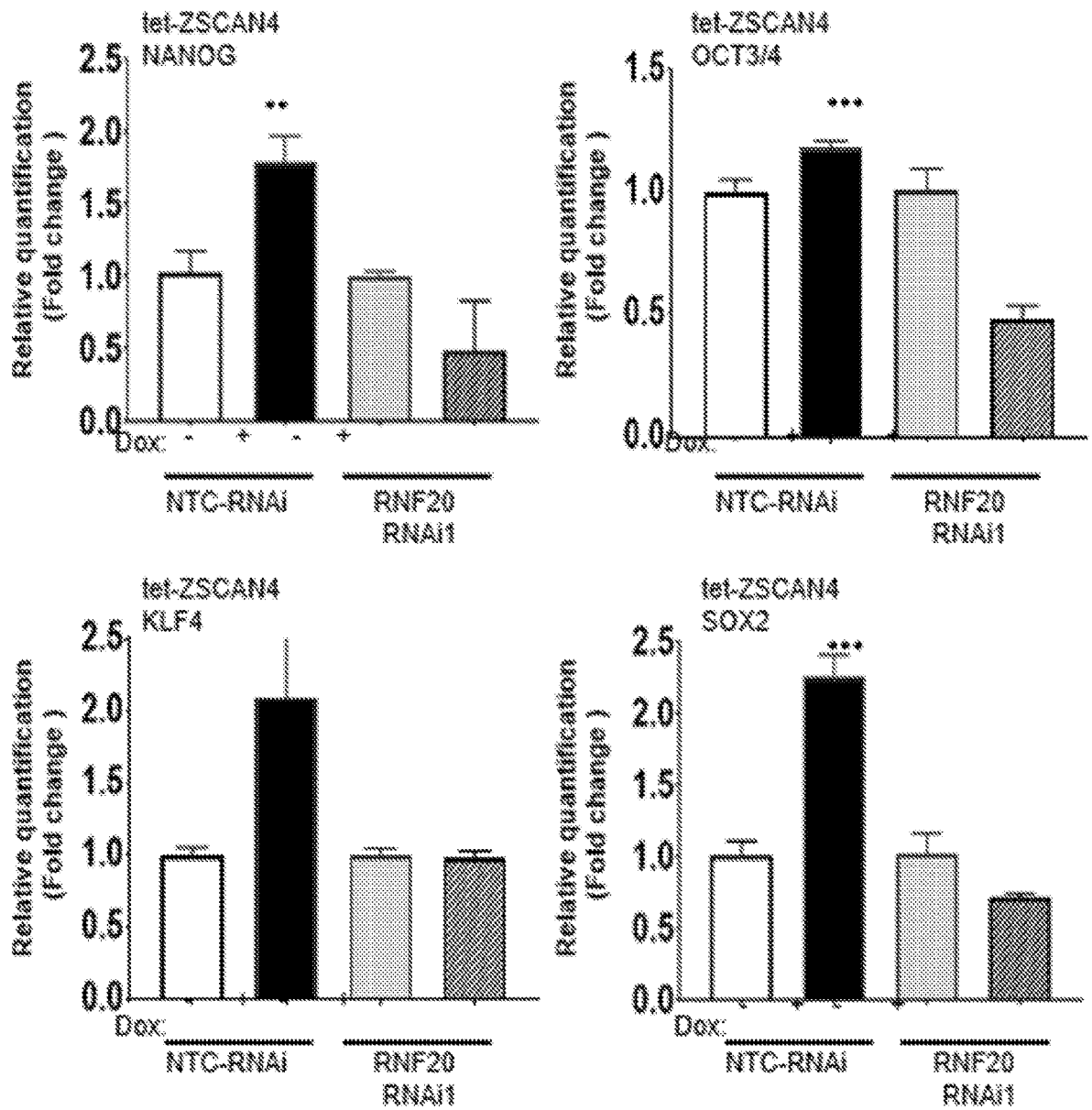
FIG. 15. ZSCAN4 Effect on Core Pluripotency Factors is RNF20 Dependent. When ZSCAN4 is induced, it leads to an increase in the core pluripotent factors expression (NANOG, OCT3/4, KLF4 and SOX2). However, depletion of RNF20 eliminates the effect of ZSCAN4 induction.
Figure 16:
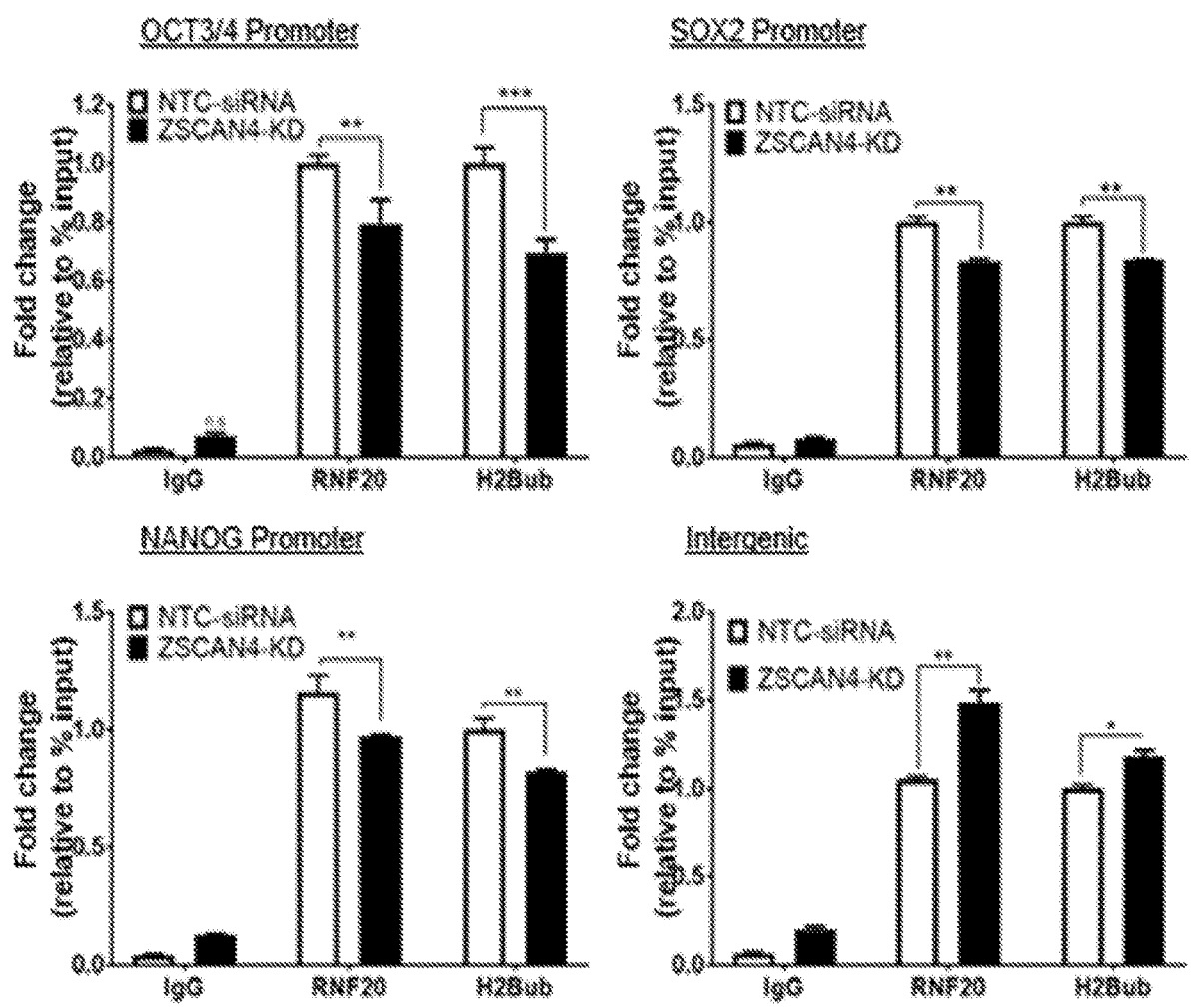
FIG. 16. ZSCAN4 is needed for RNF20 recruitment to the core pluripotency factors promoters. When ZSCAN4 is depleted by knockdown, a significant decrease in RNF20 localization at the promoters of OCT3/4, SOX2 and NANOG is observed in ChIP assay, but not in the intergenic controls. Accordingly, the effect of RNF20 on H2B ubiquitination is reduced at the same promoters.
Figure 17:
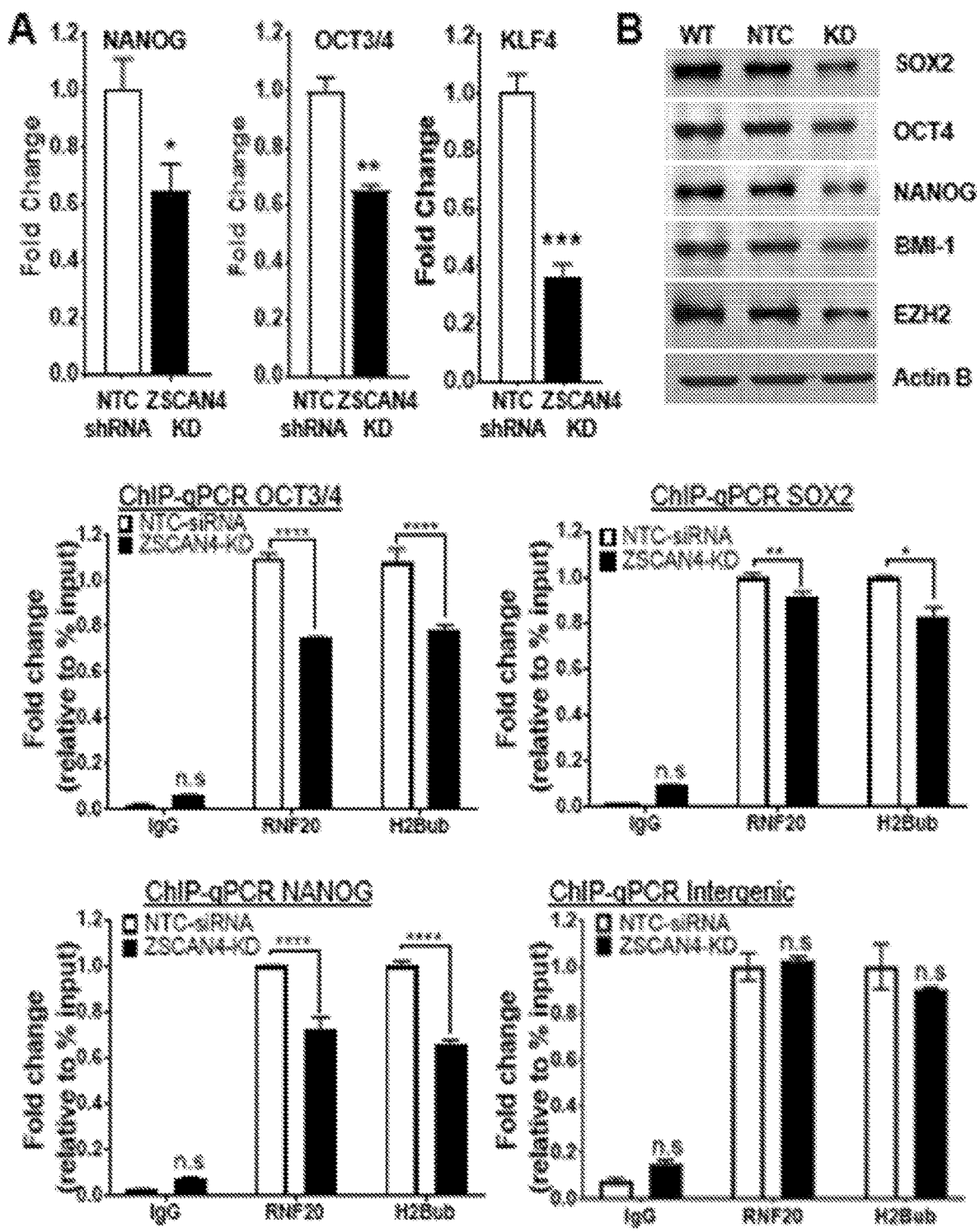
FIG. 17. ZSCAN4 is required for the expression of cancer stem cell markers. A, Real-time RT-qPCR analysis of ZSCAN4 knockdown (KD) in Tu167 and 012SCC indicate that loss of ZSCAN4 results in decreased expression of the pluripotent stem cell factors NANOG, OCT3/4. and KLF4 compared to non-targeting control (NTC) shRNA in isogenic HNSCC control cells. Asterisks indicate: *$p<0.05$, $p<0.01$, *$p<00.01$ (t-test). B, Immunoblot analysis validates the reduction in pluripotency and CSC factors after ZSCAN4 knockdown. Compared to wild type (WT) and isogenic cells expressing NTC-shRNA expressing normal levels of ZSCAN4.
Figure 18:
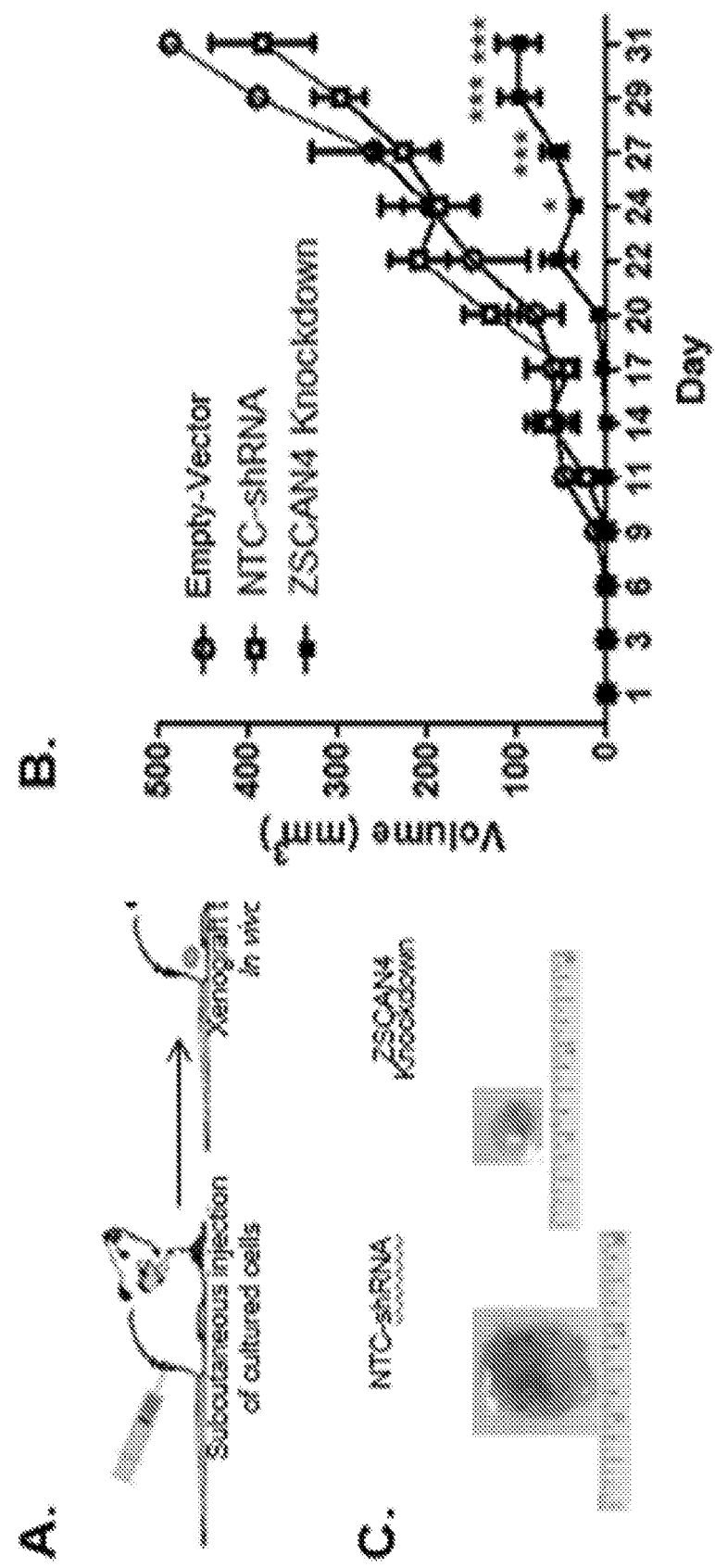
FIG. 18. ZSCAN4 depletion severely affects tumor growth. A, An illustration of mouse xenograft cancer tumor model. Cells were injected subcutaneously with either ZSCAN4 Knockdown (n=10), or NTC-shRNA as controls (n=10) in NGS mice and allowed to form tumors for up to 31 days. B, Mean±SEM of tumor volume (mm3) as measured at indicated days following injection. Asterisks represent a significant difference between ZSCAN4 Knockdown and the other groups at the marked days: *$p<0.05$, ***$p<0.001$. Tumors from ZSCAN4 Knockdown cells were significantly smaller starting from day 14 and continuously. C, Representative pictures of NTC-shRNA and ZSCAN4 depleted tumors in 30 mm plates, harvested at the termination of the experiment.
Figure 19:
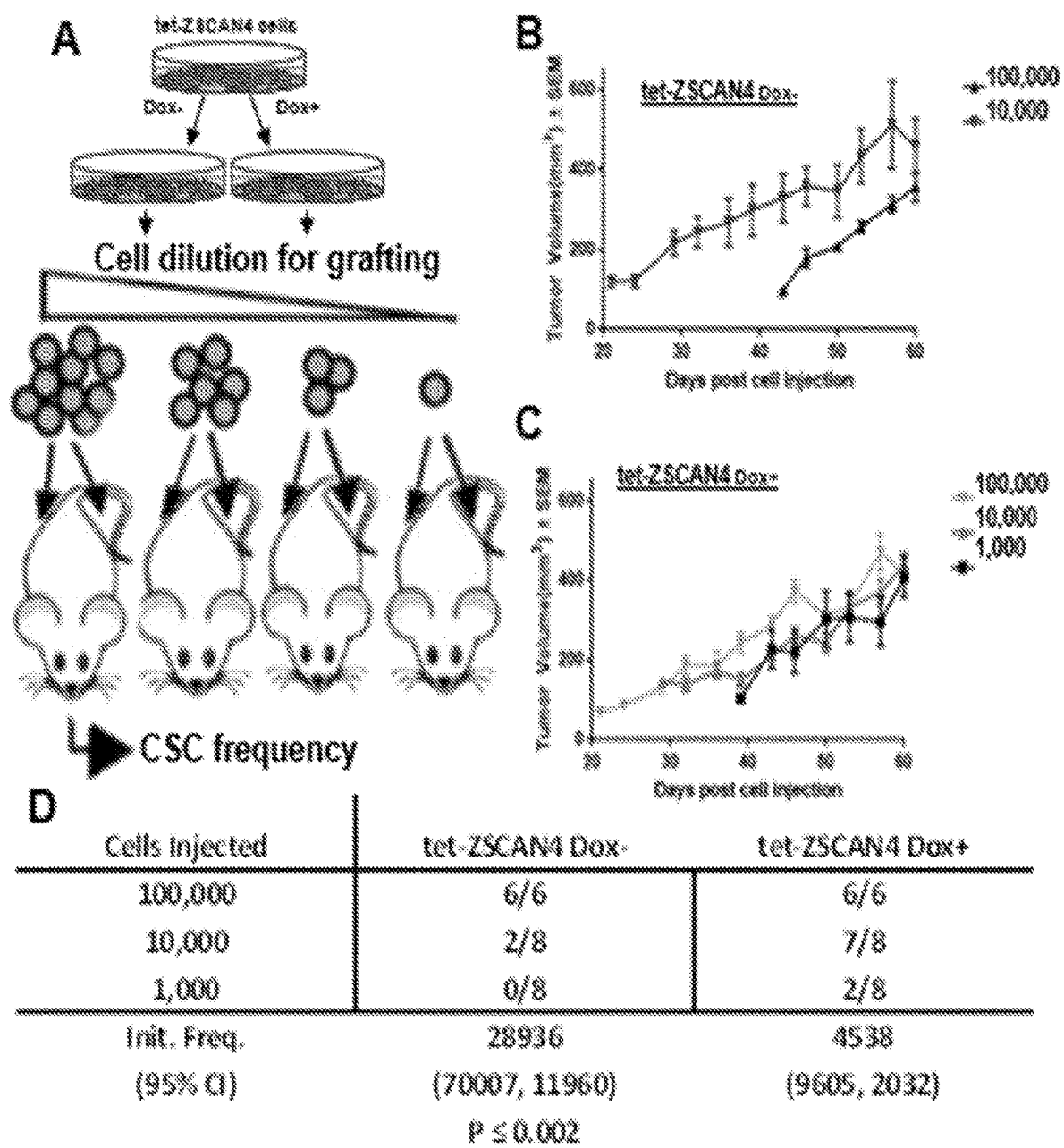
FIG. 19. ZSCAN4 increases CSC frequency and tumor formation. A, ELDA in vivo: An illustration of mouse xenograft ELDA to study CSC frequency by extreme limiting dilution assay. B, To perform in vivo ELDA, tet-ZSCAN4 (Tu167) cells treated or untreated with Dox, were injected subcutaneously into the right and left flank of NOD/SCID gamma immunodeficient mice in multiple increased dilution: 100,000 cells, 10,000 cells, 1000 cells and 100 cells per inoculation (n=8 tumors), in NSG mice and allowed to form tumors for up to 31 days.
Figure 20:
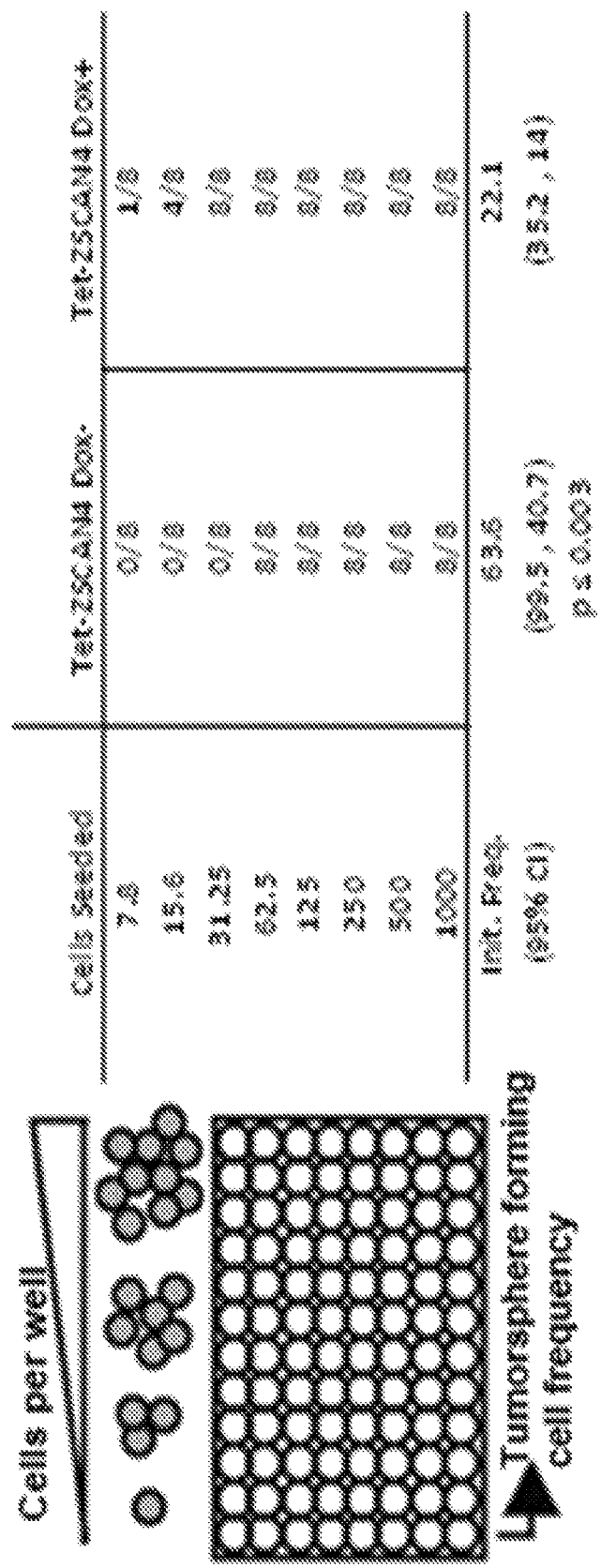
FIG. 20. Illustration of in vitro extreme limiting dilution assay (ELDA) and results showing that ZSCAN4 induction prior to tumorsphere formation assay significantly increases the frequency of CSC. $p<0.003$.
Figure 21:
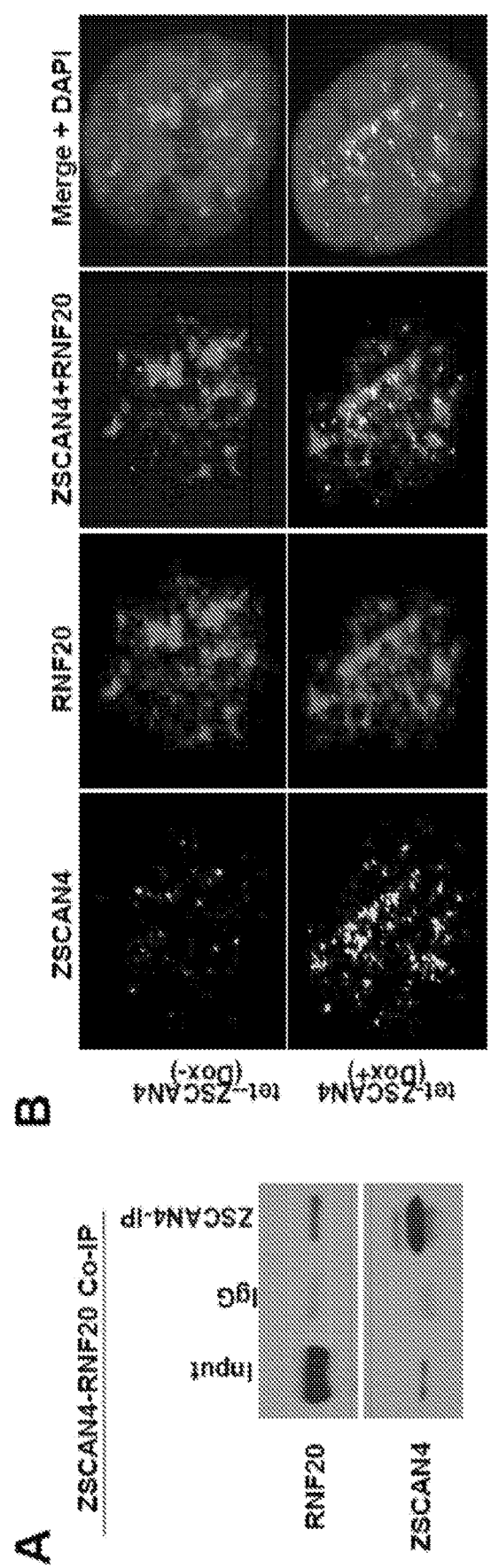
FIG. 21. ZSCAN4 interacts with the E3 ubiquitin ligase RNF20. A, ZSCAN4 and RNF20 co-immunopreipate. B, Immunoflourescence showing colocalization or ZSCAN4 and RNF20.
Figure 22:
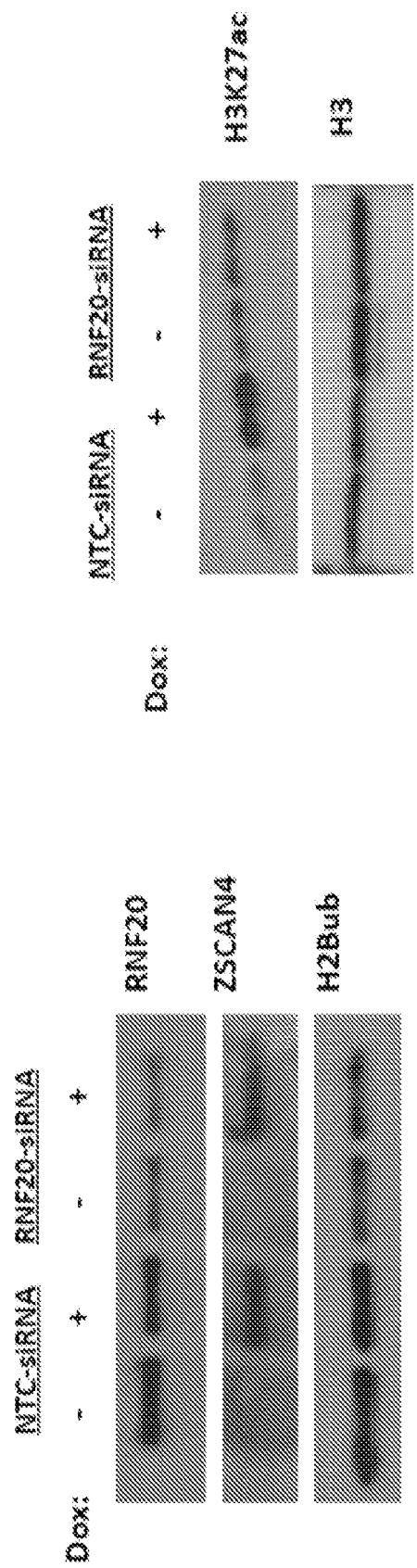
FIG. 22. ZSCAN4 mediated chromatin modifications are RNF20 dependent.
Figure 23:
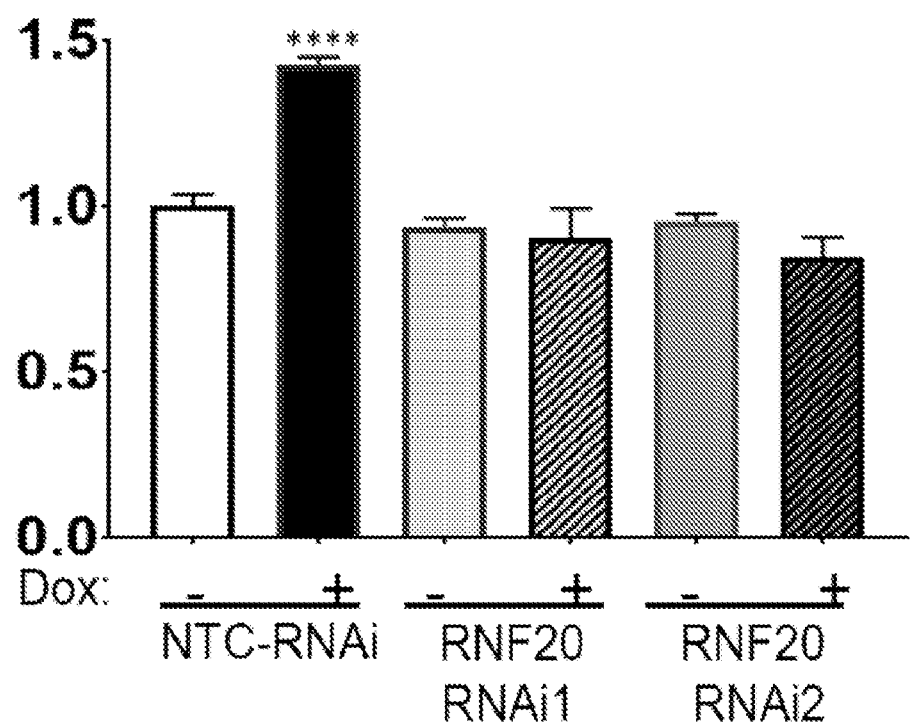
FIG. 23. ZSCAN4 effect on telomerase is RNF20 dependent.

Another hallmark of CSCs is multi-drug resistance, a major factor contributing to cancer recurrence. Therefore, we examined the role of ZSCAN4 in response to genotoxic drugs. To define the effect of ZSCAN4 on drug resistance, we measured cell viability after increasing doses of the DNA damaging drugs in ZSCAN4 depleted and control Tu167 cells. Drugs tested include Cisplatin (CPT), one of the major DNA crosslinking chemotherapeutic drugs used to treat HNSCC, Mitomycin C (MMC), another DNA crosslinker, and Bleomycin (BLM), a radiomimetic agent. As shown in (FIG. 14), treatment of ZSCAN4 depleted cells with the crosslinking drugs MMC and CPT results in significantly decreased cell viability compared to isogenic control NTC shRNA cells. Treatment of ZSCAN4 depleted Tu167 cells with BLM, a radiomimetic drug that simulates the DNA damage caused by radiation treatment, resulted in dramatically reduced cell viability compared to NTC-shRNA isogenic controls. These effects were confirmed by three separate two-way ANOVAs with repeated measure of drug exposure providing significant cell line by drug exposure interaction (MMC: $F_{(3)}=5.46$, $p<0.05$; CPT: $F_{(3)}=9.8$, $p<0.01$; BLM: $F_{(3)}=85.7$, $p<0.0001$). Bonferroni posthoc tests for each drug verified significant reduction in cell viability following ZSCAN4 depletion for each of the comparisons (all p's<0.05). Altogether, our data indicate that ZSCAN4 depletion leads to hypersensitivity to genotoxic drugs and suggests a role in drug resistance, further implicating ZSCAN4 as a functional marker for CSCs.

---

What is claimed is:

1. A composition for treating cancer in a subject, comprising an effective amount of an agent that inhibits the activity of ZSCAN4 in cancer cells in the subject and a pharmaceutically acceptable carrier, wherein the agent comprises a nucleic acid encoding an RNA interference molecule, wherein the RNA interference molecule comprises any of SEQ ID NOS:3-5.

2. The composition of claim 1, wherein the RNA interference molecule comprises SEQ ID NO:3.

3. The composition of claim 1, wherein the RNA interference molecule comprises SEQ ID NO:4.

4. The composition of claim 1, wherein the RNA interference molecule comprises SEQ ID NO:5.

* * * * *

SEQUENCE LISTING

```
<160> NUMBER OF SEQ ID NOS: 23

<210> SEQ ID NO 1
<211> LENGTH: 2230
<212> TYPE: DNA
<213> ORGANISM: Homo sapiens

<400> SEQUENCE: 1
ccttgtaatt cataaatctc tgaaaactta aaagtttgag caaagtttg tcatgtttct      60 atgagtaatt tataataaaa cttgatcaga atttgtgaga ctagcgtttg tctttatatt     120 ttccttttt tttttttttt tttgagacac agtctcgctc tgtcgtccag gctggagtgc     180
cgtggcgtaa tctcggctca ctgcaacctc tgcctcctgg attcaaacaa ttcttctgcc    240
tcagcctcct gagtagctgg gattacagga ccagtgatgg tatagaacac tgtattagag    300
acatggagct ggggctggat gaagattcca tcagtaattc aatcaacaga caagtgttat    360
ccaatcacgt ctttaaatca atcactgaca tggagctggg gctggatgaa gattccatca    420
gtaattcaat caacagacaa gtgttatcca atcacgtctt taaatcaatc actgatccca    480
gcccctataa aagggagcag ccttaggagg cacatcagat aaacccagtg tggaaagcta    540
gtcacacatc agctcagtgt tcggcccggg attacccagt caaccaagga gcttgcagtt    600
ttaaagaatc caccaactgt tgaaacaaat ccctagagac acaaggcaag agactgaatc    660
atcaaagtaa agtctctctg agaattattg ctaagaatgg ctttagatct aagaaccata    720
tttcagtgtg aaccatccga gaataatctt ggatcagaaa attcagcgtt tcaacaaagc    780
caaggacctg ctgttcagag agaagaaggg atttctgagt tctcaagaat ggtgctcaat    840
tcatttcaag acagcaataa ttcatatgca aggcaggaat tgcaaagact ttataggatc    900
tttcactcat ggctgcaacc agaaaagcac agcaaggatg aaattatttc tctattagtc    960
ctggagcagt ttatgattgg tggccactgc aatgacaaag ccagtgtgaa agagaaatgg   1020
```

```
aaatcaagtg gcaaaaactt ggagagattc atagaagacc tgactgatga cagcataaat    1080
ccacctgcct tagtccacgt ccacatgcag ggacaggaag ctctcttttc tgaggatatg    1140
cccttaagag atgtcattgt tcatctcaca aaacaagtga atgcccaaac cacaagagaa    1200
gcaaacatgg ggacaccctc ccagacttcc caagatactt ccttagaaac aggacaagga    1260
tatgaagatg aacaagatgg ctggaacagt tcttcgaaaa ctactcgagt aaatgaaaat    1320
attactaatc aaggcaatca aatagtttcc ctaatcatca tccaggaaga gaacggtcct    1380
aggcctgaag agggaggtgt tcttctgac aacccataca actcaaaaag agcagagcta    1440
gtcactgcta gatctcagga agggtccata aatggaatca cttttccaagg tgtccctatg    1500 gtgatgggag cagggtgtat ctctcaacca gagcagtcct cccctgagtc tgcccttacc    1560
caccagagca atgagggaaa ttccacatgt gaggtacatc agaaaggatc ccatggagtc    1620
caaaaatcat acaaatgtga agaatgcccc aaggtcttta agtatctctg tcacttatta    1680
gctcaccaga aagacacag gaatgagagg ccatttgttt gtcccgagtg tcaaaaaggc    1740
ttcttccaga tatcagacct acgggtgcat cagataattc acacaggaaa gaagcctttc    1800
acatgcagca tgtgtaaaaa gtccttcagc cacaaaacca acctgcggtc tcatgagaga    1860
atccacacag gagaaaagcc ttatacatgt cccttttgta agacaagcta ccgccagtca    1920
tccacatacc accgccatat gaggactcat gagaaaatta ccctgccaag tgttccctcc    1980
acaccagaag cttcctaagc tgctggtctg ataatgtgta taaatatgta tgcaagtatg    2040
tatattccta tagtatttat ctacttagga tataagatat aatctcctga ttatgctttc    2100
aatttattgt cttgcttcat taaaatgtaa ggctaaggag agcatggaat ttgtcagttt    2160
tgttcactaa agtattccaa gtggttggga aagtggaaca tttccaagaa ccaataaatt    2220
tctgttgaat                                                         2230

<210> SEQ ID NO 2
<211> LENGTH: 3936
<212> TYPE: DNA
<213> ORGANISM: Homo sapiens

<400> SEQUENCE: 2
ggaagttctg ccttgtctcc gccgcgggtc aggggtgaga gctggaatct ctgcacgggc      60
cttggaaaac gactgtcttc ttctgccaaa atgtcaggaa ttggaaataa agagcagct     120 ggagaacctg gcacctccat gcctcctgag aagaaggcag ctgttgaaga ttcagggacc     180
acagtggaaa caattaagct aggaggtgtc tcttcaacgg aggaactaga cattagaaca     240
ctgcaaacca aaaatcgcaa gctggcagaa atgttggatc agcggcaggc cattgaagat     300
gaacttcgtg agcacattga aaaactgaa cgacgacagg ccactgatga tgcctcacta     360
ttgattgtca accgatactg gagtcagttt gatgaaaaca tccgtatcat ccttaaacgt     420
tatgatctgg gcagggcttg ggagaccta ctcacagaac gaaaagcccct tgttgtgcct     480 gaaccagaac cagactctga tagcaatcag gagcgtaaag atgaccgaga gagagggaa     540 gggcaagagc cagctttctc tttccttgct actttggcca gcagttccag tgaagagatg     600
gagtctcagc tgcaggaacg tgtggagtct ccgccgcgag ccgtgtccca gattgtgact     660
gtttatgata aattgcaaga aaaagtggag ctcttatccc ggaagctaaa cagtggagat     720
aatctgatag tggaggaagc agtgcaggag ctgaactctt tcctcgcaca ggagaatatg     780
aggctacaga aattgacaga tcttcttcag gaaaagcatc gcaccatgtc tcaggagttc     840
tccaagttgc agagtaaagt ggagacagcc gaatcacgag tgtctgtcct ggagtccatg     900
```

```
attgatgacc tgcagtggga tattgacaaa attcgaaaga gggaacagcg actcgaccga      960
cacttagcag aagtcctaga acgggtgaat tccaaaggtt ataaggtgta tggagcgggg     1020
agcagtctgt atggcggcac aatcactatc aatgctcgga agtttgagga aatgaatgca     1080
gagcttgagg agaacaaaga gttggctcag aaccgtctct gtgagctgga gaaacttcgg     1140
caagactttg aggaggtcac tacacaaaat gaaaagctga aggtggaatt gcggagtgca     1200
gtggagcaag tcgttaagga aactccagaa tatcgctgca tgcagtcaca gttctccgtc     1260
ttgtataatg agagcctaca gttgaaagca cacttggatg aggctcggac cctgcttcat     1320
ggcaccagag gaacccacca gcaccaggtt gagcttattg agcgagatga ggttagtctt     1380
cataagaagc tgaggactga agtaattcag ctagaagata cattggccca ggtccgcaag     1440
gagtatgaaa tgctgaggat agaatttgag cagacccttg ctgccaatga acaagcaggc     1500
cctataaaca gggagatgcg ccacctcatc agtagcctcc agaatcacaa tcaccagctg     1560
aaagggagg tcctgagata taagcggaaa ttgagagaag cccagtctga cctgaacaag     1620
acacgcctgc gtagtggtag tgccctcctg cagtcccagt ctagtactga ggacccgaag     1680
gatgagcctg cggagctaaa accagattct gaggacttat cctcccagtc ctcagcttca     1740
aaggcatctc aggaggatgc caatgaaatc aagtctaaac gggatgaaga agaacgagaa     1800
cgagaaagga gggagaagga gagggaacga gaaagagaac gggagaagga aaggagaga     1860
gaacgagaga agcagaagct aaaagagtca gaaaagaga gagattctgc taaggataaa     1920
gagaaaggca acatgatga tggacggaaa aaggaagcag aaattatcaa acaattgaag     1980
attgaactca agaaggcaca ggagagccaa aaggagatga aactattgct ggatatgtac     2040
cgttctgccc caaggaaca gagagacaaa gttcagctga tggcagctga gaagaagtct     2100
aaggcagagt tggaagatct aaggcaaaga ctcaaggatc tggaagataa agagaagaaa     2160
gagaacacga aaatggctga tgaggatgcc ttgaggaaga tccgggcagt ggaggagcag     2220
atagaatacc tacagaagaa gctagccatg gccaagcagg aagaagaagc actcctctct     2280
gaaatggatg tcacaggcca ggcctttgaa gacatgcagg agcaaaatat ccgtttgatg     2340
cagcaattgc gggagaagga tgatgcaaat ttcaagctca tgtcagagcg tatcaagtcc     2400
aatcagatcc ataagttgct aaagaagag aaggaggagc tggcagacca ggtgttgact     2460
ctgaagactc aggttgatgc ccagctacag gtagtaagga aactgaagaa gaaggagcat     2520
ctgttacaga gcaacattgg cacaggggag aaggagctgg gtcttaggac ccaagcctta     2580
gagatgaata aacgcaaggc aatggaggca gcccagcttg cagatgacct caaagcacaa     2640
ctggagttgg ctcagaagaa gctacatgat tttcaggatg agatcgtgga aacagtgtt     2700
accaaagaaa aggacatgtt caatttcaaa cgagcccagg aggacatctc tagacttcgc     2760
aggaagctgg agaccacaaa gaaaccagac aatgtaccca gtgtgatga gattctgatg     2820
gaagagatta aggattacaa ggcacgcttg acctgtccat gctgtaacat gcgtaaaaag     2880
gatgctgttc ttactaagtg ttttcatgtc ttctgctttg agtgtgtgaa gacacgctat     2940
gacacccgcc agcgcaaatg tcccaagtgt aatgctgctt ttggtgccaa tgattttcat     3000
cgcatctaca ttggttgatc taagtcaaga gaagaagagg agctggctag tcaggaactt     3060
attcattaac caccaaacct ctacctcttc tctccttgac tgtcacctgt aggacagttt     3120
atcagtcaac tacctttcct ccagacttta cttccaggct ctcctcttca gtagctggat     3180
gactttagca gaaaggactg gtaaatacaa gccttgggtt tcagaatgaa ttagaaacaa     3240
```

```
ataactcttta ctgtcttccc tcccagcttt gtttattttg tgcttttaga cttttcagtg    3300 ttttctttt ccagcccact gtataaactt ggattgtcca ttcctcctga agaaatcaag     3360
ttggtatttt tgatgtggaa aagggaacaa aagtggaaac atggctactt ttggggagtg    3420
atattttaaa aaataagttg tctatgggca caaagttttc ttcatttgtg tagcaaactt    3480
cttgtgaatg tggattacaa aatggtataa ttgtgctact ctcccctggg tggtttgcag    3540
ccctaatgaa attatgtcta ggatgattca gtctatttcc catttactag cagagtaact    3600
tgttaagatc agctggcttt cttgttaaag ttatttaagt tttgaatgct ctactacttc    3660
aagtctttaa atttcttgag actagaataa ttttaaataa tatgaccctt tgtcttctaa    3720
tgaaataaag attgaagagg ttgagtcagg actgagctgg tgaagaaatc ttgtgggtat    3780
tctggaaatt tgatacggag agaacttggt gagctatgaa ttactctcag tctccttttt    3840
acagggttgt tgtgatccct cttttccaga aaattctgtg gaatgtttct gtaggacttt    3900
gttctccaca agcttgaatt aaagcaggat tcagtt                              3936

<210> SEQ ID NO 3
<211> LENGTH: 45
<212> TYPE: DNA
<213> ORGANISM: Artificial sequence
<220> FEATURE:
<223> OTHER INFORMATION: shRNA (DNA)

<400> SEQUENCE: 3
gagaacggtc ctaggcctgt caagaggaga acggtcctag gcctg                    45

<210> SEQ ID NO 4
<211> LENGTH: 45
<212> TYPE: DNA
<213> ORGANISM: Artificial sequence
<220> FEATURE:
<223> OTHER INFORMATION: shRNA (DNA)

<400> SEQUENCE: 4
gatatcagac ctacgggtgt caagaggata tcagacctac gggtg                    45

<210> SEQ ID NO 5
<211> LENGTH: 45
<212> TYPE: DNA
<213> ORGANISM: Artificial sequence
<220> FEATURE:
<223> OTHER INFORMATION: shRNA (DNA)

<400> SEQUENCE: 5
ctcgagtaaa tgaaaatatt caagagctcg agtaaatgaa aatat                    45

<210> SEQ ID NO 6
<211> LENGTH: 19
<212> TYPE: RNA
<213> ORGANISM: Artificial sequence
<220> FEATURE:
<223> OTHER INFORMATION: siRNA

<400> SEQUENCE: 6
gcuaaacagu ggagauaau                                                 19

<210> SEQ ID NO 7
<211> LENGTH: 19
<212> TYPE: RNA
<213> ORGANISM: Artificial sequence
<220> FEATURE:
<223> OTHER INFORMATION: siRNA
```

-continued

<400> SEQUENCE: 7
guaucauccu uaaacguua                                            19

<210> SEQ ID NO 8
<211> LENGTH: 20
<212> TYPE: DNA
<213> ORGANISM: Artificial sequence
<220> FEATURE:
<223> OTHER INFORMATION: primer

<400> SEQUENCE: 8
atccacctgc cttagtccac                                           20

<210> SEQ ID NO 9
<211> LENGTH: 23
<212> TYPE: DNA
<213> ORGANISM: Artificial sequence
<220> FEATURE:
<223> OTHER INFORMATION: primer

<400> SEQUENCE: 9
cagcaagtgg gaaggtgtaa tcc                                       23

<210> SEQ ID NO 10
<211> LENGTH: 21
<212> TYPE: DNA
<213> ORGANISM: Artificial sequence
<220> FEATURE:
<223> OTHER INFORMATION: primer

<400> SEQUENCE: 10
tcttcaggag atatgcaaag c                                         21

<210> SEQ ID NO 11
<211> LENGTH: 21
<212> TYPE: DNA
<213> ORGANISM: Artificial sequence
<220> FEATURE:
<223> OTHER INFORMATION: primer

<400> SEQUENCE: 11
caaggagagg cttcttgctg a                                         21

<210> SEQ ID NO 12
<211> LENGTH: 20
<212> TYPE: DNA
<213> ORGANISM: Artificial sequence
<220> FEATURE:
<223> OTHER INFORMATION: primer

<400> SEQUENCE: 12
agctacaaac aggtgaagac                                           20

<210> SEQ ID NO 13
<211> LENGTH: 20
<212> TYPE: DNA
<213> ORGANISM: Artificial sequence
<220> FEATURE:
<223> OTHER INFORMATION: primer

<400> SEQUENCE: 13
tcgaagaact gttccagcca                                           20

<210> SEQ ID NO 14

```
<211> LENGTH: 25
<212> TYPE: DNA
<213> ORGANISM: Artificial sequence
<220> FEATURE:
<223> OTHER INFORMATION: primer

<400> SEQUENCE: 14
cccattctat catcaacggg tacaa                                    25

<210> SEQ ID NO 15
<211> LENGTH: 20
<212> TYPE: DNA
<213> ORGANISM: Artificial sequence
<220> FEATURE:
<223> OTHER INFORMATION: primer

<400> SEQUENCE: 15
atcctctcgt tgtgcatagt                                          20

<210> SEQ ID NO 16
<211> LENGTH: 20
<212> TYPE: DNA
<213> ORGANISM: Artificial sequence
<220> FEATURE:
<223> OTHER INFORMATION: primer

<400> SEQUENCE: 16
cacagagatg gttcgccagt                                          20

<210> SEQ ID NO 17
<211> LENGTH: 20
<212> TYPE: DNA
<213> ORGANISM: Artificial sequence
<220> FEATURE:
<223> OTHER INFORMATION: primer

<400> SEQUENCE: 17
taggaagagt aaaggctggg                                          20

<210> SEQ ID NO 18
<211> LENGTH: 24
<212> TYPE: DNA
<213> ORGANISM: Artificial sequence
<220> FEATURE:
<223> OTHER INFORMATION: primer

<400> SEQUENCE: 18
ttacttaagt cgacagaggt cagc                                     24

<210> SEQ ID NO 19
<211> LENGTH: 23
<212> TYPE: DNA
<213> ORGANISM: Artificial sequence
<220> FEATURE:
<223> OTHER INFORMATION: primer

<400> SEQUENCE: 19
gaaagacatg acaaacacca gac                                      23

<210> SEQ ID NO 20
<211> LENGTH: 20
<212> TYPE: DNA
<213> ORGANISM: Artificial sequence
<220> FEATURE:
<223> OTHER INFORMATION: primer

<400> SEQUENCE: 20
```

```
aatgagtggg ctcatggaaa                                              20

<210> SEQ ID NO 21
<211> LENGTH: 24
<212> TYPE: DNA
<213> ORGANISM: Artificial sequence
<220> FEATURE:
<223> OTHER INFORMATION: primer

<400> SEQUENCE: 21
tggtctagtg cttgattctg tttg                                         24

<210> SEQ ID NO 22
<211> LENGTH: 24
<212> TYPE: DNA
<213> ORGANISM: Artificial sequence
<220> FEATURE:
<223> OTHER INFORMATION: primer

<400> SEQUENCE: 22
caactagctc cattttcctc tttc                                         24

<210> SEQ ID NO 23
<211> LENGTH: 20
<212> TYPE: DNA
<213> ORGANISM: Artificial sequence
<220> FEATURE:
<223> OTHER INFORMATION: primer

<400> SEQUENCE: 23
tctggatgca gcatttgtgt                                              20
```